US006961187B2

(12) United States Patent
Amanai

(10) Patent No.: US 6,961,187 B2
(45) Date of Patent: Nov. 1, 2005

(54) IMAGING DEVICE

(75) Inventor: Takahiro Amanai, Sagaminara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/247,740

(22) Filed: Sep. 20, 2002

(65) Prior Publication Data
US 2003/0179464 A1 Sep. 25, 2003

(30) Foreign Application Priority Data
Sep. 21, 2001 (JP) ......................................... 2001-289113

(51) Int. Cl.[7] .............................................. G02B 15/00
(52) U.S. Cl. ...................................... 359/666; 359/676
(58) Field of Search ................................ 359/676–692, 359/665–667

(56) References Cited

U.S. PATENT DOCUMENTS

| 4,407,567 A | * | 10/1983 | Michelet et al. ............ 359/676 |
| 4,783,155 A | * | 11/1988 | Imataki et al. .............. 359/666 |
| 4,784,479 A | * | 11/1988 | Ikemori ...................... 359/665 |
| 5,091,801 A | * | 2/1992 | Ebstein ....................... 359/665 |
| 6,437,925 B1 | * | 8/2002 | Nishioka ..................... 359/726 |
| 6,791,741 B2 | * | 9/2004 | Hishioka ..................... 359/291 |
| 2004/0066561 A1 | * | 4/2004 | Nagata et al. .............. 359/676 |
| 2004/0201901 A1 | * | 10/2004 | Nagata ....................... 359/676 |

FOREIGN PATENT DOCUMENTS

JP          2000-298237          10/2000

* cited by examiner

Primary Examiner—Georgia Epps
Assistant Examiner—M. Hasan
(74) Attorney, Agent, or Firm—Pillsbury Winthrop Shaw Pittman LLP

(57) ABSTRACT

A zooming optical system has at least one lens unit having a variable magnification function and at least one deformable reflecting surface having a compensator or focusing function. In this case, the zooming optical system satisfies the following conditions: $0 \leq |\phi x/\phi| < 0.5$, $0 \leq |\phi y/\phi| < 0.5$, where $\phi x$ is power of an axis perpendicular to a direction of decentering of the deformable reflecting surface; $\phi y$ is power of an axis in parallel with a direction of decentering of the deformable reflecting surface; and $\phi$ is power of the entire optical system.

53 Claims, 54 Drawing Sheets

——————— 656.2700 NM
- - - - - - - 587.5600 NM
— - — - — 546.0700 NM
— — — — 486.1300 NM
— - - — - - 435.8300 NM

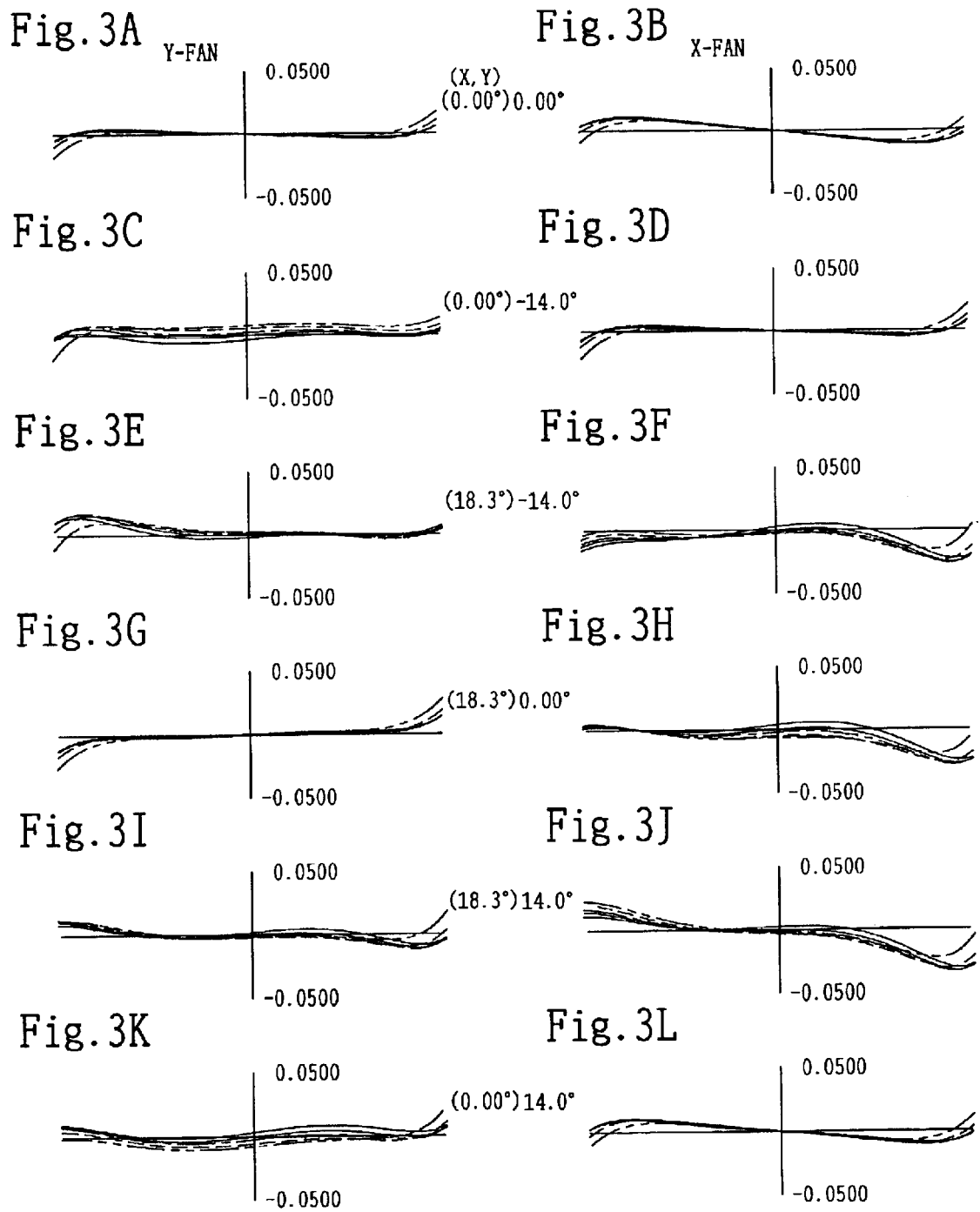

Fig.4A Y-FAN 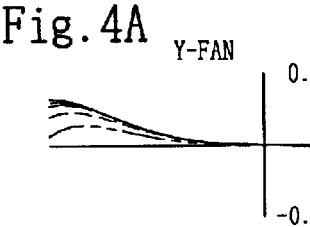 Fig.4B X-FAN 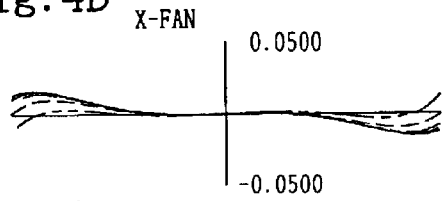
Fig.4C 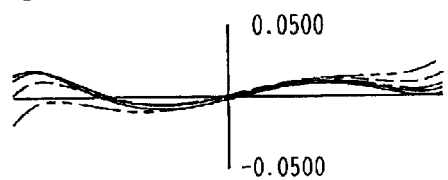 Fig.4D 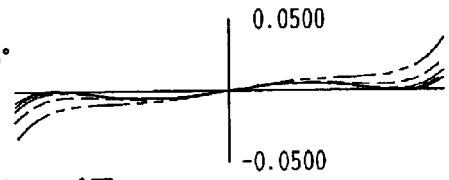
Fig.4E 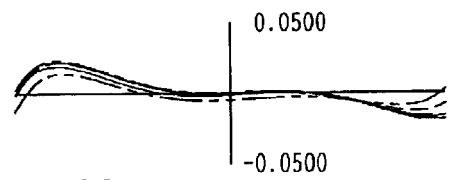 Fig.4F 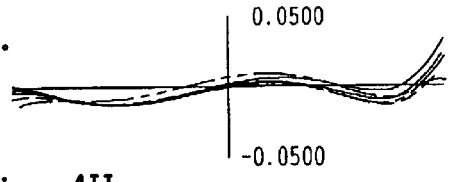
Fig.4G 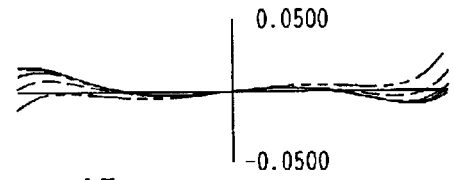 Fig.4H 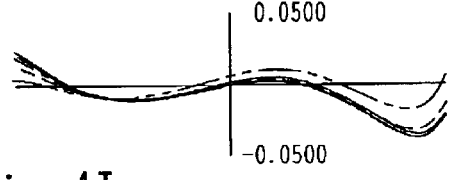
Fig.4I 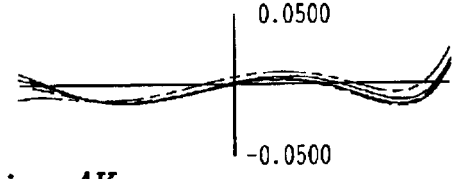 Fig.4J 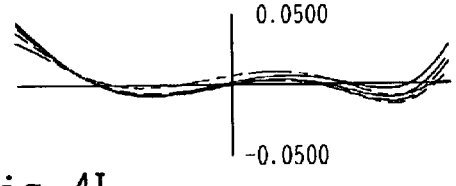
Fig.4K 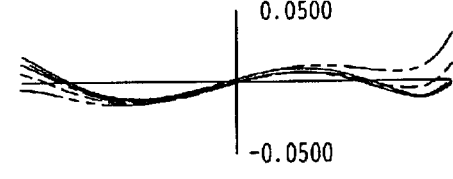 Fig.4L 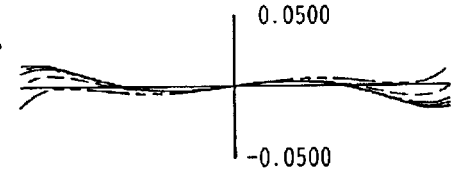
```
─────────── 656.2700 NM
- - - - - - - 587.5600 NM
─ · ─ · ─ · ─ 546.0700 NM
─ ─ ─ ─ ─ ─ 486.1300 NM
─ · · ─ · · ─ 435.8300 NM
```

Fig.6
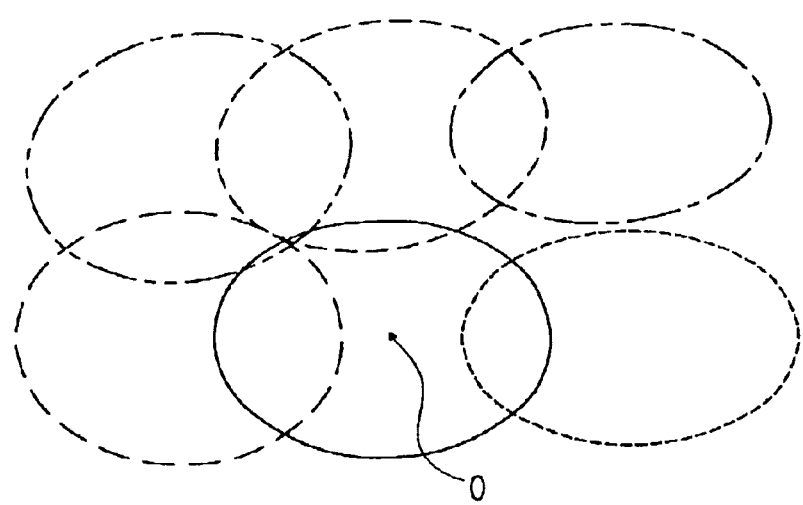
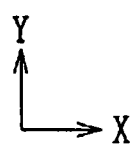

Fig.7
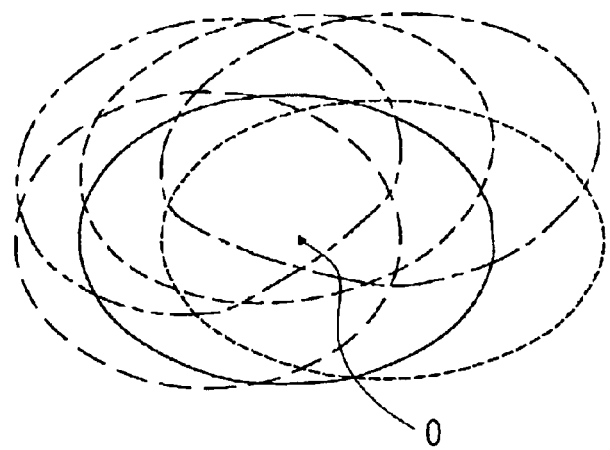
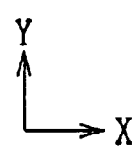

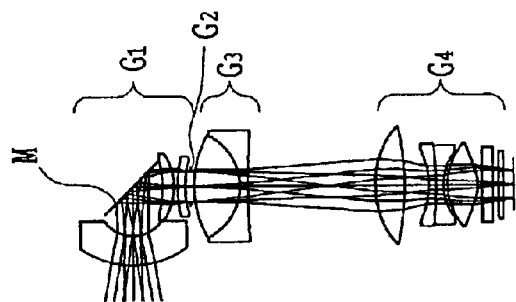
Fig.8C
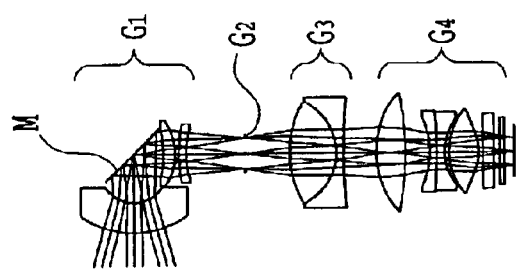
Fig.8B
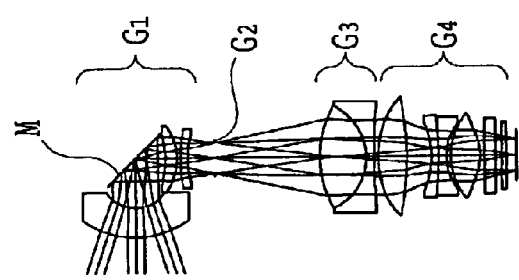
Fig.8A
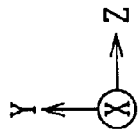

```
——————————— 656.2700 NM
------------ 587.5600 NM
—·—·—·—·—·— 546.0700 NM
— — — — — — 486.1300 NM
—··—··—··—·· 435.8300 NM
```

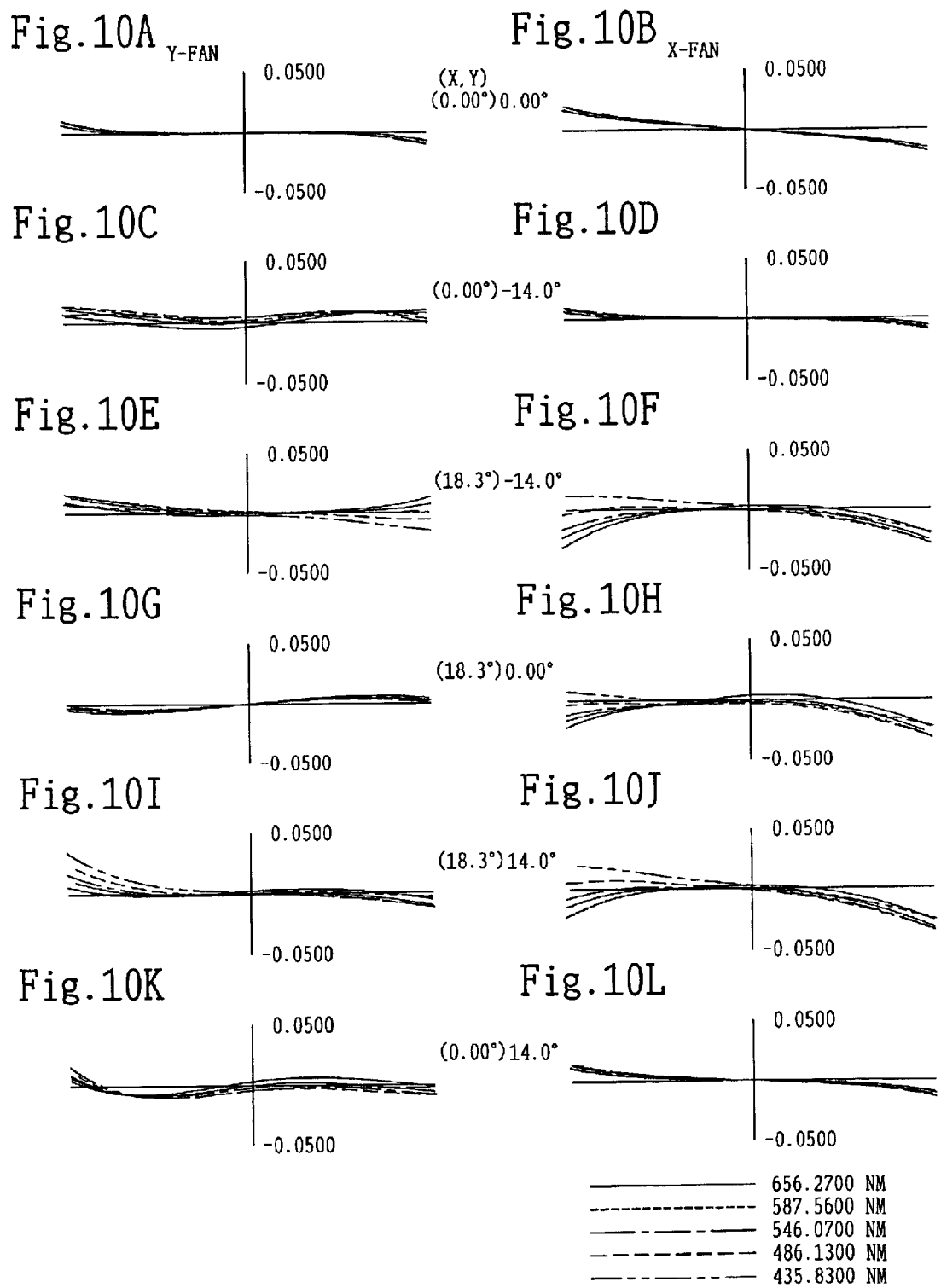

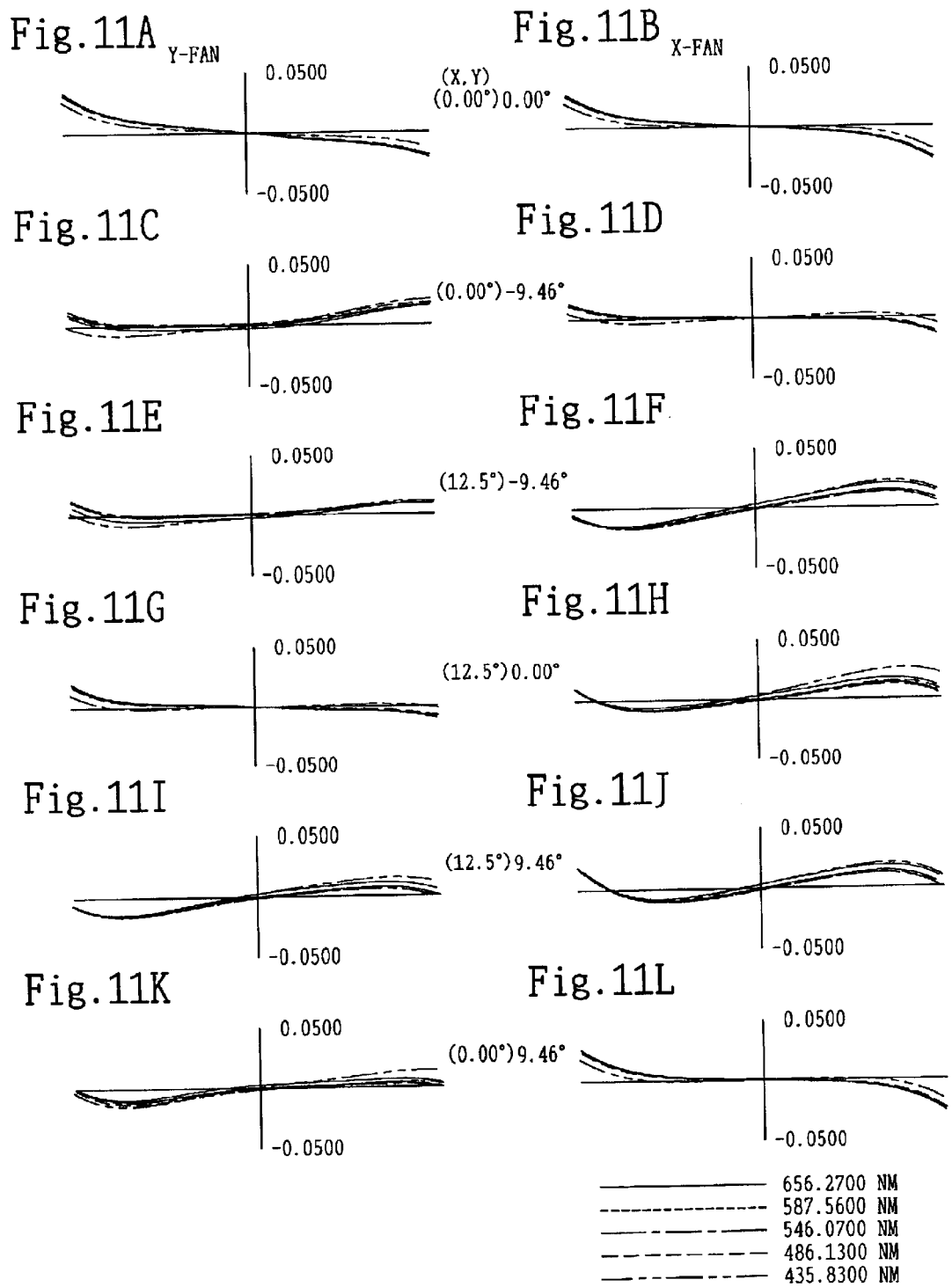

Fig.12
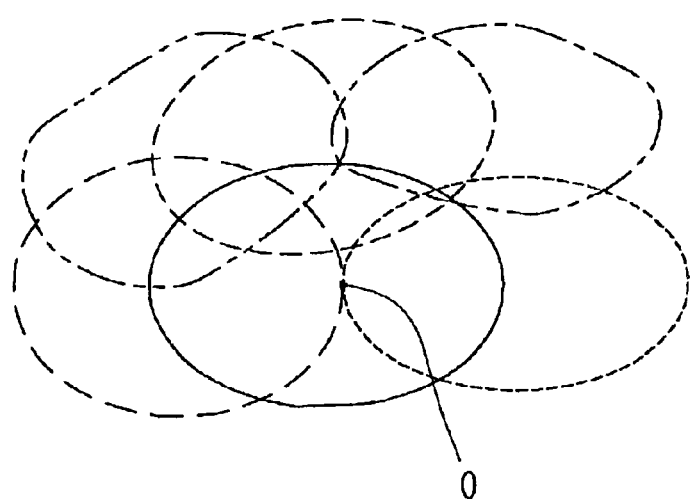
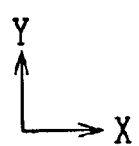

Fig.14
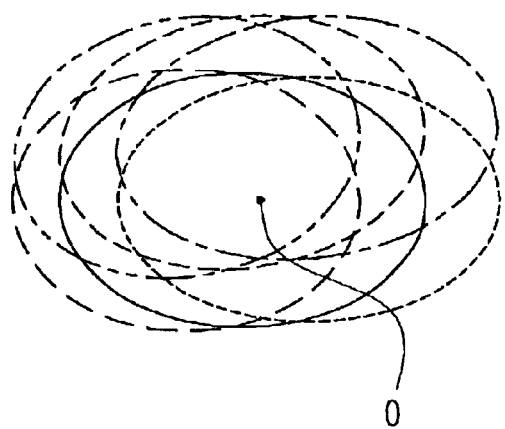
0
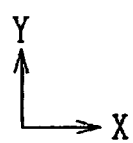

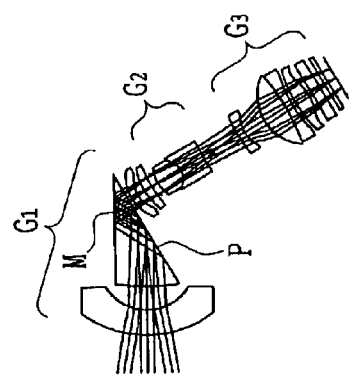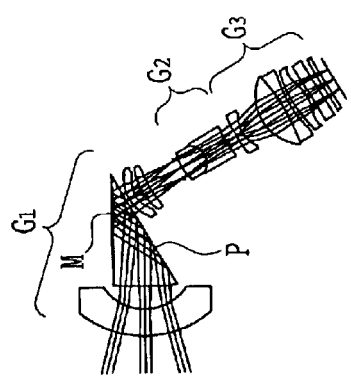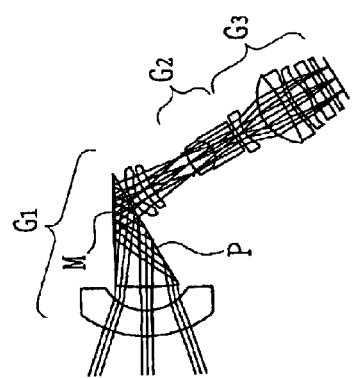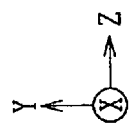

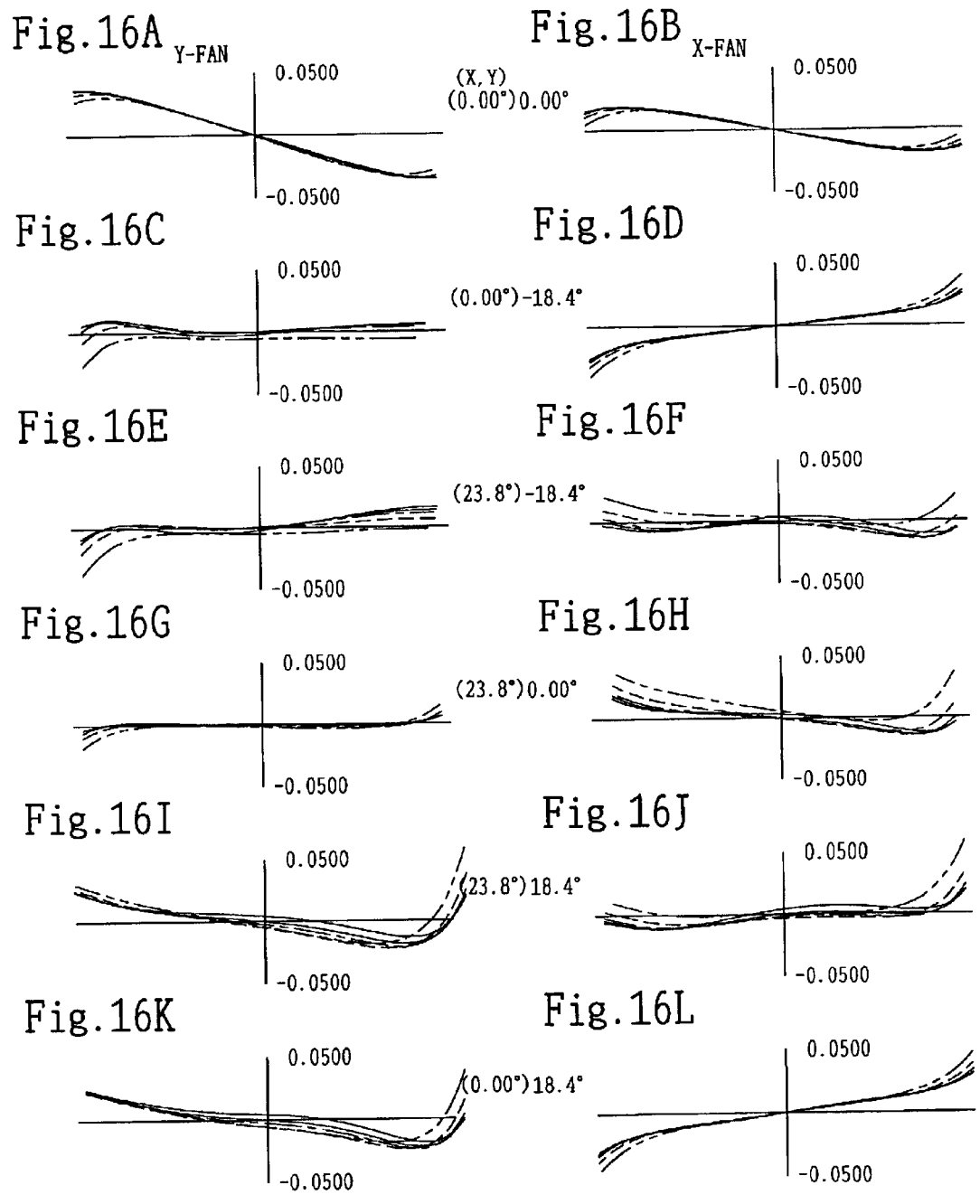

Fig.17A Y-FAN
Fig.17B X-FAN
(X,Y)
(0.00°) 0.00°
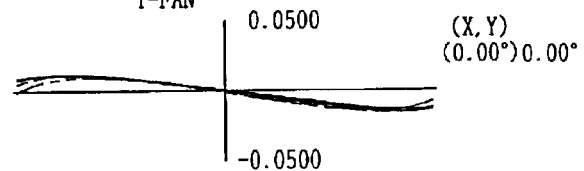
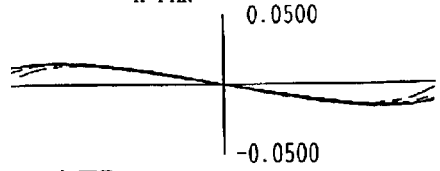
Fig.17C
Fig.17D
(0.00°) -14.0°
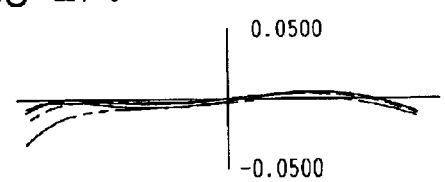
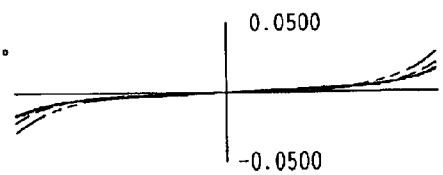
Fig.17E
Fig.17F
(18.3°) -14.0°
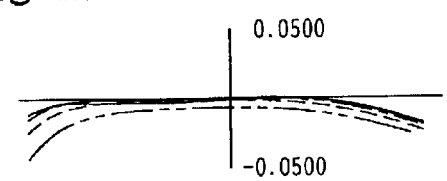
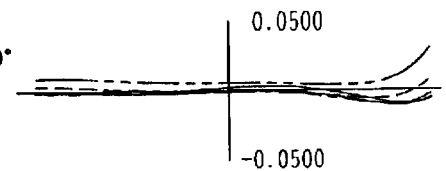
Fig.17G
Fig.17H
(18.3°) 0.00°
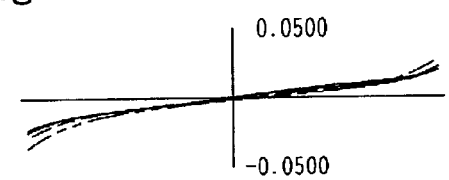
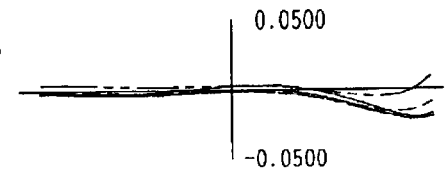
Fig.17I
Fig.17J
(18.3°) 14.0°
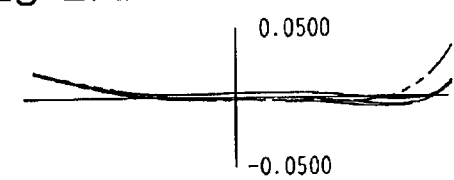
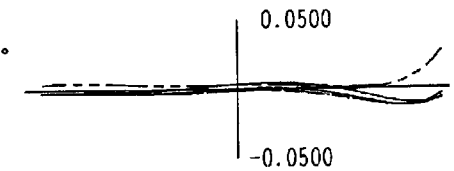
Fig.17K
Fig.17L
(0.00°) 14.0°
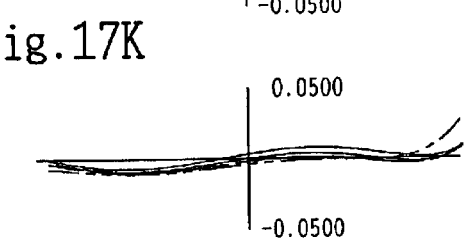
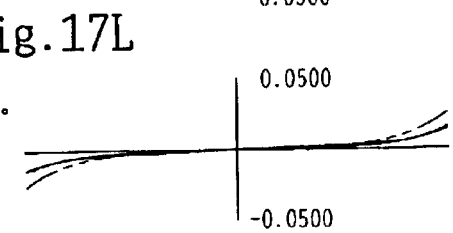
```
――――――― 656.2700 NM
----------- 587.5600 NM
― - ― - ― 546.0700 NM
― ― ― ― 486.1300 NM
― ‥ ― ‥ ― 435.8300 NM
```

Fig.18A Y-FAN 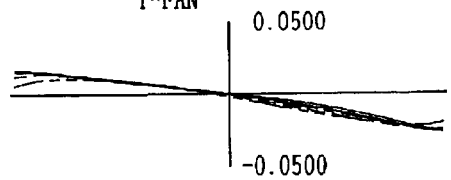 Fig.18B X-FAN 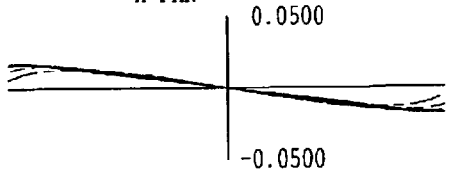
Fig.18C 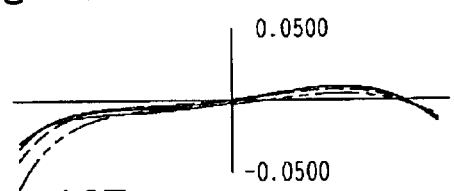 Fig.18D 
Fig.18E 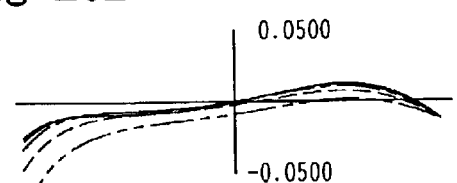 Fig.18F 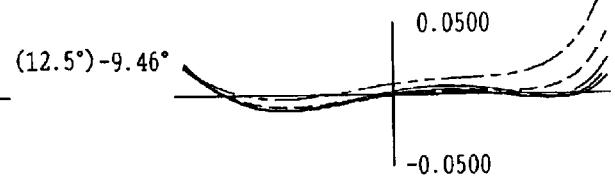
Fig.18G 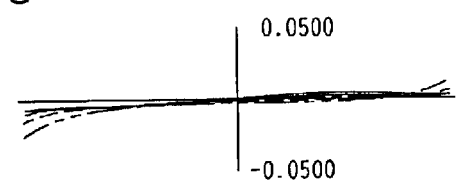 Fig.18H 
Fig.18I 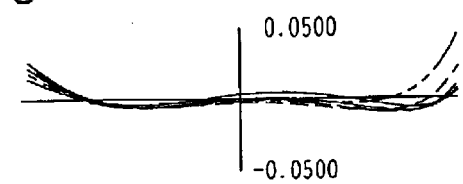 Fig.18J 
Fig.18K 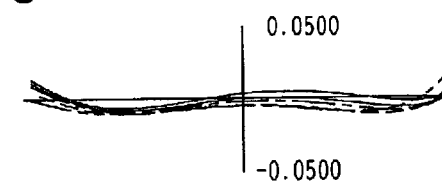 Fig.18L 
——— 656.2700 NM
-------- 587.5600 NM
— - — 546.0700 NM
— — — 486.1300 NM
—-—-— 435.8300 NM Fig.19
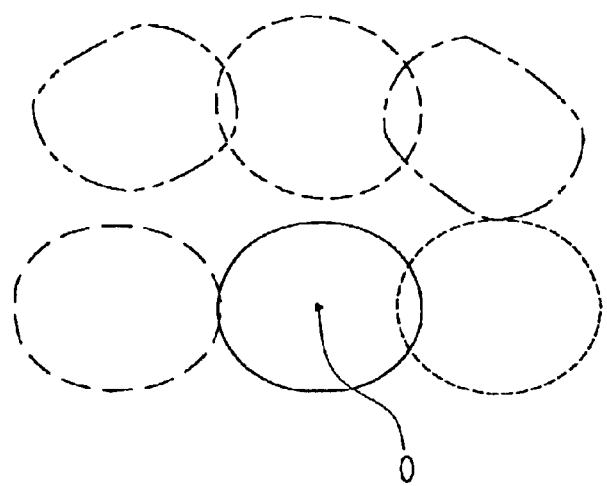
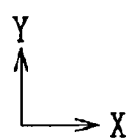

Fig. 21
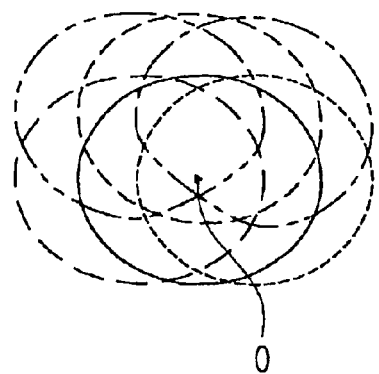
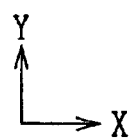

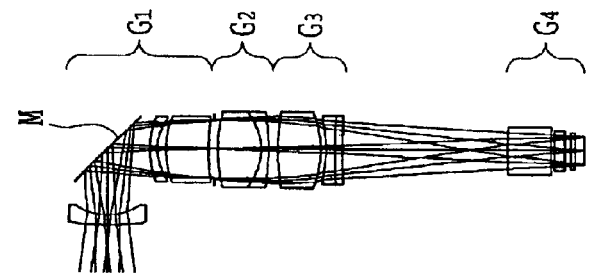
Fig. 22C
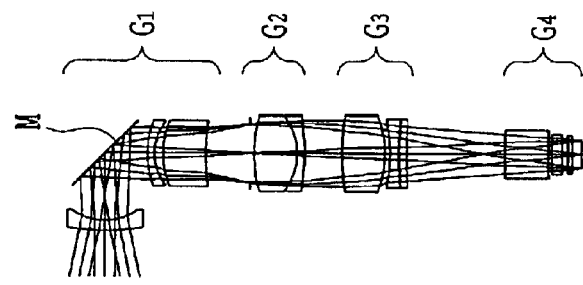
Fig. 22B
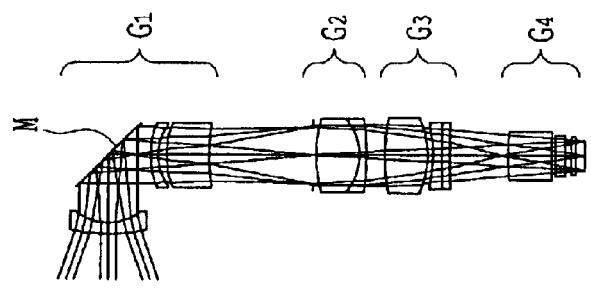
Fig. 22A
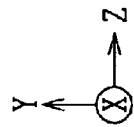

Fig.23A Y-FAN
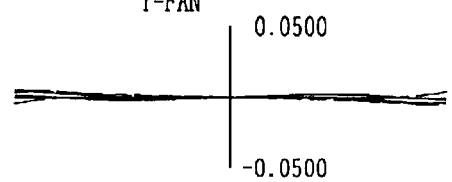
Fig.23B X-FAN
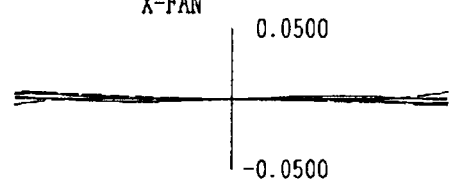
Fig.23C
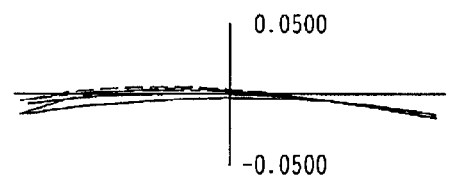
Fig.23D
Fig.23E
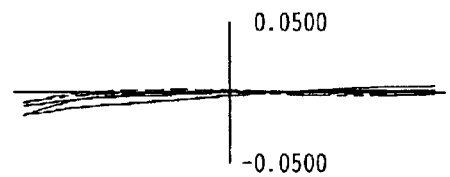
Fig.23F
Fig.23G
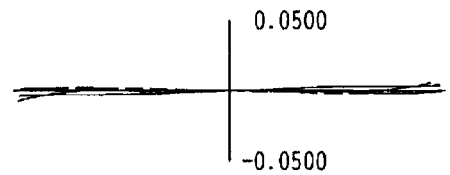
Fig.23H
Fig.23I
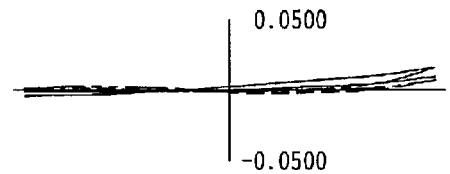
Fig.23J
Fig.23K
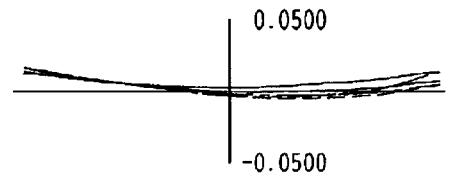
Fig.23L
— 656.2700 NM
--------- 587.5600 NM
— — — 546.0700 NM
— — — — 486.1300 NM
— - - — - 435.8300 NM

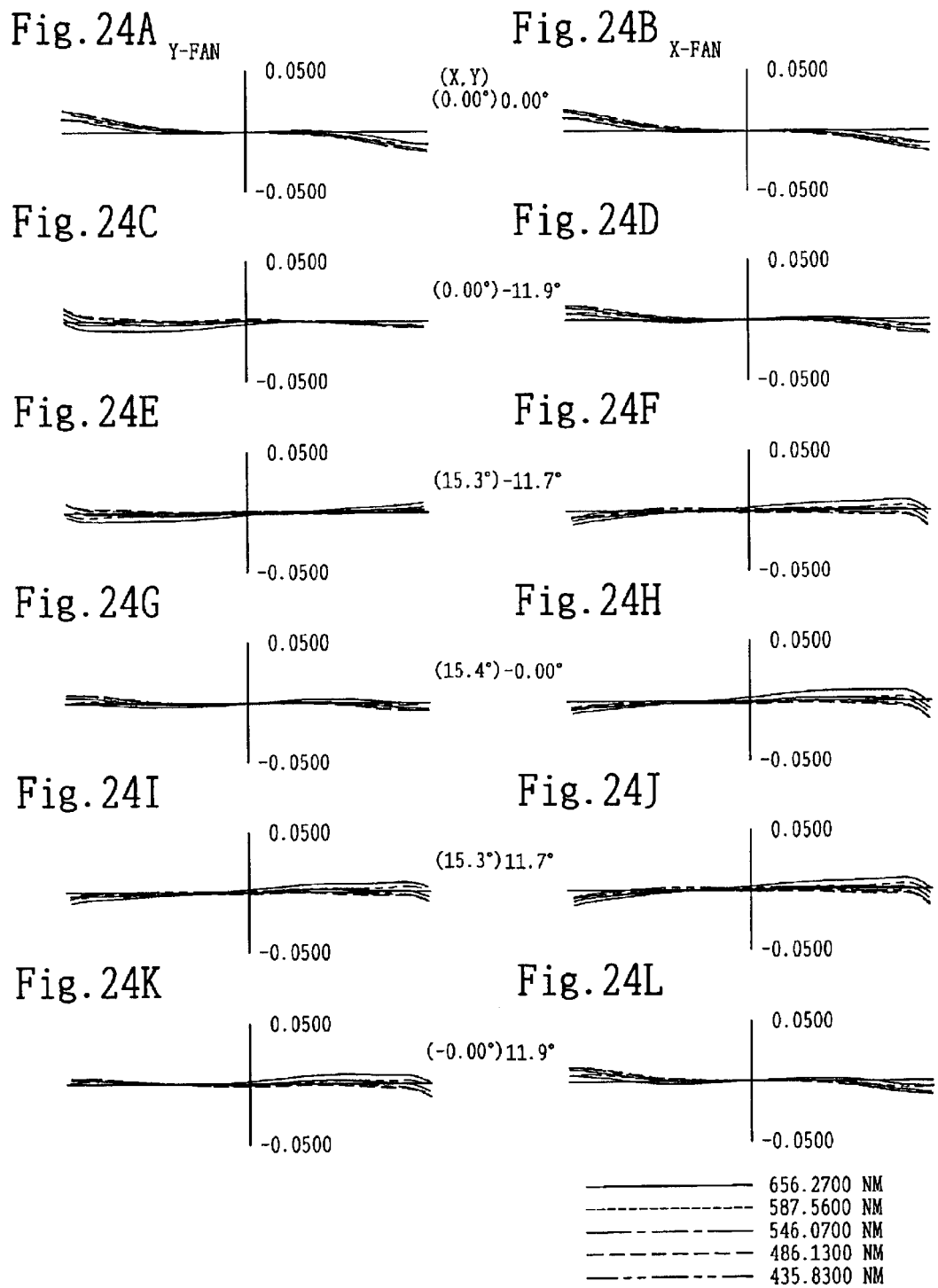

Fig.25A Y-FAN
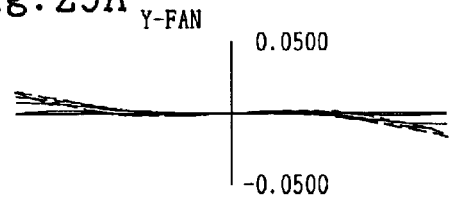
Fig.25B X-FAN
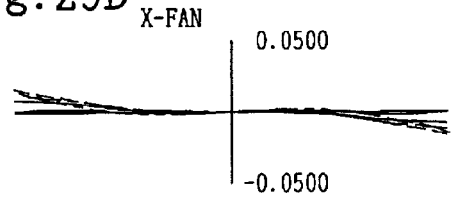
(X,Y)
(0.00°)0.00°
Fig.25C
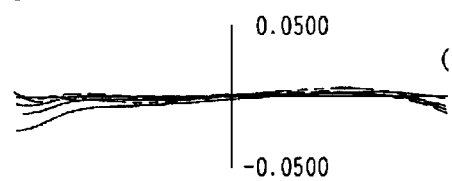
Fig.25D
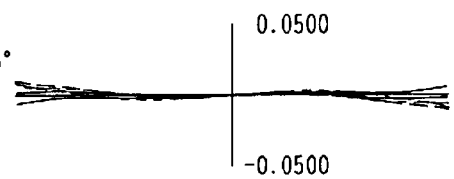
(-0.00°)-7.85°
Fig.25E
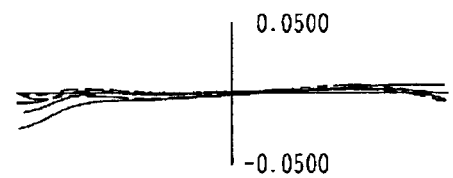
Fig.25F
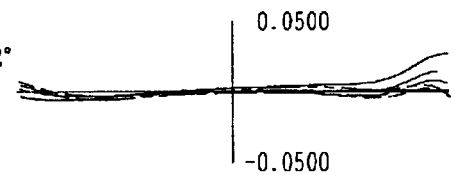
(10.1°)-7.62°
Fig.25G
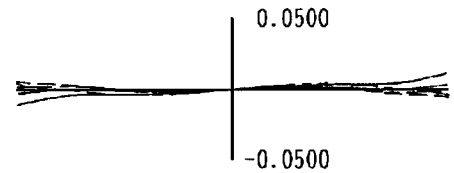
Fig.25H
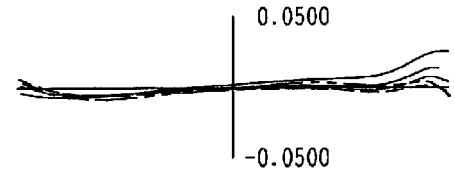
(10.2°)0.00°
Fig.25I
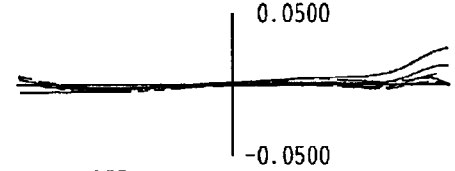
Fig.25J
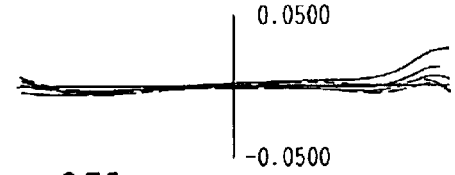
(10.1°)7.62°
Fig.25K
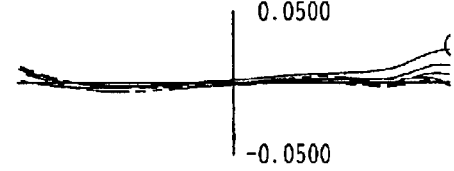
Fig.25L
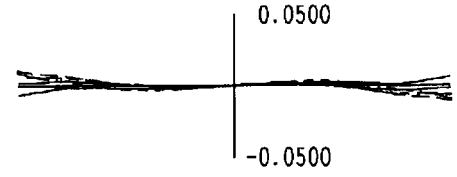
(-0.00°)7.85°
——————— 656.2700 NM
- - - - - - - 587.5600 NM
— — — — 546.0700 NM
— - — - — 486.1300 NM
- - - - - - 435.8300 NM Fig. 26
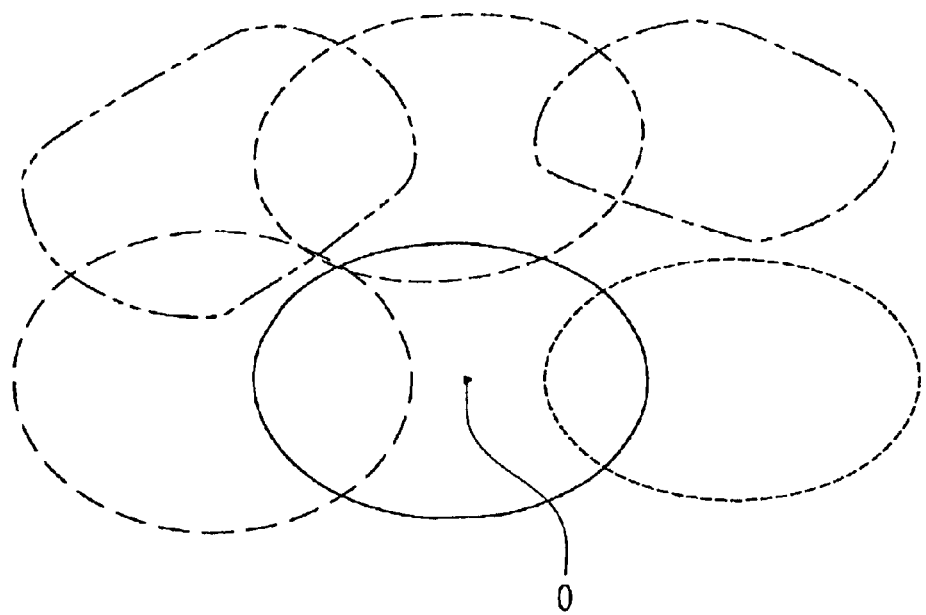
0
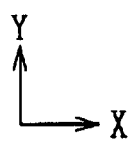

Fig.27
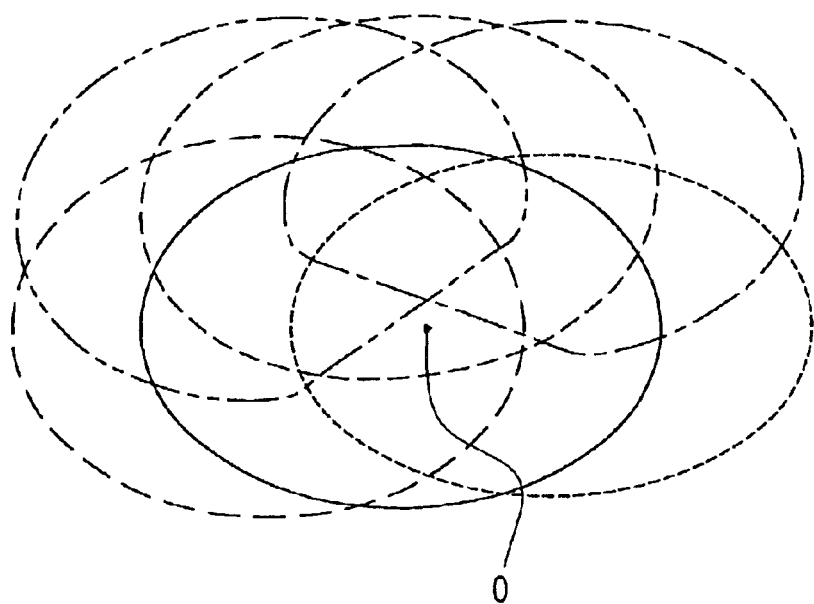
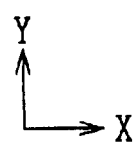

TRANS-TYPE  CIS-TYPE

IMAGING DEVICE

BACKGROUND OF THE INVENTION

1. Field of the Invention

The present invention relates to an imaging device, and in particular, to an electronic imaging device having a zooming optical system.

2. Description of Related Art

A zooming optical system comprises lens units: a unit varying the focal length (a variator), a unit compensating for the shift of an image surface and aberration resulting therefrom (a compensator), a unit focusing an object, and a fixed unit correcting aberration characteristics.

The zooming optical system is constructed so that the magnification change and focal adjustment thereof are performed by moving a predetermined lens unit, of the above-mentioned lens units, in the coaxial direction.

The mechanical structure for moving these lens units, however, is complicated, and there is the problem that a wide space is necessary for installing this mechanical structure.

Available methods for moving the lens units of a zooming optical system include a manual method of manually moving lenses via a zooming ring as in a single-lens reflex camera, and a motor driving method of moving lenses by driving a motor through the operation of a zooming lever or a button attached to the device.

The manual method, however, has the problem that it is difficult to provide a lens with a collapsible mount, and the lens may remain in a projecting state when the device is not used, this constituting an obstacle to carrying.

The motor driving method, on the other hand, has problems such as a slow zooming operation, noisy operation and large power consumption. In addition, it is necessary to provide a motor and a driving circuit for operating the motor, resulting in oversizing of the device.

Regarding the focusing mechanism of the zooming optical system in the imaging device, automatic focusing forms a main current, and because of the absolute necessity of motor driving, problems such as a slow operation, noisy movement and large power consumption are encountered.

Furthermore, in the case of the motor driving method in which the lens is collapsed during non-operation, the lens must be largely moved at start and end of operation, causing a further increase in power consumption.

There is recently a demand for an imaging device using a compact and high-resolution zooming optical system. For example, Japanese Patent Kokai No. Hei 11-220646 proposes an imaging device using a zooming optical system downsized by folding the optical path. The optical path is merely folded, with power consumption not markedly reduced.

SUMMARY OF THE INVENTION

It is, therefore, an object of the present invention to provide a zooming optical system which is very compact in size, with very low power consumption, operated quietly, and applicable to an imaging device.

To achieve the aforementioned object, in the present invention, it is possible to provide an imaging device which permits correction of a focal shift by providing a deformable reflecting surface in a zooming optical system for an electronic imaging device.

Specifically, the zooming optical system of the present invention comprises at least one lens unit having a variable magnification function and at least one deformable reflecting surface having a compensator or focusing function.

Further, the zooming optical system according to the present invention comprises at least two lens units having variable magnification or compensator functions and at least one deformable reflecting surface having a focusing function.

Still further, the zooming optical system according to the invention, in the above-mentioned zooming optical system, satisfies the following conditions in at least one operating state:

$$0 \leq |\phi x/\phi| < 0.5$$

$$0 \leq |\phi y/\phi| < 0.5$$

where, $\phi x$ is the power of an axis perpendicular to the direction of decentering of the deformable reflecting surface; $\phi y$ is the power of an axis in parallel with the direction of decentering of the deformable reflecting surface; and $\phi$ is the power of the entire optical system.

According to the present invention, it is not necessary to provide a lens moving mechanism such as a motor or a driving circuit by imparting a focusing function and a compensator function, or a focusing function to the deformable reflecting surface, and it is possible to achieve a compact design and a low cost.

Because the shape of the reflecting surface can be changed instantaneously, it is possible to achieve an imaging device in which focusing is performed at very high speed and an operating sound is lessened.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 3A, 3B, 3C, 3D, 3E, 3F, 3G, 3H, 3I, 3J, 3K and 3L are diagrams showing transverse aberrations in various wavelength regions at the middle position in the first embodiment;

FIGS. 4A, 4B, 4C, 4D, 4E, 4F, 4G, 4H, 4I, 4J, 4K and 4L are diagrams showing transverse aberrations in various wavelength regions at the telephoto position in the first embodiment;

FIG. 6 is an explanatory view illustrating a state of light incident on the deformable reflecting surface at the middle position in the first embodiment;

FIG. 7 is an explanatory view illustrating a state of light incident on the deformable reflecting surface at the telephoto position in the first embodiment;

FIGS. 8A, 8B and 8C are sectional views showing arrangements, develop along the optical axis, at wide-angle, middle, and telephoto positions, respectively, in a second embodiment of the imaging optical system according to the present invention;

FIGS. 10A, 10B, 10C, 10D, 10E, 10F, 10G, 10H, 10I, 10J, 10K and 10L are diagrams showing transverse aberrations in various wavelength regions at the middle position in the second embodiment;

FIGS. 11A, 11B, 11C, 11D, 11E, 11F, 11G, 11H, 11I, 11J, 11K and 11L are diagrams showing transverse aberrations in various wavelength regions at the telephoto position in the second embodiment;

FIG. 12 is an explanatory view illustrating a state of light incident on the deformable reflecting surface in various wavelength regions at the wide-angle position in the second embodiment;

FIG. 14 is an explanatory view illustrating a state of light incident on the deformable reflecting surface in various wavelength regions at the telephoto position in the second embodiment;

FIGS. 15A, 15B and 15C are sectional view showing arrangements, develop along the optical axis, at wide-angle, middle, and telephoto positions, respectively, in a third embodiment of the imaging optical system according to the present invention;

FIGS. 16A, 16B, 16C, 16D, 16E, 16F, 16G, 16H, 16I, 16J, 16K and 16L are diagram showing transverse aberrations in various wavelength regions at the wide-angle position in the third embodiment;

FIGS. 17A, 17B, 17C, 17D, 17E, 17F, 17G, 17H, 17I, 17J, 17K and 17L are diagram showing transverse aberrations in various wavelength regions at the middle in the third embodiment;

FIGS. 18A, 18B, 18C, 18D, 18E, 18F, 18G, 18H, 18I, 18J, 18K and 18L are diagram showing transverse aberrations in various wavelength regions at the telephoto position in the third embodiment;

FIG. 19 is an explanatory view illustrating a state of light incident on the deformable reflecting surface in various wavelength regions at the wide-angle position in the third embodiment;

FIG. 21 is an explanatory view illustrating a state of light incident on the deformable reflecting surface in various wavelength regions at the telephoto position in the third embodiment;

FIGS. 22A, 22B and 22C are sectional views showing arrangements, develop along the optical axis, at wide-angle, middle, and telephoto positions, respectively, in a fourth embodiment of the imaging optical system of the present invention;

FIGS. 23A, 23B, 23C, 23D, 23E, 23F, 23G, 23H, 23I, 23J, 23K and 23L are diagram showing transverse aberrations in various wavelength regions at the wide-angle position in the fourth embodiment;

FIGS. 24A, 24B, 24C, 24D, 24E, 24F, 24G, 24H, 24I, 24J, 24K and 24L are diagram showing transverse aberrations in various wavelength regions at the middle position in the fourth embodiment;

FIGS. 25A, 25B, 25C, 25D, 25E, 25F, 25G, 25H, 25I, 25J, 25K and 25L are diagram showing transverse aberrations in various wavelength regions at the telephoto position in the fourth embodiment;

FIG. 26 is an explanatory view illustrating a state of light incident on the deformable reflecting surface in various wavelength regions at the wide-angle position in the fourth embodiment;

FIG. 27 is an explanatory view illustrating a state of light incident on the deformable reflecting surface in various wavelength regions at the middle position in the fourth embodiment;

DETAILED DESCRIPTION OF THE PREFERRED EMBODIMENTS

Figure 1C:
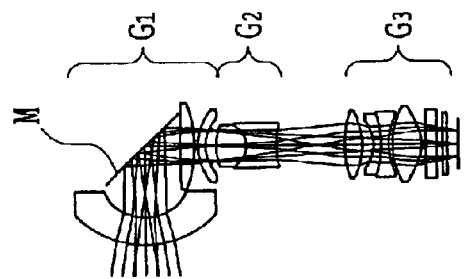
FIGS. 1A, 1B and 1C are sectional views showing arrangements, developed along the optical axis, at wide-angle, middle, and telephoto positions, respectively, in a first embodiment of the imaging optical system according to the present invention.

When the deformable reflecting surface has power by varying the shape, eccentric aberration is produced since the reflecting surface is eccentrically placed. In order to obtain satisfactory optical performance, therefore, it is desirable to satisfy the following conditions;

$$0 \leq |\phi x/\phi| < 0.5 \quad (1)$$

$$0 \leq |\phi y/\phi| < 0.5 \quad (2)$$

where, $\phi x$ is the power of an axis perpendicular to the direction of decentering of the deformable reflecting surface, $\phi y$ is the power of an axis in parallel with the direction of decentering of the deformable reflecting surface, and $\phi$ is the power of the entire optical system.

In Conditions (1) and (2), the lower limit suggests that the deformable reflecting surface is flat, and the value never becomes lower than this. In the case of a flat surface, the reflecting surface has no power and thus the eccentric aberration is not produced, resulting in satisfactory optical performance. On the other hand, when the upper limit is exceeded, the power of the deformable reflecting surface becomes excessively larger, leading to a larger amount of production of eccentric aberration, and hence to a poorer optical performance.

Or more preferably, it is important to satisfy the following conditions:

$$0 \leq |\phi x/\phi| < 0.1 \quad (3)$$

$$0 \leq |\phi y/\phi| < 0.1 \quad (4)$$

The meaning of the lower and upper limits in Conditions (3) and (4) is the same as in Conditions (1) and (2) mentioned above.

Or furthermore preferably, it is important to satisfy the following conditions:

$$0 \leq |\phi x/\phi| < 0.05 \quad (5)$$

$$0 \leq |\phi y/\phi| < 0.05 \quad (6)$$

The meaning of the lower and upper limits in Conditions (5) and (6) is the same as in Conditions (1) and (2).

When the variator is constructed with only a single lens unit, it is not necessary to dependently provide a member such as a cam for moving other lens units, permitting achievement of a more compact size and a lower cost.

By applying the present invention to a zooming optical system having a configuration in which the variator unit is moved without consuming power, for example, a configuration in which zooming is manually carried out without using a driving means such as a motor, it is possible to achieve a large power saving. With an added effect of the use of a deformable reflecting surface, it is possible to omit members and space for the variator and for the compensator to cause follow-up movement of the variator, thus solving the problems of forming an obstacle for carrying, encountered when adopting the manual type. If the lens unit serving as a variator has the function of a convex lens, it is easier to achieve a wide-angle zooming lens. When the lens unit serving as the variator has the function of a concave lens, it is easier to achieve a zooming lens system having a shorter overall length.

In order to reduce the amount of deformation of the deformable reflecting surface, it is desirable to satisfy the following condition:

$$0.01 < |\eta| < 3.0 \tag{7}$$

where $\eta$ is the magnification of the variator unit.

When the absolute value $|\eta|$ of the magnification of the variator unit largely exceeds the upper limit of Condition (7), or is reduced to below the lower limit, the power of the compensator become larger, and thus the amount of deformation necessary for the deformable mirror becomes excessively large. It is impossible to keep such a shape, or even if possible, the amount of produced eccentric aberration is too large to obtain satisfactory optical performance.

Or more preferably, it is important to satisfy the following condition:

$$0.1 < |\eta| < 2.0 \tag{8}$$

The meaning of the lower and upper limits of Condition (8) is the same as in Condition (7).

Or furthermore preferably, it is important to satisfy the following condition:

$$0.5 < |\eta| 1.7 \tag{9}$$

The meaning of the lower and upper limits of Condition (9) is the same as in Condition (7).

When the effective beam diameter of the deformable reflecting surface is represented by D, it is favorable to satisfy the following condition:

$$D < 20.0 \text{ mm} \tag{10}$$

When the effective beam diameter D of the deformable reflecting surface increases over the upper limit of Condition (10), the amount of deformation of the shape becomes larger, thus making it difficult to control the surface shape. Even if control is possible, the energy required for deformation becomes larger. This is inappropriate for achieving energy saving.

Or preferably, it is important to satisfy the following condition:

$$D < 17.0 \text{ mm} \tag{11}$$

The meaning of the lower limit of Condition (11) is the same as in Condition (10).

Or more preferably, it is important to satisfy the following condition:

$$D < 15.0 \text{ mm} \tag{12}$$

The meaning of the lower limit of Condition (12) is the same as in Condition (10).

Therefore, by causing independent displacement of a stop surface during zooming, and placing the stop surface as close to the deformable reflecting surface as possible, the effective beam diameter of the deformable reflecting surface can be minimized.

It is also desirable to reduce an angle of incidence of a light beam on the deformable reflecting surface by use of a folded prism, permitting minimization of the effective beam diameter of the deformable reflecting surface.

For the purpose of offsetting eccentric aberration produced by the deformable reflecting surface, the refractive and reflecting surfaces of the prism may be composed of free-formed surfaces.

If an arrangement is made so that the direction of the shorter side of an image sensor is in parallel with the direction of decentering of the deformable reflecting surface, the effective beam diameter of the deformable reflecting surface can be reduced, and this is advantageous for aberration for correction. For a favorable merit in designing a digital camera or the like, the direction of the longer side of the image sensor may be arranged so as to be in parallel with the direction of decentering of the deformable reflecting surface.

It is desirable to adopt a configuration in which the deformable reflecting surface is a free-formed surface, because of the possibility to reduce the amount of produced eccentric aberration.

When adopting a configuration in which the deformable reflecting surface is deformed into a shape correcting deterioration of optical performance caused by a manufacturing error of the lens, it is possible to largely reduce the number of rejections, thus permitting inhibition of the manufacturing cost.

Furthermore, even when the zooming optical system is constructed to provide the deformable reflecting surface with only the function of the compensator and to bring about a pan-focus condition through the other lens units, it is possible to achieve a more compact size and a lower cost.

The term the free-formed surface used in the present invention is defined by the following equation. The Z axis in this defining equation constitutes an axis of the free-formed surface.

$$Z = cr^2 / \left[1 + \sqrt{\{1 - (1+k)c^2 r^2\}}\right] + \sum_{j=2}^{66} C_j X^m Y^n \tag{13}$$

where, the first term of this equation is a spherical surface term, and the second term is a free-formed surface term.

In the spherical surface term,
c: curvature of the vertex,
k: conic constant, $$r = \sqrt{(X^2 + Y^2)}$$

The free-formed surface term is as follows:

$$\sum_{j=2}^{66} C_j X^m Y^n = C_2 X + C_3 Y + C_4 X^2 + C_5 XY + C_6 Y^2 +$$

$$C_7 X^3 + C_8 X^2 Y + C_9 XY^2 + C_{10} Y^3 + C_{11} X^4 +$$

$$C_{12} X^3 Y + C_{13} X^2 Y^2 + C_{14} XY^3 + C_{15} Y^4 +$$

$$C_{16} X^5 + C_{17} X^4 Y + C_{18} X^3 Y^2 + C_{19} X^2 Y^3 +$$

$$C_{20} XY^4 + C_{21} Y^5 + C_{22} X^6 + C_{23} X^5 Y + C_{24} X^4 Y^2 +$$

$$C_{25} X^3 Y^3 + C_{26} X^2 Y^4 + C_{27} XY^5 + C_{28} Y^6 +$$

$$C_{29} X^7 + C_{30} X^6 Y + C_{31} X^5 Y^2 + C_{32} X^4 Y^3 +$$

$$C_{33} X^3 Y^4 + C_{34} X^2 Y^5 + C_{35} XY^6 + C_{36} Y^7 \ldots$$

where, $C_j$ (j is an integer of 2 or larger) is a coefficient.

The above-mentioned free-formed surface never generally has a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms to 0, a free-formed surface having only one symmetrical surface parallel to the X-Z plane is obtained.

As another defining equation of the free-formed surface which is a surface of a rotationally asymmetrical curved shape, it is possible to define the same by a Zernike polynomial. The shape of this surface is defined by means of the following Equation (14). The Z axis of this Equation (14) constitutes the axis of the Zernike polynomial. The rotationally asymmetrical surface is defined by means of polar coordinates of the axial height of Z relative to the X-Y plane, where A represents the distance from the Z axis within the X-Y plane and R represents the azimuth around the Z axis, expressed by the rotational angle as measured from the Z axis.

$$x = R \times \cos(A)$$
$$y = R \times \sin(A) \tag{14}$$

$$Z = D_2 + D_3 R\cos(A) + D_4 R\sin(A) +$$
$$D_5 R^2 \cos(2A) + D_6(R^2 - 1) + D_7 R^2 \sin(2A) +$$
$$D_8 R^3 \cos(3A) + D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) + D_{28}(6R^6 - 5R^4)\sin(4A) +$$
$$D_{29} R^6 \sin(6A)$$

where $D_m$ (m is 2 or larger integer) is a coefficient. In order to design an optical system symmetric in the X axis direction, it is recommendable to use $D_4$, $D_5$, $D_6$, $D_{10}$, $D_{11}$, $D_{13}$, $D_{14}$, $D_{20}$, $D_{21}$, $D_{22}$ . . . .

The above-mentioned definition equation is shown only as an example of the surface of the rotationally asymmetrical curved surface. It is therefore needless to mention that the same effect is available from any other definition equation. The curved surface shape may be expressed by any other definition so far as it provides mathematically the same value.

In the present invention, by bringing all the odd number terms of x in Equation (13), there is available a free-formed surface having a symmetric surface parallel to the y-z plane.

The embodiments of the present invention will now be described with reference to the drawings.

In the following description, DM means a deformable reflecting surface; FFS, a free-formed surface; WE, the wide-angle position; ST, a state at the middle position; TE, the telephoto position; and So, an objective distance.

For the eccentric surface, there are given an amount of decentering (X axis direction, Y axis direction and Z axis direction are expressed as X, Y and Z, respectively), and a center axis of the surface (for a free-formed surface, an inclination angle with the Z axis in the above-mentioned formula (13) as the center (referred to as α, β and γ (°)). In this case, positive α, β and γ mean a counterclockwise rotation relative to the positive direction of the respective axes.

After decentering in the X, Y and Z directions, the coordinate system is rotated in a sequence of from α, β and then γ. This coordinate system serves as local coordinates of the mirror surface. Subsequently, the coordinate system is rotated in a sequence of from α, β and then γ again to define the coordinate system for the reflected light.

When only the inclination of the reflecting surface is shown, an inclination angle of the center axis of the surface is given as an amount of decentering.

Terms regarding free-formed surfaces and aspherical surfaces of which data are not written take a value 0. The refractive index is shown for d line (wavelength: 587.56 nm). The unit of length is mm.

When the direction of the optical axis direction is denoted by z, a direction perpendicular to the optical axis is denoted by y, the conical coefficient is denoted by k, and the aspherical coefficients are denoted by a, b, c, and d, the shape of an aspherical surface is expressed by the following equation:

$$z = (y^2/r)/[1+\{1-(1+k)\cdot(y/r)^2\}^{1/2}] + ay^4 + by^6 + cy^8 + dy^{10} \tag{15}$$

The description of the above-mentioned numerical data is common to all numerical data of the embodiments of the present invention.

First Embodiment

Figure 1B:
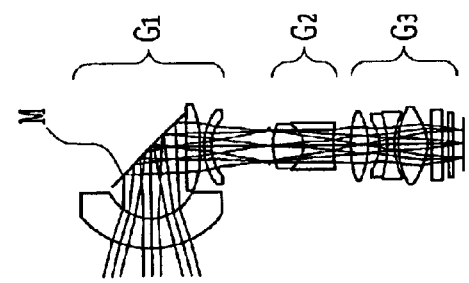
Figure 1A:
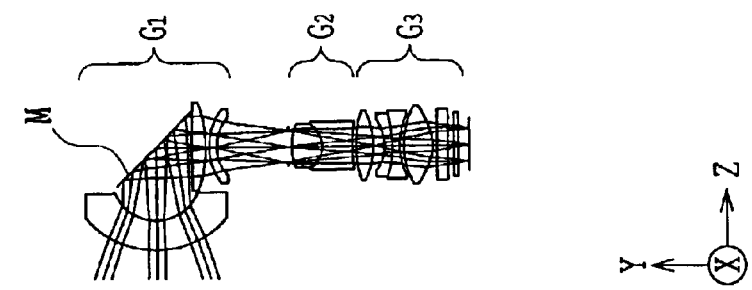

FIGS. 1A–1C show lens arrangements of a zooming optical system in the first embodiment of the present invention. The zooming optical system of the first embodiment comprises, in order from the object side, a first unit G1 having negative power, a second unit G2 having positive power, and a third unit G3 having positive power. In this configuration, a variable magnification function is imparted by moving the second unit G2, and the resulting focal shift can be corrected via a reflecting surface of a deformable mirror M provided in the first unit G1.

The design values of the zooming optical system of the first embodiment include a focal length of from 6.0 to 12.0 mm, a released F number of from 2.8 to 3.6 mm, an imaging plane size of from 5.3 mm×4.0 mm, a horizontal view angle at the wide-angle position of 47.66°, a vertical view angle of 36.87°, horizontal view angle at the telephoto position of 24.91°, and a vertical view angle of 28.07°.

Figure 2A:
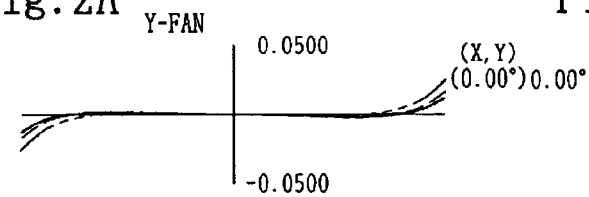
FIGS. 2A, 2B, 2C, 2D, 2E, 2F, 2G, 2H, 2I, 2J, 2K and 2L are diagrams showing transverse aberrations in various wavelength regions at the wide-angle position in the first embodiment.
Figure 2B:
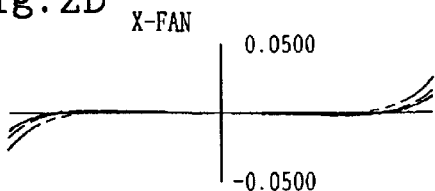
Figure 2C:
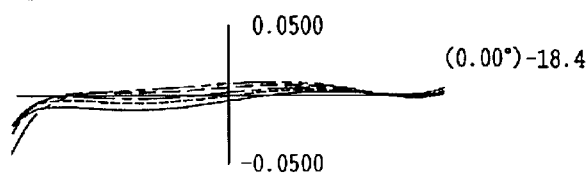
Figure 2D:
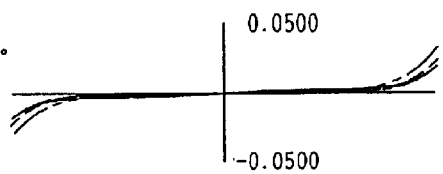
Figure 2E:
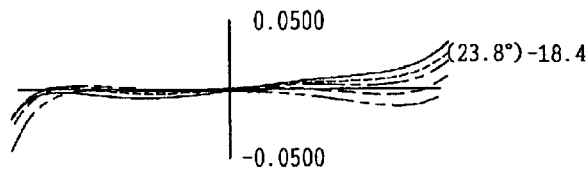
Figure 2F:
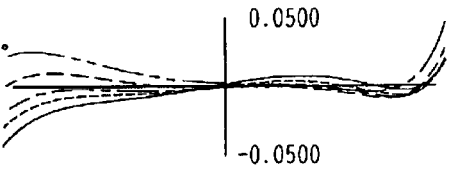
Figure 2G:
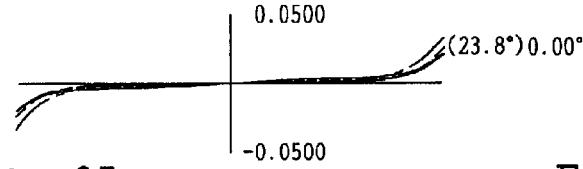
Figure 2H:
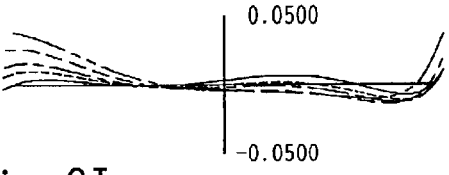
Figure 2I:
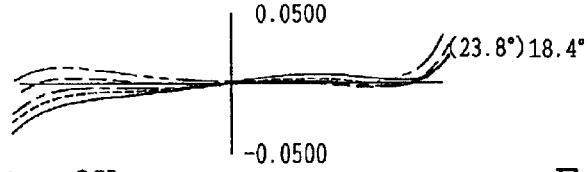
Figure 2J:
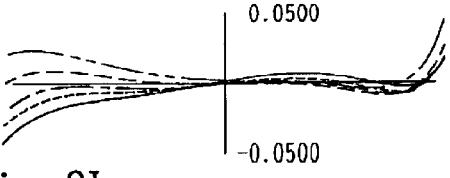
Figure 2K:
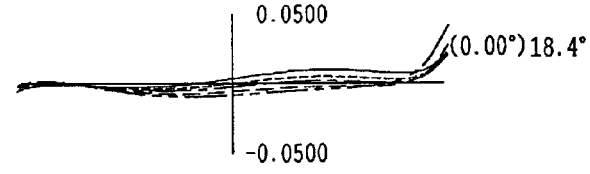
Figure 2L:
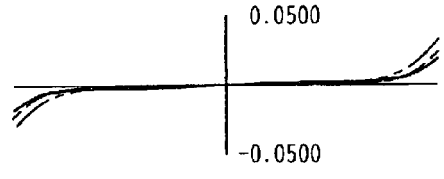
Figure 5:
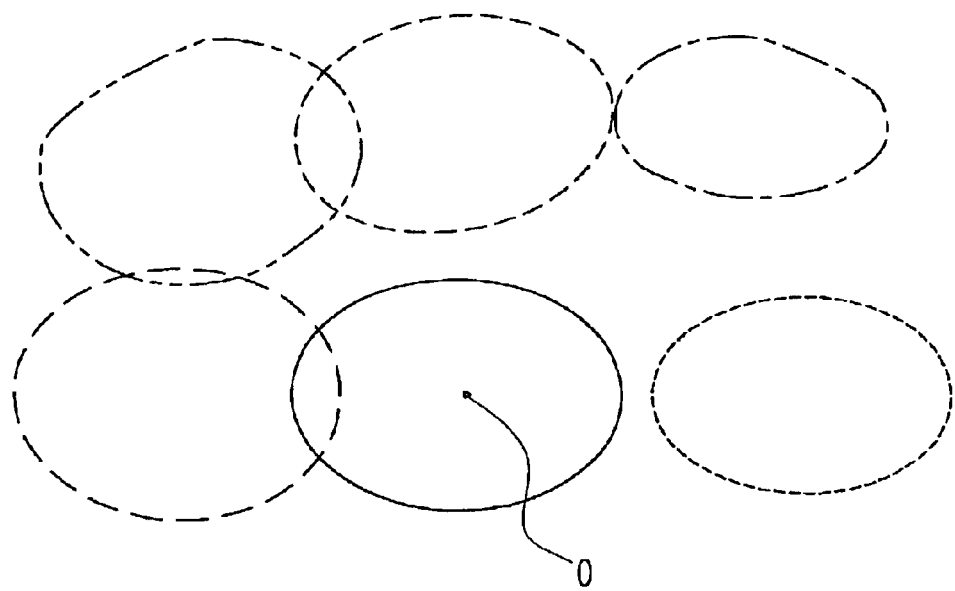
FIG. 5 is an explanatory view illustrating a state of light incident on a deformable reflecting surface in various wavelength regions at the wide-angle position in the first embodiment.
Figure 9A:
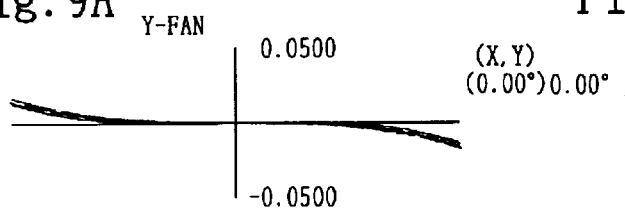
FIGS. 9A, 9B, 9C, 9D, 9E, 9F, 9G, 9H, 9I, 9J, 9K and 9L are diagrams showing transverse aberrations in various wavelength regions at the wide-angle position in the second embodiment.
Figure 9B:
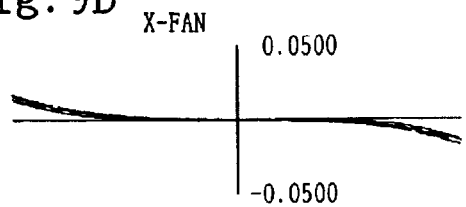
Figure 9C:
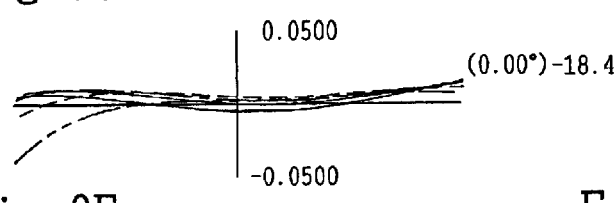
Figure 9D:
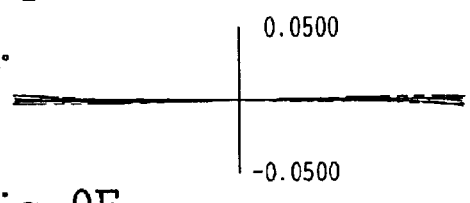
Figure 9E:
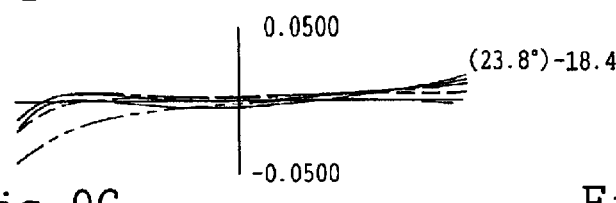
Figure 9F:
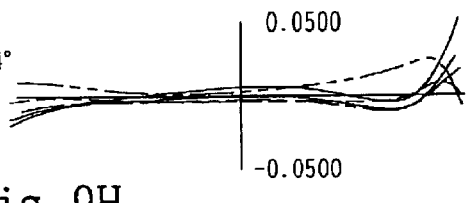
Figure 9G:
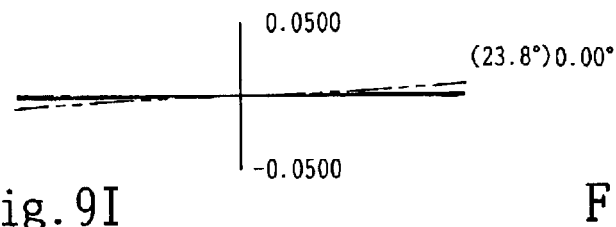
Figure 9H:
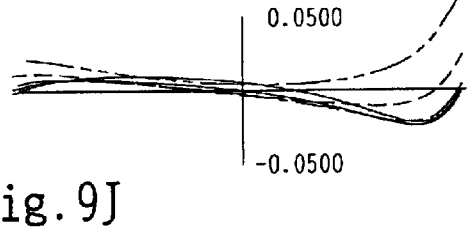
Figure 9I:
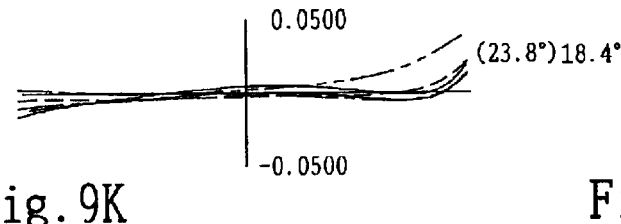
Figure 9J:
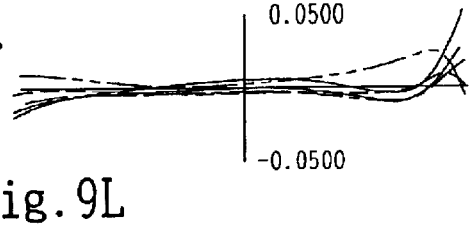
Figure 9K:
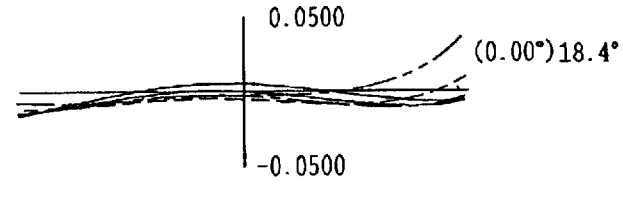
Figure 9L:
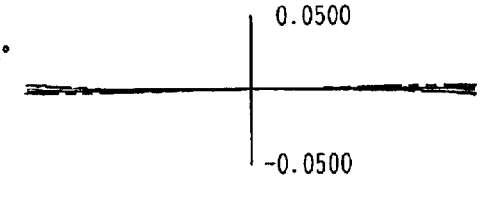

Numerical data and values of the conditions in the first embodiment will now be shown. The aberration diagrams illustrating transverse aberrations in various wave-length regions at the wide-angle, middle, and telephoto positions in the first embodiment are shown in FIGS. 2A–4L, and descriptive views illustrating the light incident on the deformable reflecting surface are shown in FIGS. 5–7. In FIGS. 2A–4L, FIGS. 2A, 3A, and 4A show transverse aberrations of a chief ray in the Y direction passing through an X direction view angle of 0 and a Y direction view angle of 0; FIGS. 2B, 3B, and 4B, transverse aberrations of the chief ray in the X direction passing through an X direction view angle of 0 and a Y direction view angle of 0; FIGS. 2C, 3C, and 4C, transverse aberrations of the chief ray in the Y direction passing through an X direction view angle of 0, and a Y negative direction maximum view angle; FIGS. 2D, 3D, and 4D, transverse aberrations of the chief ray in the X direction passing through an X direction view angle of 0 and a Y negative direction maximum view angle; FIGS. 2E, 3E, and 4E, transverse aberrations of the chief ray in the Y direction passing through the X positive direction maximum view angle and the Y negative direction maximum view angle; FIGS. 2F, 3F, and 4F, transverse aberrations of the chief ray in the X direction passing through the X positive direction maximum view angle; FIGS. 2G, 3G, and 4G, transverse aberrations of the chief ray in the Y direction passing through the X positive direction maximum view angle and a Y direction view angle of 0; FIGS. 2H, 3H, and 4H, transverse aberrations of the chief ray in the X direction passing through the X positive direction maximum view angle and a Y direction view angle of 0; FIGS. 2I, 3I, and 4I, transverse aberrations of the chief ray in the Y direction passing through the X positive direction maximum view angle and the Y positive direction maximum view angle; FIGS. 2J, 3J, and 4J, transverse aberrations of the chief ray in the X direction passing through the X positive direction maximum view angle and the Y positive direction maximum view angle; FIGS. 2K, 3K, and 4K, transverse aberrations of the chief ray in the X direction passing through an X direction view angle of 0 and the Y positive direction maximum view angle; and FIGS. 2L, 3L, and 4L, transverse aberrations of the chief ray in the X direction passing through an X direction view angle of 0 and the Y positive direction maximum view angle. In FIGS. 5–7, reference symbol O represents the center of the deformable reflecting surface. The above description of the aberration diagrams is common to all the aberration diagrams in the embodiments of the present invention.

Numerical data 1

| Face No. | Radius of curvature | Face interval | Eccentricity | Refractive index | Abbe's number |
|---|---|---|---|---|---|
| Object surface | ∞ | ∞ | | | |
| 1 | 12.07 | 4.00 | | 1.7725 | 49.6 |
| 2 | 5.96 | 9.56 | | | |
| 3 | FFS[1] (DM) | −4.70 | Eccentricity (1) | | |
| 4 | −170.38 | −1.81 | | 1.6968 | 55.5 |
| 5 | Aspherical [1] | −0.50 | | | |
| 6 | −7.91 | −1.00 | | 1.6086 | 36.1 |
| 7 | −5.61 | D1 | | | |
| 8 | Stop surface | −0.50 | | | |
| 9 | −7.98 | −4.00 | | 1.7912 | 28.4 |
| 10 | −5.61 | −4.00 | | 1.8467 | 23.8 |
| 11 | −15.49 | D2 | | | |
| 12 | Aspherical [2] | −2.27 | | 1.7726 | 43.6 |
| 13 | 10.71 | −1.49 | | | |
| 14 | 5.84 | −1.00 | | 1.8329 | 26.1 |
| 15 | 14.65 | −1.00 | | 1.6906 | 29.5 |
| 16 | −9.07 | −0.53 | | | |
| 17 | −10.87 | −3.79 | | 1.7674 | 49.9 |
| 18 | Aspherical [3] | −0.50 | | | |
| 19 | ∞ | −1.44 | | 1.5477 | 62.8 |
| 20 | ∞ | −0.80 | | | |
| 21 | ∞ | −0.60 | | 1.5163 | 64.1 |
| 22 | ∞ | −1.38 | | | |
| Image plane | ∞ | 0.00 | | | |

Aspherical [1]

Radius of curvature: 26.41
$k = 0.0000 \times 10^0$
$a = 3.6555 \times 10^{-4}$   $b = -6.4240 \times 10^{-7}$   $c = -4.7211 \times 10^{-8}$
$d = 5.9844 \times 10^{-10}$

Aspherical [2]

Radius of curvature: −18.21
$k = 0.0000 \times 10^0$
$a = -7.4468 \times 10^{-5}$   $b = -1.8085 \times 10^{-5}$   $c = -5.1569 \times 10^{-7}$
$d = 3.4693 \times 10^{-8}$

Aspherical [3]

Radius of curvature: 5.37
$k = 0.0000 \times 10^0$
$a = -2.5655 \times 10^{-3}$   $b = 4.9251 \times 10^{-5}$   $c = -1.5318 \times 10^{-6}$
$d = -1.9138 \times 10^{-8}$

Eccentricity (1)

$X = 0.00$   $Y = 0.00$   $Z = 0.00$
$\alpha = 45.00$   $\beta = 0.00$   $\gamma = 0.00$

Numerical data 1 (continued)

[WE]
D1: −9.47
D2: −0.51

FFS [1]

$C_4 = 0.0000 \times 10^0$   $C_6 = 0.0000 \times 10^0$   $C_8 = 0.0000 \times 10^0$
$C_{10} = 0.0000 \times 10^0$   $C_{11} = 0.0000 \times 10^0$   $C_{13} = 0.0000 \times 10^0$
$C_{15} = 0.0000 \times 10^0$

[ST]
D1: −7.68
D2: −2.30

FFS [1]

$C_4 = -3.6528 \times 10^{-4}$   $C_6 = -4.0771 \times 10^{-5}$   $C_8 = -3.6985 \times 10^{-6}$
$C_{10} = -2.5020 \times 10^{-7}$   $C_{11} = -8.7318 \times 10^{-6}$   $C_{13} = -8.2266 \times 10^{-6}$
$C_{15} = -4.8478 \times 10^{-6}$

[TE]
D1: −0.94
D2: −9.04

FFS [1]

$C_4 = 5.5060 \times 10^{-5}$   $C_6 = -3.2403 \times 10^{-5}$   $C_8 = 3.2557 \times 10^{-5}$
$C_{10} = 5.2688 \times 10^{-6}$   $C_{11} = -8.3582 \times 10^{-5}$   $C_{13} = -7.7416 \times 10^{-5}$
$C_{15} = -1.8438 \times 10^{-5}$ Values of the conditions

[WE]
$|\o x/\phi| = 0.0000$
$|\o y/\phi| = 0.0000$
$|\eta| = 0.81$
$D = 13.00$ mm

[ST]
$|\o x/\phi| = 0.00307$
$|\o y/\phi| = 0.00034$
$|\eta| = 0.86$
$D = 11.11$ mm

[TE]
$|\o x/\phi| = 0.00069$
$|\o y/\phi| = 0.00041$
$|\eta| = 1.18$
$D = 8.07$ mm Second Embodiment FIGS. 8A–8C show lens arrangements of the zooming optical system in the second embodiment of the present invention. The zooming optical system of the second embodiment comprises, in order from the object side, a first unit G1 having negative power, a second unit G2 only with a stop surface, a third unit G3 having positive power, and a fourth unit G4 having positive power. The variable magnification function is imparted by moving the third unit G3, and a focal shift caused thereby can be corrected via the reflecting surface of the deformable mirror M provided in the first unit G1. In the second embodiment, an arrangement is such that a pupil position is shifted to keep a small mirror diameter.

The design values of the zooming optical system of the second embodiment include a focal length of from 6.0 to 12.0 mm, a release F number of from 2.8 to 4.3 mm, an imaging plane size of 5.3×4.0 mm, a horizontal view angle of 47.66° at the wide-angle position, a vertical view angle of 36.87°, a horizontal view angle of 24.91° at the telephoto position, and a vertical view angle of 28.07 mm.

Figure 13:
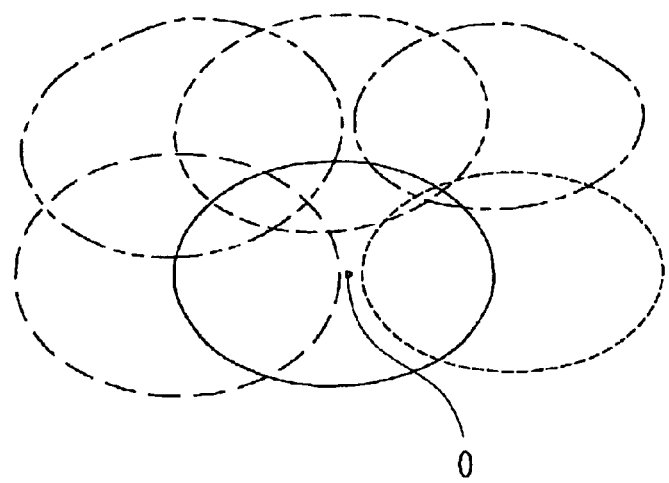
FIG. 13 is an explanatory view illustrating a state of light incident on the deformable reflecting surface in various wavelength regions at the middle position in the second embodiment.

Numerical data and values of the conditions of the zooming optical system of the second embodiment will now be shown. The aberration diagrams showing transverse aberrations in various wavelength regions at the wide-angle, middle, and telephoto positions of the imaging optical system of the second embodiment are illustrated in FIGS. 9A–11L, and descriptive views illustrating the light incident on the deformable reflecting surface are shown in FIGS. 12–14.

| \multicolumn{6}{c}{Numerical data 2} | | | | | |
|---|---|---|---|---|---|
| Face No. | Radius of curvature | Face interval | Eccentricity | Refractive index | Abbe's number |
| Object surface | ∞ | ∞ | | | |
| 1 | 11.98 | 4.00 | | 1.7910 | 38.4 |
| 2 | 4.65 | 6.61 | | | |
| 3 | FFS[1] (DM) | −4.00 | Eccentricity (1) | | |
| 4 | 15.85 | −1.54 | | 1.7725 | 49.6 |
| 5 | Aspherical [1] | −0.50 | | | |
| 6 | −18.66 | −1.00 | | 1.8304 | 26.6 |
| 7 | −12.10 | D1 | | | |
| 8 | Stop surface | D2 | | | |
| 9 | −14.10 | −6.16 | | 1.7173 | 30.0 |
| 10 | 7.67 | −1.00 | | 1.8467 | 23.8 |
| 11 | −84.69 | D3 | | | |
| 12 | Aspherical [2] | −3.93 | | 1.7754 | 47.4 |
| 13 | 39.06 | −3.25 | | | |
| 14 | 11.87 | −1.00 | | 1.7346 | 27.7 |
| 15 | 49.79 | −1.00 | | 1.8467 | 23.8 |
| 16 | −7.44 | −0.54 | | | |
| 17 | −8.64 | −3.97 | | 1.6820 | 56.1 |
| 18 | Aspherical [3] | −0.57 | | | |
| 19 | ∞ | −1.44 | | 1.5477 | 62.8 |
| 20 | ∞ | −0.80 | | | |
| 21 | ∞ | −0.60 | | 1.5163 | 64.1 |
| 22 | ∞ | −1.38 | | | |
| Image plane | ∞ | | | | |

Aspherical [1]

Radius of curvature: 8.13
$k = 0.0000 \times 10^0$
$a = -2.4592 \times 10^{-5}$   $b = 7.1762 \times 10^{-6}$   $c = -3.8853 \times 10^{-5}$
$d = 7.7225 \times 10^{-9}$ Aspherical [2]

Radius of curvature: −13.07
$k = 0.0000 \times 10^0$
$a = -6.6592 \times 10^{-5}$   $b = 2.1610 \times 10^{-6}$   $c = -7.2551 \times 10^{-8}$
$d = 5.5059 \times 10^{-10}$ Aspherical [3]

Radius of curvature: 6.01
$k = 0.0000 \times 10^0$
$a = -2.6909 \times 10^{-3}$   $b = 7.0023 \times 10^{-5}$   $c = -1.7726 \times 10^{-6}$
$d = 1.3787 \times 10^{-10}$ Eccentricity (1)

$X = 0.00$   $Y = 0.00$   $Z = 0.00$
$\alpha = 45.00$   $\beta = 0.00$   $\gamma = 0.00$
[WE]
D1: −3.61
D2: −13.97
D3: −0.50

FFS [1]

$C_4 = 0.0000 \times 10^0$   $C_6 = 0.0000 \times 10^0$   $C_8 = 0.0000 \times 10^0$
$C_{10} = 0.0000 \times 10^0$   $C_{11} = 0.0000 \times 10^0$   $C_{13} = 0.0000 \times 10^0$
$C_{15} = 0.0000 \times 10^0$
[ST]
D1: −7.87
D2: −5.94
D3: −4.27

FFS [1]

$C_4 = -3.1575 \times 10^{-4}$   $C_6 = 5.4047 \times 10^{-6}$   $C_8 = -1.4554 \times 10^{-5}$
$C_{10} = -5.4077 \times 10^{-6}$   $C_{11} = -1.0082 \times 10^{-6}$   $C_{13} = -3.9100 \times 10^{-7}$
$C_{15} = -5.3885 \times 10^{-6}$
[TE]
D1: −0.69
D2: −0.50
D3: −16.89

FFS [1]

$C_4 = -1.5681 \times 10^{-4}$   $C_6 = -1.3345 \times 10^{-4}$   $C_8 = -9.7877 \times 10^{-6}$ -continued Numerical data 2

$C_{10} = -3.0864 \times 10^{-6}$   $C_{11} = -6.5207 \times 10^{-5}$   $C_{13} = -7.6455 \times 10^{-5}$
$C_{15} = -9.9537 \times 10^{-6}$
Values of the conditions
[WE]
$|\phi x/\phi| = 0.0000$
$|\phi y/\phi| = 0.0000$
$|\eta| = 0.82$
D = 9.20 mm
[ST]
$|\phi x/\phi| = 0.00265$
$|\phi y/\phi| = 0.00005$
$|\eta| = 0.89$
D = 9.27 mm
[TE]
$|\phi x/\phi| = 0.00198$
$|\phi y/\phi| = 0.00168$
$|\eta| = 1.20$
D = 6.40 mm Third Embodiment FIGS. 15A–15C show lens arrangements of the zooming optical system in the third embodiment of the present invention. The zooming optical system of the third embodiment comprises, in order from the object side, a first unit G1 having negative power, a second unit G2 having positive power, and a third unit G3 having positive power. The variable magnification function is imparted by moving the second unit G2, and a focal shift caused thereby can be corrected via a reflecting surface of the deformable mirror M provided in the first unit G1. In the third embodiment, a prism P is provided in the first unit G1 to reduce the mirror diameter so that an angle of incidence on the reflecting surface of the deformable mirror M becomes small. It is desirable that the angle of incidence is 55° or smaller, preferably 40° or smaller.

The design values of the zooming optical system of the third embodiment include a focal length of from 6.0 to 12.0 mm, a release F number of from 2.8 to 3.8 mm, an imaging plane size of 5.3×4.0 mm, a horizontal view angle of 47.66° at the wide-angle position, a vertical view angle of 36.87°, a horizontal view angle of 24.91° at the telephoto position, and a vertical view angle of 28.07°.

Figure 20:
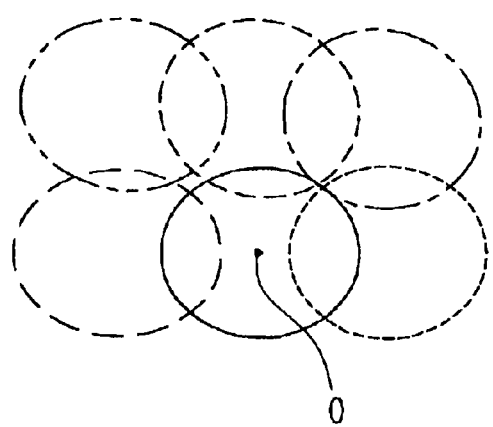
FIG. 20 is an explanatory view illustrating a state of light incident on the deformable reflecting surface in various wavelength regions at the middle position in the third embodiment.

Numerical data and values of the conditions for the zooming optical system of the third embodiment will now be shown. Aberration diagrams illustrating transverse aberrations in various wavelength regions at the wide-angle, middle, and telephoto positions of the imaging optical system of the third embodiment are shown in FIGS. 16A–18L. Descriptive views illustrating the light incident on the deformable reflecting surface are shown in FIGS. 19–21.

In the third embodiment, the origin of decentering is positioned at the origin of coordinates of the third plane, and the ninth and subsequent planes, the eccentric (1) is used as the coordinate origin.

| \multicolumn{6}{c}{Numerical data 3} | | | | | |
|---|---|---|---|---|---|
| Face No. | Radius of curvature | Face interval | Eccentricity | Refractive index | Abbe's number |
| Object surface | ∞ | ∞ | | | |
| 1 | 15.38 | 3.80 | | 1.7368 | 52.0 |
| 2 | 7.14 | 3.42 | | | |

-continued

Numerical data 3

| | | | | | |
|---|---|---|---|---|---|
| 3 | FFS[1] | 0.00 | | 1.5254 | 56.2 |
| 4 | ∞ | 0.00 | Eccentricity (1) | 1.5254 | 56.2 |
| 5 | FFS[2] | 0.00 | Eccentricity (2) | | |
| 6 | FFS[3] | 0.00 | Eccentricity (3) | | |
| 7 | FFS[2] | 0.00 | Eccentricity (2) | 1.5254 | 56.2 |
| 8 | ∞ | 0.50 | Eccentricity (1) | | |
| 9 | 6.33 | 1.00 | | 1.6567 | 57.2 |
| 10 | Aspherical [1] | 1.22 | | | |
| 11 | 9.80 | 1.23 | | 1.8466 | 23.8 |
| 12 | 16.88 | D1 | | | |
| 13 | Stop surface | 0.50 | | | |
| 14 | 6.30 | 3.80 | | 1.7748 | 32.0 |
| 15 | −2.65 | 3.80 | | 1.8466 | 23.8 |
| 16 | 26.15 | D2 | | | |
| 17 | Aspherical [2] | 1.03 | | 1.4907 | 67.5 |
| 18 | 5.26 | 3.30 | | | |
| 19 | 7.19 | 3.64 | | 1.7612 | 49.9 |
| 20 | −30.76 | 1.00 | | 1.8459 | 23.8 |
| 21 | 16.83 | 0.56 | | | |
| 22 | 18.17 | 2.19 | | 1.6821 | 56.1 |
| 23 | Aspherical [3] | 0.50 | | | |
| 24 | ∞ | 1.44 | | 1.5477 | 62.8 |
| 25 | ∞ | 0.80 | | | |
| 26 | ∞ | 0.60 | | 1.5163 | 64.1 |
| 22 | ∞ | 1.39 | | | |
| Image plane | ∞ | 0.00 | | | |

Aspherical [1]

Radius of curvature: 3.91
$k = 0.0000 \times 10^0$
$a = -1.2268 \times 10^{-3}$  $b = -2.1917 \times 10^{-4}$  $c = 1.6701 \times 10^{-5}$
$d = -1.1442 \times 10^{-6}$ Aspherical [2]

Radius of curvature: 161.20
$k = 0.0000 \times 10^0$
$a = 1.0967 \times 10^{-3}$  $b = 1.8687 \times 10^{-5}$  $c = 6.3331 \times 10^{-6}$
$d = -3.1901 \times 10^{-7}$ Aspherical [3]

Radius of curvature: −5.27
$k = 0.0000 \times 10^0$
$a = 5.7769 \times 10^{-3}$  $b = -1.9362 \times 10^{-4}$  $c = 8.0712 \times 10^{-6}$
$d = -4.6917 \times 10^{-8}$

FFS [1]

$C_4 = 7.7408 \times 10^{-3}$  $C_6 = 1.2130 \times 10^{-2}$  $C_8 = -9.5088 \times 10^{-5}$
$C_{10} = 4.9058 \times 10^{-5}$  $C_{11} = 6.6613 \times 10^{-5}$  $C_{13} = -1.5596 \times 10^{-6}$
$C_{15} = 4.3465 \times 10^{-5}$

FFS [2]

$C_4 = -3.8674 \times 10^{-4}$  $C_6 = -4.3299 \times 10^{-4}$  $C_8 = 5.3805 \times 10^{-5}$ Eccentricity (1)

$X = 0.00$  $Y = 2.50$  $Z = 12.80$
$\alpha = -60.00$  $\beta = 0.00$  $\gamma = 0.00$ Eccentricity (2)

$X = 0.00$  $Y = 4.57$  $Z = 11.60$
$\alpha = -90.00$  $\beta = 0.00$  $\gamma = 0.00$ Eccentricity (3)

$X = 0.00$  $Y = 4.76$  $Z = 11.36$
$\alpha = -90.00$  $\beta = 0.00$  $\gamma = 0.00$
[WE]
D1: 6.09
D2: 0.54

FFS [3]

$C_4 = 0.0000 \times 10^0$  $C_6 = 0.0000 \times 10^0$  $C_8 = 0.0000 \times 10^0$
$C_{10} = 0.0000 \times 10^0$  $C_{11} = 0.0000 \times 10^0$ -continued Numerical data 3

$C_{13} = 0.0000 \times 10^0$
$C_{15} = 0.0000 \times 10^0$
[ST]
D1: 4.94
D2: 1.69

FFS [3]

$C_4 = -3.1791 \times 10^{-4}$  $C_6 = -1.1944 \times 10^{-3}$  $C_8 = -1.5277 \times 10^{-5}$
$C_{10} = 3.3405 \times 10^{-5}$  $C_{11} = 6.2822 \times 10^{-6}$  $C_{13} = 4.5325 \times 10^{-5}$
$C_{15} = 4.3404 \times 10^{-5}$
[TE]
D1: 0.57
D2: 6.06

FFS [3]

$C_4 = -9.6676 \times 10^{-4}$  $C_6 = -1.5055 \times 10^{-3}$  $C_8 = -1.9864 \times 10^{-5}$
$C_{10} = 1.6222 \times 10^{-5}$  $C_{11} = 1.3029 \times 10^{-4}$  $C_{13} = 2.7205 \times 10^{-4}$
$C_{15} = 9.9496 \times 10^{-5}$ Values of the conditions

[WE]
$|\phi x/\phi| = 0.0000$
$|\phi y/\phi| = 0.0000$
$|\eta| = 0.69$
$D = 9.20$ mm
[ST]
$|\phi x/\phi| = 0.00267$
$|\phi y/\phi| = 0.01004$
$|\eta| = 0.81$
$D = 7.08$ mm
[TE]
$|\phi x/\phi| = 0.01219$
$|\phi y/\phi| = 0.01899$
$|\eta| = 1.11$
$D = 4.89$ mm Fourth Embodiment FIG. 22A–22C show lens arrangements of the zooming optical system in the fourth embodiment of the present invention. The zooming optical system of the fourth embodiment comprises, in order from the object side, a first unit G1 having negative power, a second unit G2 having positive power, a third unit G3 having positive power, and a fourth unit G4 having positive power. The variable magnification function is imparted by moving the second unit G2, and a focal shift caused thereby can be corrected by moving the third unit G3. In this configuration, focusing can be performed via the reflecting surface of the deformable mirror M provided in the first unit G1.

Design values for the zooming optical system of the fourth embodiment include a focal length of from 6.1 to 14.3 mm, a release F number of from 2.8 to 4.2 mm, an imaging plane size of 5.3×4.0 mm, a horizontal view angle of 47.31° at the wide-angle position, a vertical view angle of 36.59°, a horizontal view angle of 21.07° at the telephoto position, and a vertical view angle of 15.98°.

Figure 28:
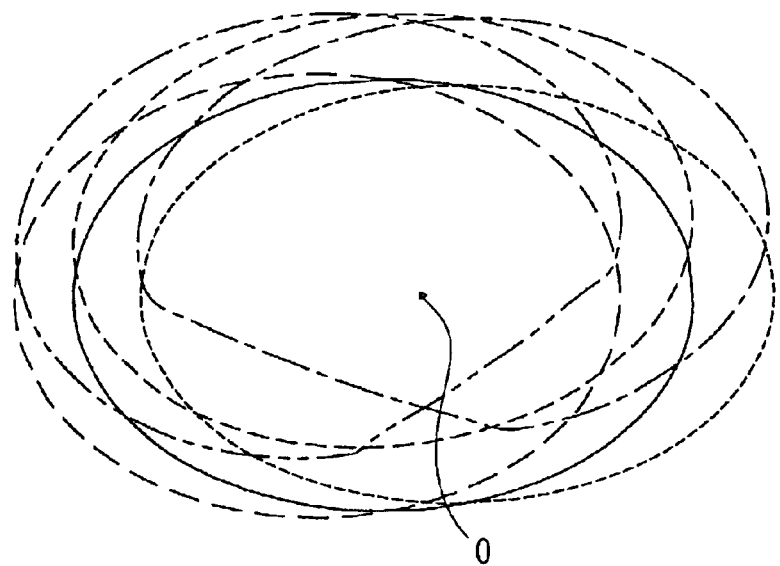
FIG. 28 is an explanatory view illustrating a state of light incident on the deformable reflecting surface in various wavelength regions at the telephoto position in the fourth embodiment.

Numerical data and values of the conditions for the zooming optical system of the fourth embodiment will now be shown. Aberration diagrams illustrating transverse aberrations in various wavelength regions at the wide-angle, middle, and telephoto positions of the imaging optical system of the fourth embodiment are shown in FIGS. 23A–25L. Descriptive views illustrating the light incident on the deformable reflecting surface are shown in FIGS. 26–28.

Numerical data 4

| Face No. | Radius of curvature | Face interval | Eccentricity | Refractive index | Abbe's number |
|---|---|---|---|---|---|
| Object surface | ∞ | ∞ | | | |
| 1 | 28.08 | 1.50 | | 1.7725 | 49.6 |
| 2 | 7.72 | 9.50 | | | |
| 3 | FFS[1] | −5.89 | Eccentricity (1) | | |
| 4 | 12.26 | −1.00 | | 1.7725 | 49.6 |
| 5 | Aspherical [1] | −1.23 | | | |
| 6 | −11.87 | −5.93 | | 1.7697 | 26.0 |
| 7 | −26.90 | D1 | | | |
| 8 | Stop surface | −0.50 | | | |
| 9 | −19.52 | −6.00 | | 1.6909 | 55.7 |
| 10 | 8.52 | −1.00 | | 1.7927 | 37.7 |
| 11 | 38.37 | D2 | | | |
| 12 | Aspherical [2] | −6.00 | | 1.7135 | 53.9 |
| 13 | 14.55 | −0.75 | | | |
| 14 | 18.27 | −1.22 | | 1.8182 | 29.3 |
| 15 | −58.64 | −1.05 | | 1.7454 | 51.4 |
| 16 | −57.48 | D3 | | | |
| 17 | −53.58 | −6.00 | | 1.4878 | 70.1 |
| 18 | Aspherical [3] | −0.50 | | | |
| 19 | ∞ | −1.44 | | 1.5477 | 62.8 |
| 20 | ∞ | −0.80 | | | |
| 21 | ∞ | −0.60 | | 1.5163 | 64.1 |
| 22 | ∞ | −1.34 | | | |
| Image plane | ∞ | 0.00 | | | |

Aspherical [1]

Radius of curvature: −6.52
$k = -8.4413 \times 10^{-1}$
$a = 3.1018 \times 10^{-5}$  $b = -9.0911 \times 10^{-7}$  $c = 4.6008 \times 10^{-8}$
$d = -7.2232 \times 10^{-10}$ Aspherical [2]

Radius of curvature: −26.78
$k = -4.1909 \times 10^{-1}$
$a = 6.8294 \times 10^{-5}$  $b = -1.2811 \times 10^{-7}$  $c = 3.4132 \times 10^{-8}$
$d = -5.8522 \times 10^{-10}$ Aspherical [3]

Radius of curvature: 118.63
$k = -7.3566 \times 10^{3}$
$a = -3.4192 \times 10^{-4}$  $b = -1.2533 \times 10^{-4}$  $c = 1.0897 \times 10^{-5}$
$d = -3.5236 \times 10^{-7}$

FFS [1]

$C_4 = 0.0000 \times 10^0$  $C_6 = 0.0000 \times 10^0$  $C_8 = 0.0000 \times 10^0$
$C_{10} = 0.0000 \times 10^0$  $C_{11} = 0.0000 \times 10^0$  $C_{13} = 0.0000 \times 10^0$
$C_{15} = 0.0000 \times 10^0$ Eccentricity (1)

$X = 0.00$  $Y = 0.00$  $Z = 0.00$
$\alpha = 45.00$  $\beta = 0.00$  $\gamma = 0.00$
[WE/So = ∞]
D1: −14.38
D2: −2.56
D3: −8.20

FFS [1]

$C_4 = 0.0000 \times 10^0$  $C_6 = 0.0000 \times 10^0$  $C_8 = 0.0000 \times 10^0$
[ST/So = ∞]
D1: −6.20
D2: −5.24
D3: −13.70

FFS [1]

$C_4 = 0.0000 \times 10^0$  $C_6 = 0.0000 \times 10^0$  $C_8 = 0.0000 \times 10^0$
[TE/So = ∞]
D1: −0.80
D2: −1.30
D3: −23.04

FFS [1]

$C_4 = 0.0000 \times 10^0$  $C_6 = 0.0000 \times 10^0$  $C_8 = 0.0000 \times 10^0$
[WE/So = 300 mm]
D1: −14.38
D2: −2.56
D3: −8.20

FFS [1]

$C_4 = -3.8497 \times 10^{-4}$  $C_6 = -1.7444 \times 10^{-4}$  $C_8 = -1.3688 \times 10^{-5}$
[ST/So = 300 mm]
D1: −6.20
D2: −5.24
D3: −13.70

FFS [1]

$C_4 = -4.1117 \times 10^{-4}$  $C_6 = -2.0527 \times 10^{-4}$  $C_8 = -1.3655 \times 10^{-7}$
[TE / So = 300 mm ]
D1: −0.80
D2: −1.30
D3: −23.04

FFS [1]

$C_4 = -4.2915 \times 10^{-4}$  $C_6 = -2.1052 \times 10^{-4}$  $C_8 = -1.6682 \times 10^{-5}$
Values of the conditions

[WE/So = ∞ mm]
| ø x/φ | = 0.0000
| ø y/φ | = 0.0000
|η| = 0.67
D = 12.75 mm
[ST/So = ∞ mm]
| ø x/φ | = 0.00000
| ø y/φ | = 0.00000
|η| = 1.06
D = 10.33 mm
[TE/So = ∞ mm]
| ø x/φ | = 0.00000
| ø y/φ | = 0.00000
|η| = 1.60
D = 10.49 mm
[WE/So = 300 mm]
| ø x/φ | = 0.00243
| ø y/φ | = 0.00243
D = 12.75 mm
[ST/So = 300 mm]
| ø x/φ | = 0.00346
| ø y/φ | = 0.00173
D = 10.33 mm
[TE/So = 300 mm]
| ø x/φ | = 0.00541
| ø y/φ | = 0.00265
D = 10.49 mm

In the above-mentioned embodiment, an angle made by axial incident light from an axial object with the axial incident light on the image sensor is 90°±5° or 60°±5°. This brings about a favorable merit of easier mechanical design.

The zooming optical system of the present invention as described above is applicable to a film camera, a digital camera, a TV camera, a camera for personal digital assistants, a monitoring camera, a robot's eye, and an electronic endoscope.

A zooming optical system constructed to have the reflecting surface in the lens units has been described as to the aforementioned zooming optical system. Even in the case of a zooming optical system constructed to have no reflecting surface, it is possible to achieve advantages such as a compact size, a lower cost, power saving, and elimination of noise by using an optical element having a deformable surface such as a variable focal-length lens. A variable focal-length mirror having no deformable surface may be applied to each of the above embodiments. The variable focal-length mirror will be described later with reference to FIG. 54.

A description will be given of the examples of structures of a deformable mirror, a variable focal-length lens, and the like which are applicable to the present invention.

Figure 29:
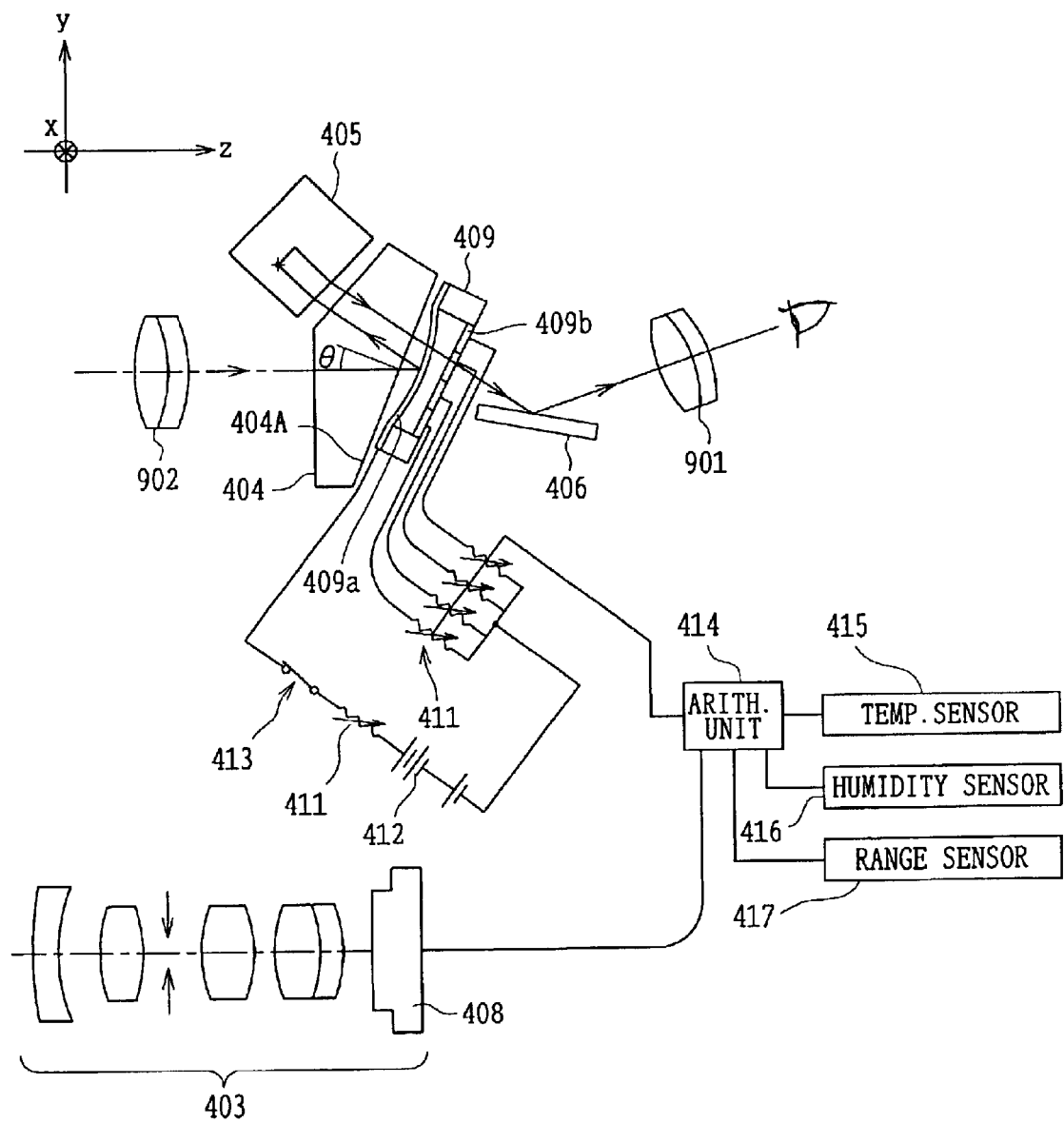
FIG. 29 is a view showing schematically a Keplerian finder for a digital camera using an optical-property mirror as a variable mirror applicable to the present invention.

FIG. 29 shows a Keplerian finder for a digital camera using a variable optical-property mirror as a variable mirror applicable to the zooming optical system of the present invention. It can, of course, be used for a silver halide film camera. Reference is first made to a variable optical-property mirror 409.

The variable optical-property mirror 409 refers to an optical-property deformable able mirror (which is hereinafter simply called a deformable mirror) comprised of a thin film (reflecting surface) 409a coated with aluminum and a plurality of electrodes 409b. Reference numeral 411 denotes a plurality of variable resistors connected to the electrodes 409b; 412 denotes a power supply connected between the thin film 409a and the electrodes 409b through the variable resistors 411 and a power switch 413; 414 denotes an arithmetical unit for controlling the resistance values of the variable resistors 411; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror 409 need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

The thin film 409a, like a membrane mirror set forth, for example, in "Handbook of Microlithography, Micromachining and Microfabrication", by P. RaiChoudhury, Volume 2: Micromachining and Microfabrication, p. 495, FIG. 8.58, SPIE PRESS, or Optics Communication, Vol. 140, pp. 187–190, 1997, is such that when the voltage is applied across the plurality of electrodes 409b, the thin film 409a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 902 and 901 and/or the prism 404, the isosceles rectangular prism 405, and the mirror 406, or the degradation of imaging performance by the expansion and deformation of a lens frame and assembly errors of parts, such as optical elements and frames. In this way, a focusing adjustment and correction for aberration produced by the focusing adjustment can be always properly made.

Figure 31:
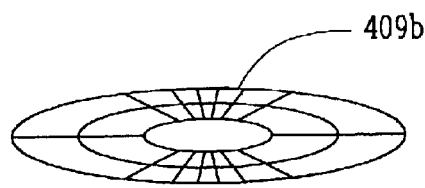
FIG. 31 is an explanatory view showing one aspect of electrodes used in the deformable mirror of FIG. 30.
Figure 32:
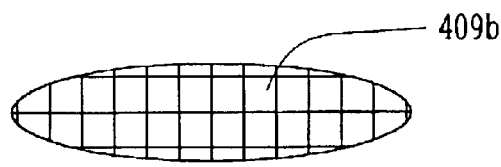
FIG. 32 is an explanatory view showing another aspect of electrodes used in the deformable mirror of FIG. 30.

Also, it is only necessary that the shape of the electrodes 409b, for example, as shown in FIGS. 31 and 32, is selected in accordance with the deformation of the thin film 409a.

According to the embodiment, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 29, a mark+on the optical path indicates that a ray of light travels toward the back side of the plane of the page), and is reflected by the mirror 406 to enter the eye through the eyepiece 901. As mentioned above, the lenses 902 and 901, the prisms 404 and 405, and the deformable mirror 409 constitute the observing optical system of the optical apparatus in the embodiment. The surface profile and thickness of each of these optical elements is optimized and thereby aberration can be minimized.

Specifically, the configuration of the thin film 409a, as the reflecting surface, is controlled in such a way that the resistance values of the variable resistors 411 are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411 so that voltages by which the configuration of the thin film 409a is determined are applied to the electrodes 409b. Thus, since the thin film 409a is deformed with the voltages applied to the electrodes 409b, that is, the electrostatic force, it assumes various shapes including an aspherical surface, according to circumstances. The range sensor 417 need not necessarily be used, and in this case, it is only necessary that an imaging lens 403 of the digital camera is moved so that a high-frequency component of an image signal from a solid-state image sensor 408 is roughly maximized, and the object distance is calculated from this position so that an observer's eye is able to focus upon the object image by deforming the deformable mirror.

When the thin film 409a is made of synthetic resin, such as polyimide, it can be considerably deformed even at a low voltage, which is advantageous. Also, the prism 404 and the deformable mirror 409 can be integrally configured into a unit.

Although not shown in the figure, the solid-state image sensor 408 may be constructed integrally with the substrate of the deformable mirror 409 by a lithography process.

When each of the lenses 902 and 901, the prisms 404 and 405, and the mirror 406 is configured by a plastic mold, an arbitrary curved surface of a desired configuration can be easily obtained and its fabrication is simple. In the photographing apparatus of the embodiment, the lenses 902 and 901 are arranged separately from the prism 404. However, if the prisms 404 and 405, the mirror 406, and the deformable mirror 409 are designed so that aberration can be eliminated without providing the lenses 902 and 901, the prisms 404 and 405 and the deformable mirror 409 will be configured as one optical block, and the assembly is facilitated. Parts or all of the lenses 902 and 901, the prisms 404 and 405, and the mirror 406 may be made of glass. By doing so, a photographing apparatus with a higher degree of accuracy is obtained.

Also, although in FIG. 29 the arithmetical unit 414, the temperature sensor 415, the humidity sensor 416, and the range sensor 417 are provided so that the deformable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the deformable mirror 409 compensates for only a change of an observer's diopter.

Figure 30:
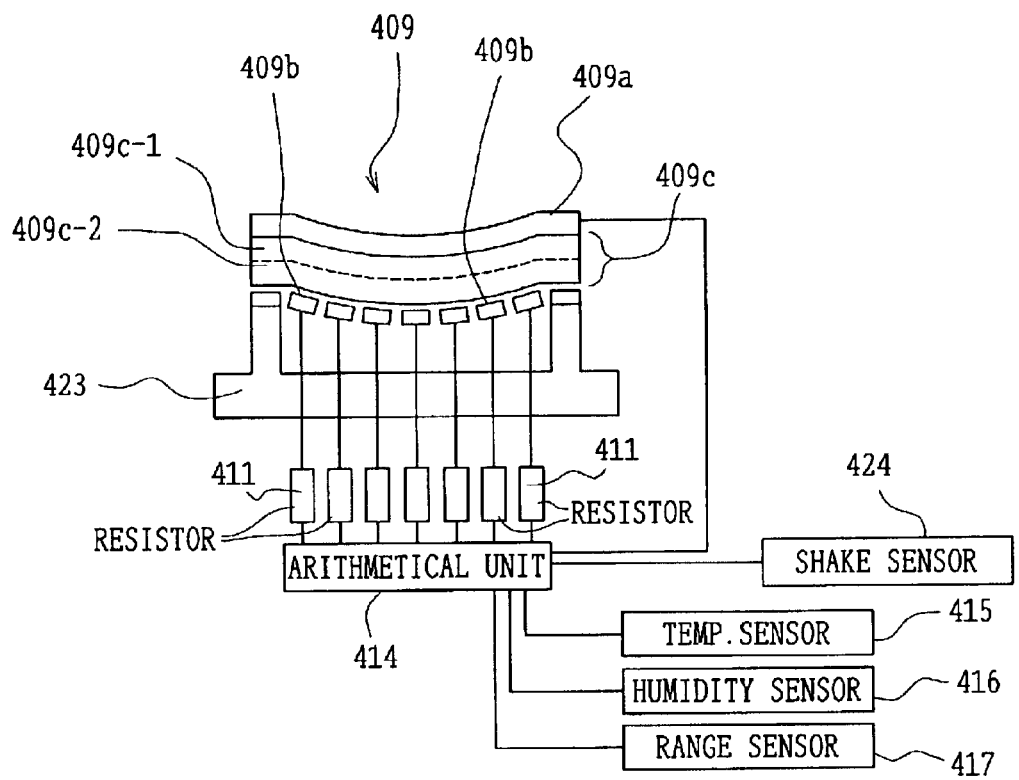
FIG. 30 is a view showing schematically another embodiment of the deformable mirror applicable to the present invention.

FIG. 30 shows another embodiment of the deformable mirror 409 applicable as the variable mirror according to the zooming optical system of the present invention. In this embodiment, a piezoelectric element 409c is interposed between the thin film 409a and the electrodes 409b, and these are placed on a support 423. A voltage applied to the piezoelectric element 409c is changed in accordance with the individual electrodes 409b, and thereby the piezoelectric element 409c causes expansion or contraction which is partially different so that the shape of the thin film 409a can be changed. The configuration of the electrodes 409b may be selected in accordance with the deformation of the thin film 409a. For example, as illustrated in FIG. 31, it may have a concentric division pattern, or as in FIG. 32, it may be a rectangular division pattern. As other patterns, proper configurations can be chosen. In FIG. 30, reference numeral 424 represents a shake sensor connected to the arithmetical unit 414. The shake sensor 424, for example, detects the shake of a digital camera and changes the voltages applied to the electrodes 409b through the arithmetical unit 414 and the variable resistors 411 in order to deform the thin film 409a to compensate for the blurring of an image caused by the shake. At this time, the signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength.

Figure 33:
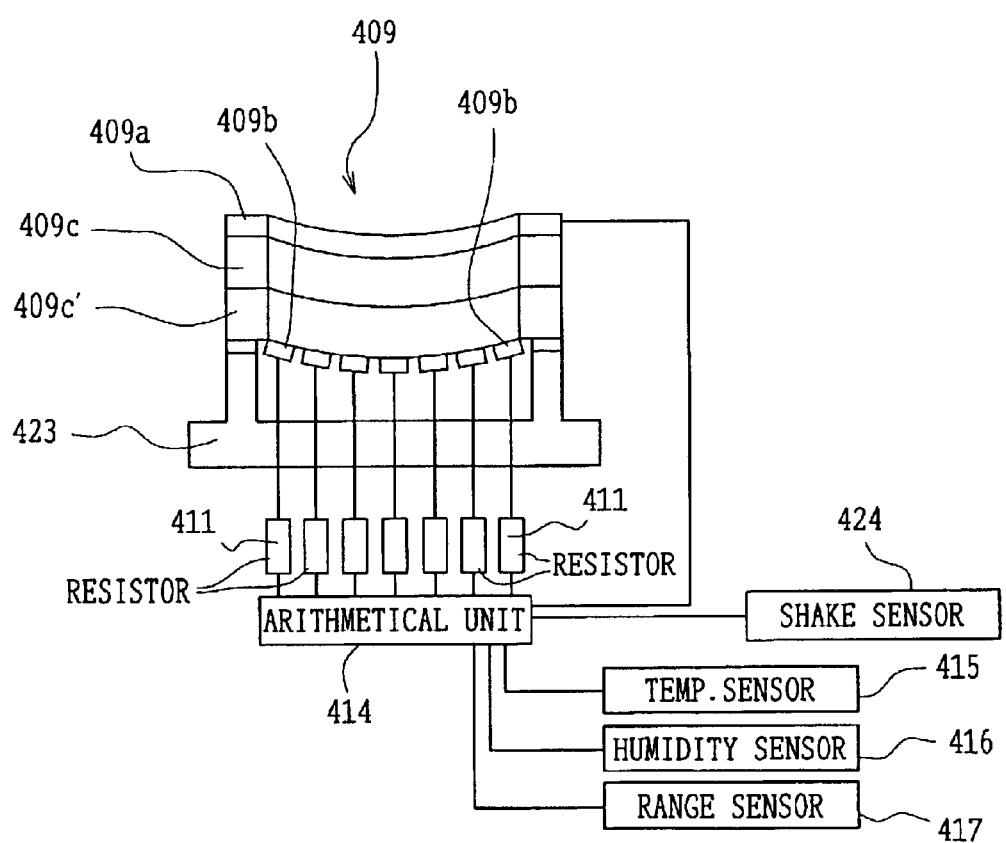
FIG. 33 is a view showing schematically another embodiment of the deformable mirror applicable to the zooming optical system of the present invention.

FIG. 33 shows still another embodiment of the deformable mirror 409 applicable as the variable mirror according to the zooming optical system of the present invention. This embodiment has the same construction as the embodiment of FIG. 30 with the exception that two piezoelectric elements 409c and 409c' are interposed between the thin film 409a and the electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in a reverse direction when voltages are applied, and thus there is the advantage that a force for deforming the thin film 409a becomes stronger than in the embodiment of FIG. 30 and as a result, the shape of the mirror surface can be considerably changed.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When the piezoelectric elements 409c and 409c' are used, it is also possible to properly deform the thin film 409a in the above embodiment if their thicknesses are made uneven.

For materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

When an electrostrictive substance, for example, acrylic elastomer or silicon rubber, is used for the piezoelectric element 409c shown in FIGS. 30 and 33, the piezoelectric element 409c, as indicated by a broken line in FIG. 30, may be constructed by cementing another substrate 409c-1 to an electrostrictive substance 409c-2.

Figure 34:
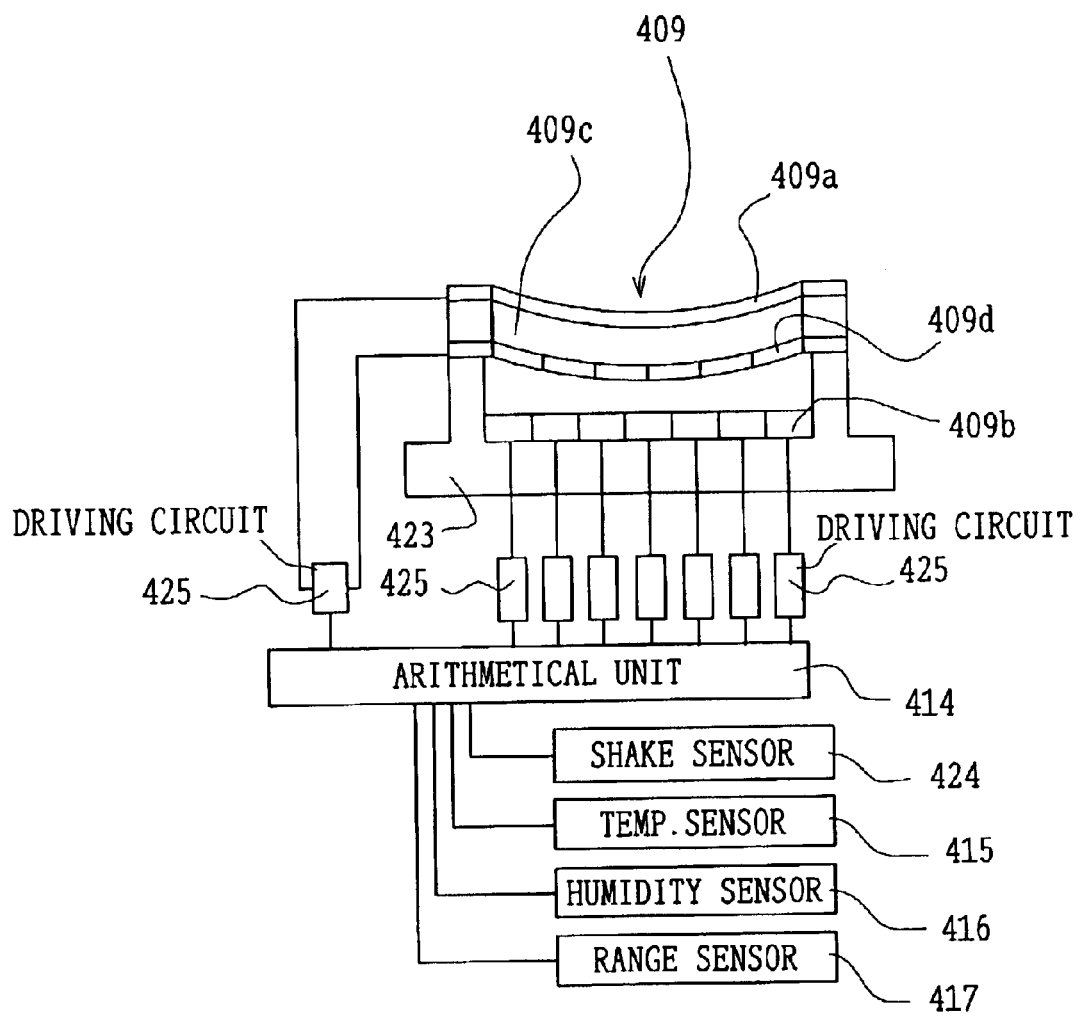
FIG. 34 is a view showing schematically another embodiment of the deformable mirror applicable to the zooming optical system of the present invention.

FIG. 34 shows another embodiment of the deformable mirror 409 applicable as the variable mirror according to the zooming optical system of the present invention. The deformable mirror 409 of this embodiment is designed so that the piezoelectric element 409c is sandwiched between the thin film 409a and an electrode 409d, and voltages are applied between the thin film 409a and the electrode 409d through a driving circuit 425' controlled by the arithmetical unit 414. Furthermore, voltages are also applied to the electrodes 409b provided on the support 423, through driving circuits 425 controlled by the arithmetical unit 414. In this embodiment, therefore, the thin film 409a can be doubly deformed by electrostatic forces due to the voltages applied between the thin film 409a and the electrode 409d and applied to the electrodes 409b. There are advantages that various deformation patterns can be provided and the response is quick, compared with any of the above embodiments.

By changing the signs of the voltages applied between the thin film 409a and the electrode 409d, the deformable mirror can be deformed into a convex or concave surface. In this case, a considerable deformation may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 409d may be constructed as a plurality of electrodes like the electrodes 409b. This condition is shown in FIG. 34. In the present invention, all of the piezoelectric effect, the electrostrictive effect, and electrostriction are generally called the piezoelectric effect. Thus, it is assumed that the electrostrictive substance is included in the piezoelectric substance.

Figure 35:
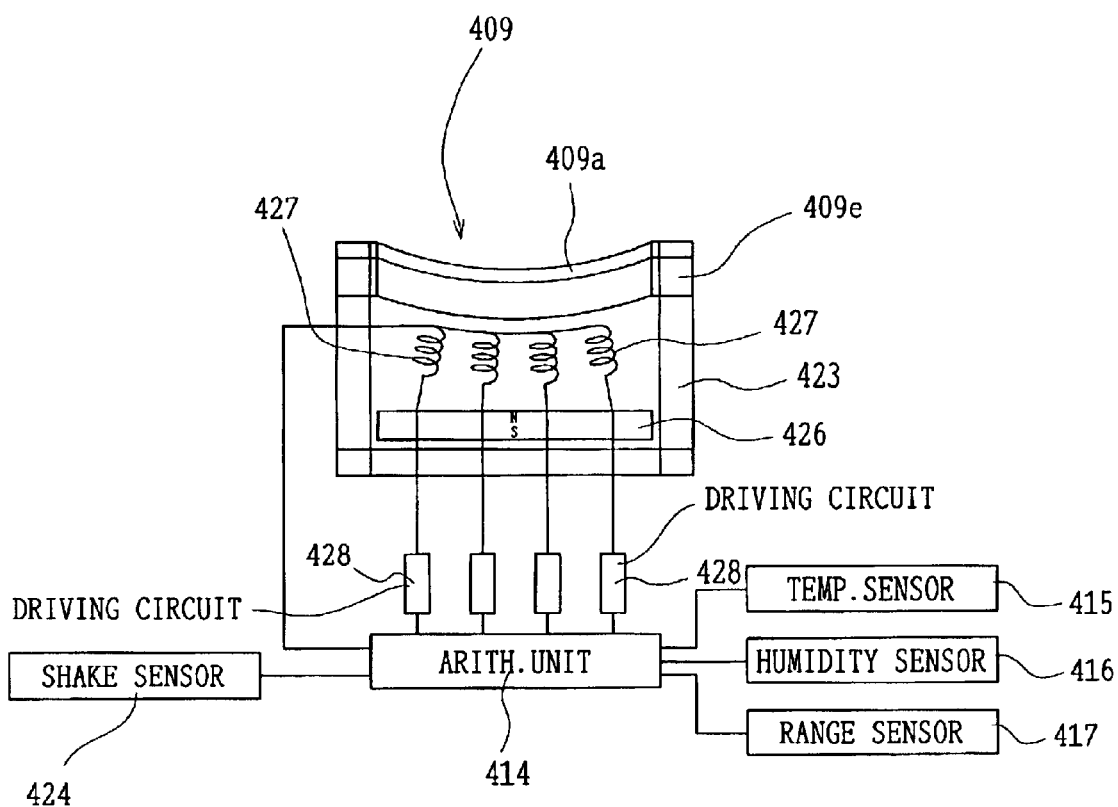
FIG. 35 is a view showing schematically another embodiment of the deformable mirror applicable to the zooming optical system of the present invention.

FIG. 35 shows another embodiment of the deformable mirror 409 applicable as the variable mirror according to the zooming optical system of the present invention. The deformable mirror 409 of this embodiment is designed so that the shape of the reflecting surface can be changed by utilizing an electromagnetic force. A permanent magnet 426 mounted and fixed on a bottom surface inside the support 423, and the periphery of a substrate 409e made with silicon nitride or polyimide is mounted on the top surface thereof. The thin film 409a consisting of the coating of metal, such as aluminum, is deposited on the surface of the substrate 409e, thereby constituting the deformable mirror 409. Below the substrate 409e, a plurality of coils 427 are arranged and connected to the arithmetical unit 414 through the driving circuits 428. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409e and the thin film 409a.

In this case, a different amount of current can also be caused to flow through each of the coils 427. A single coil 427 may be used, and the permanent magnet 426 may be provided on the substrate 409e so that the coils 427 are arranged on the bottom side in the support 423. It is desirable that the coils 427 are fabricated by a lithography process. A ferromagnetic core (iron core) may be encased in each of the coils 427.

Figure 36:
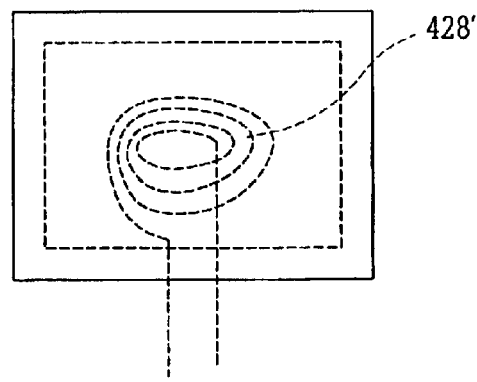
FIG. 36 is an explanatory view showing the winding density of a thin-film coil in the deformable mirror of FIG. 35.

In this case, each of the coils 427, as illustrated in FIG. 36, can be designed so that a coil density varies with place and thereby a desired deformation is brought to the substrate 409e and the thin film 409a. A single coil 427 may be used, and a ferromagnetic core (iron core) may be encased in each of the coils 427.

Figure 37:
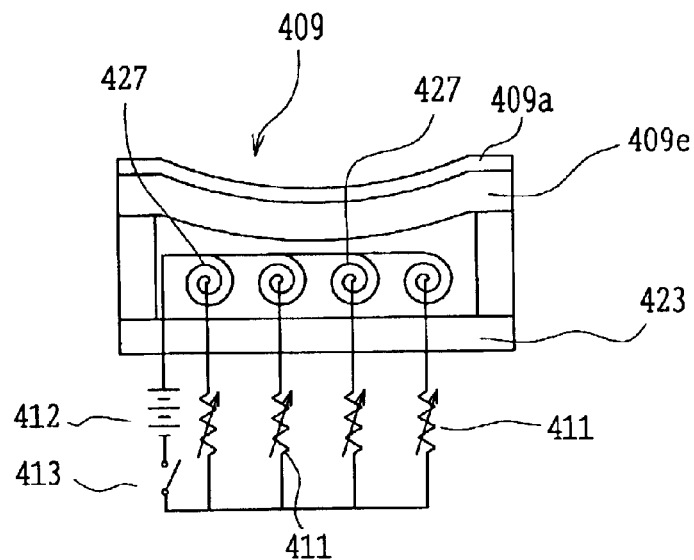
FIG. 37 is a view showing schematically another embodiment of the deformable mirror applicable to the zooming optical system of the present invention.
Figure 38:
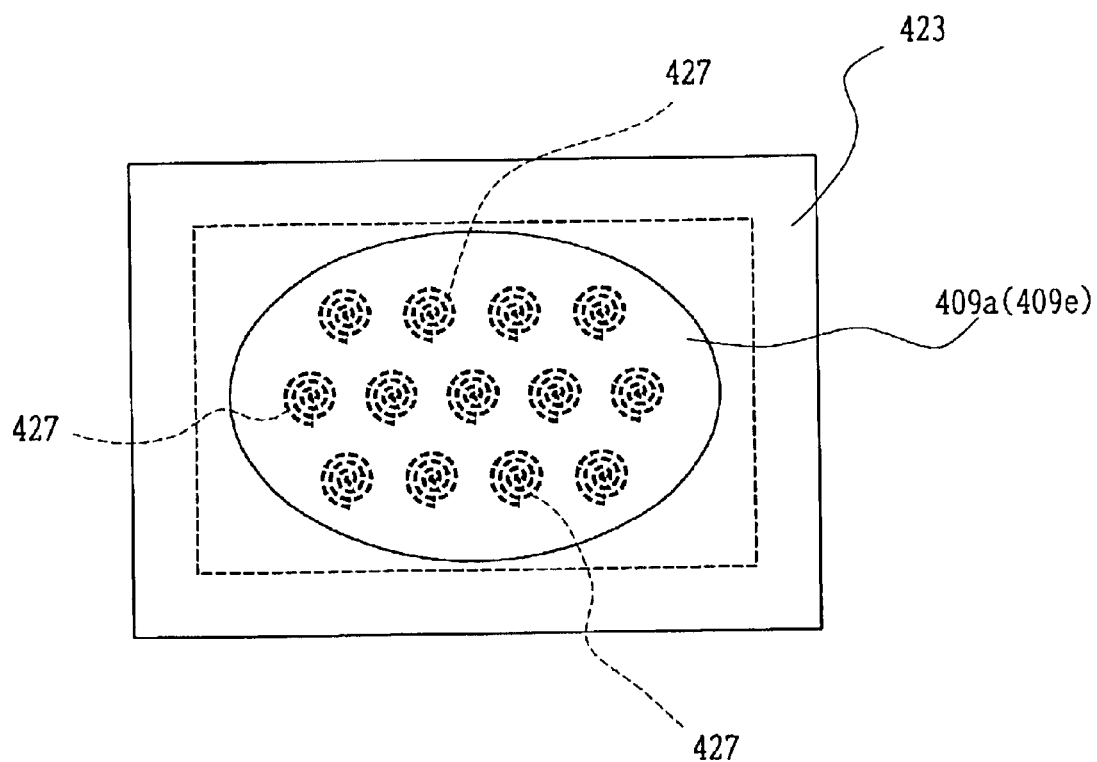
FIG. 38 is an explanatory view showing an example of an array of coils in the deformable mirror of FIG. 37.
Figure 39:
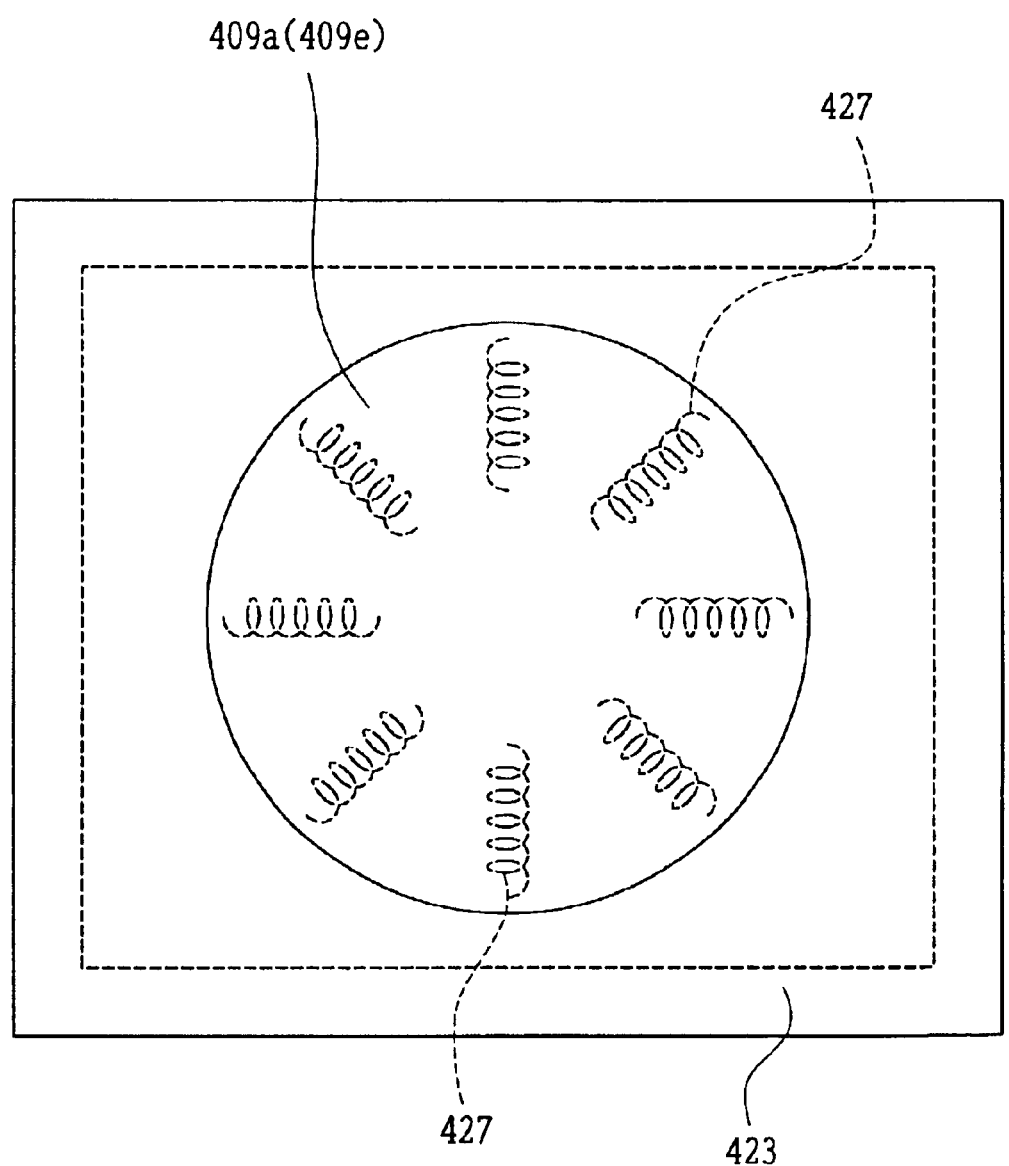
FIG. 39 is an explanatory view showing another example of the array of coils in the deformable mirror of FIG. 37.
Figure 40:
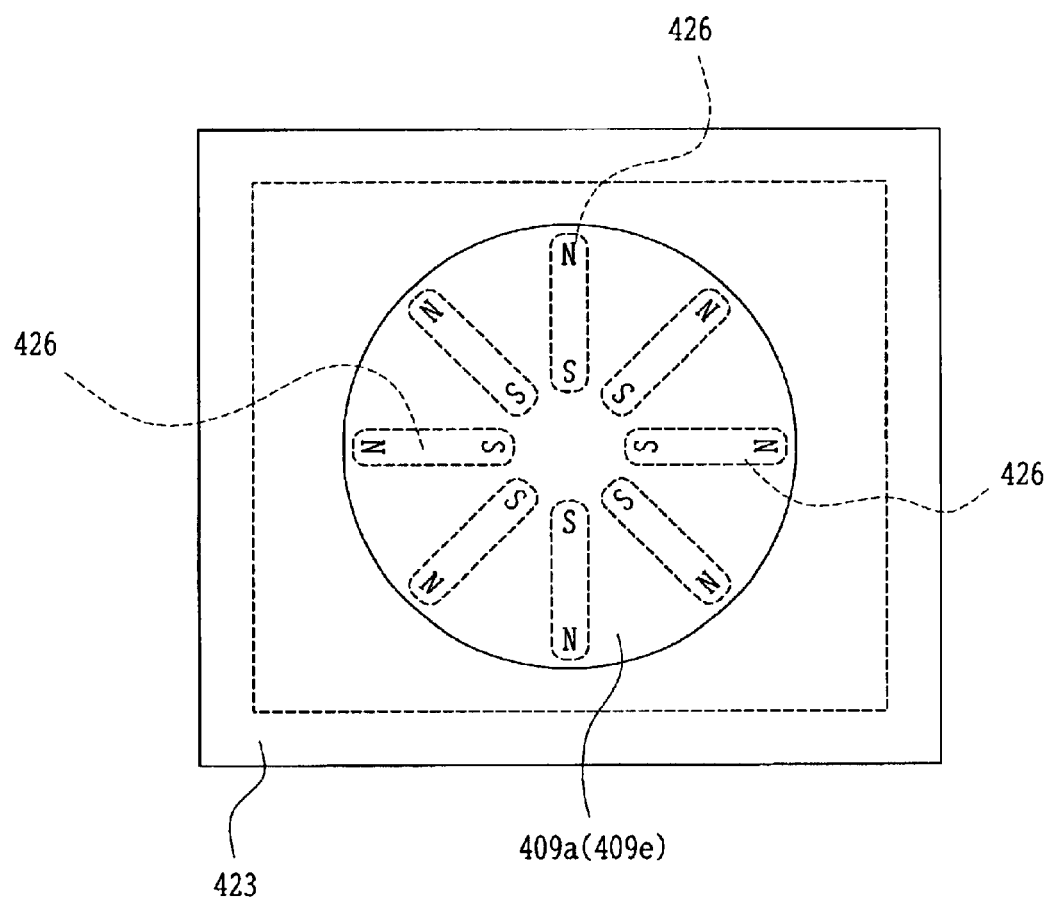
FIG. 40 is an explanatory view showing an array of permanent magnets suitable for the array of coils of FIG. 39 in the example of FIG. 35.

FIG. 37 shows another embodiment of the deformable mirror 409 applicable as the variable mirror according to the zooming optical system of the present invention. In the deformable mirror 409 of this embodiment, the substrate 409e is made with a ferromagnetic such as iron, and the thin film 409a as a reflecting film is made with aluminum. In this case, since the thin film coils need not be used, the structure is simple and the manufacturing cost can be reduced. If the power switch 413 is replaced with a changeover and power on-off switch, the directions of currents flowing through the coils 427 can be changed, and the configurations of the substrate 409e and the thin film 409a can be changed at will. FIG. 38 shows an array of the coils 427 in this embodiment, and FIG. 39 shows another array of the coils 427. These arrays are also applicable to the embodiment of FIG. 35. FIG. 40 shows an array of the permanent magnets 426 suitable for the array of the coils of FIG. 39 in the embodiment of FIG. 35. Specifically, when the permanent magnets 426, as shown in FIG. 40, are radially arranged, a delicate deformation can be provided to the substrate 409e and the thin film 409a in contrast with the embodiment of FIG. 35. As mentioned above, when the electromagnetic force is used to deform the substrate 409e and the thin film 409a (in the embodiments of FIGS. 35 and 37), there is the advantage that they can be driven at a lower voltage than in the case where the electrostatic force is used.

Some embodiments of the deformable mirror have been described, but as shown in FIG. 34, at least two kinds of forces may be used in order to change the shape of the deformable mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained. It is desirable that the contour of a part of the deformable mirror whose shape is changed has a shape extending along a direction parallel with the entrance plane of an axial ray. This offers the advantage that the mirror is easily changed into a shape close to an ellipsoid which is favorable for correction for aberration. For the shape extending along the entrance plane, the contour of a track, polygon, or ellipse is available.

Figure 41:
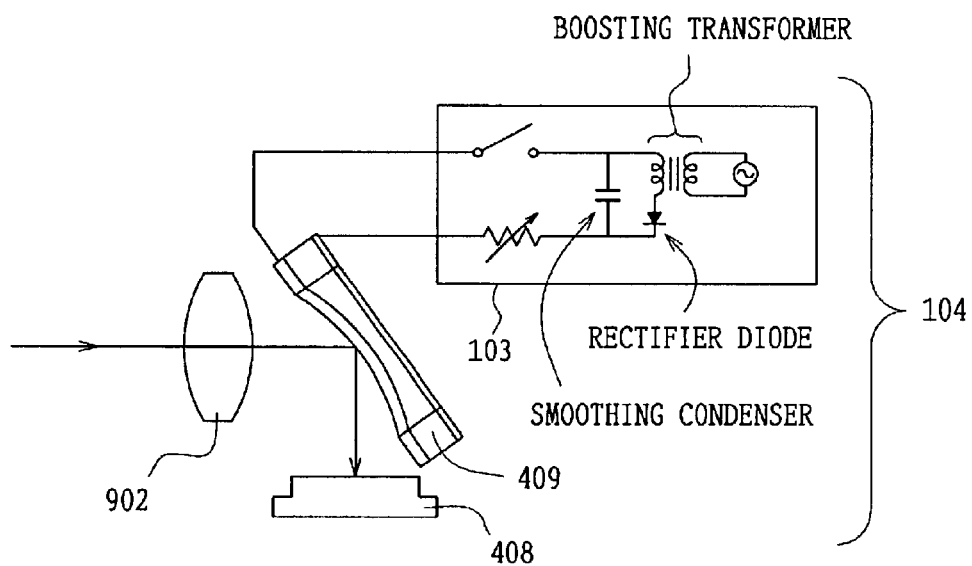
FIG. 41 is a view showing schematically the deformable mirror applicable to the imaging device using the zooming optical system of present invention.

FIG. 41 shows an imaging system which uses the deformable mirror 409 as the variable mirror applicable to an imaging device using the zooming optical system, in another embodiment of the present invention, and which is used, for example, in a digital camera of a cellular phone, a capsule endoscope, an electronic endoscope, a digital camera for personal computers, or a digital camera for PDAs. In the imaging system of this embodiment, one imaging unit 104 is constructed with the deformable mirror 409, the lens 902, the solid-state image sensor 408, and a control system 103. In the imaging unit 104 of the embodiment, light from an object passing through the lens 902 is condensed by the deformable mirror 409 and is imaged on the solid-state image sensor 408. The deformable mirror 409 is a kind of variable optical-property element and is also referred to as a variable focal-length mirror.

According to this embodiment, even when the object distance is changed, the deformable mirror 409 is deformed and thereby the object can be brought into a focus. The embodiment need not use the motor to move the lens and excels in compact and lightweight design and low power consumption. The imaging unit 104 can be used in any of the embodiments as the imaging system of the present invention. When a plurality of deformable mirrors 409 are used, a zoom or variable magnification imaging system or optical system can be constructed.

In FIG. 41, an example of a control system which includes the boosting circuit of a transformer using coils in the control system 103 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

Figure 42:
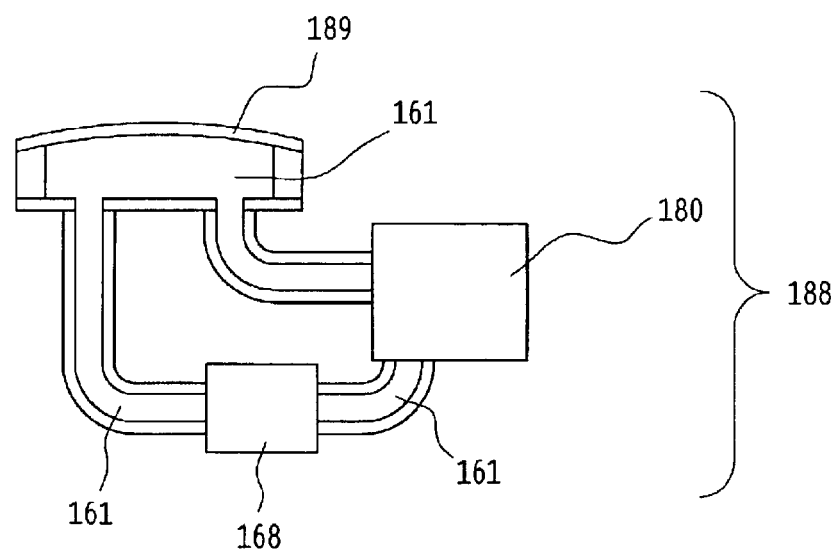
FIG. 42 is a view showing schematically another embodiment of the deformable mirror used in the zooming optical system of the present invention.

FIG. 42 shows the deformable mirror 188 in which a fluid 161 is taken in and out by a micropump 180 to deform a mirror surface, in another embodiment, applicable as the variable mirror according to the zooming optical system of the present invention. According to this embodiment, there is the merit that the mirror surface can be considerably deformed.

The micropump 180 is a small-sized pump, for example, made by a micromachining technique and is constructed so that it is operated with an electric power. As examples of pumps made by the micromachining technique, there are those which use thermal deformations, piezoelectric substances, and electrostatic forces.

Figure 43:
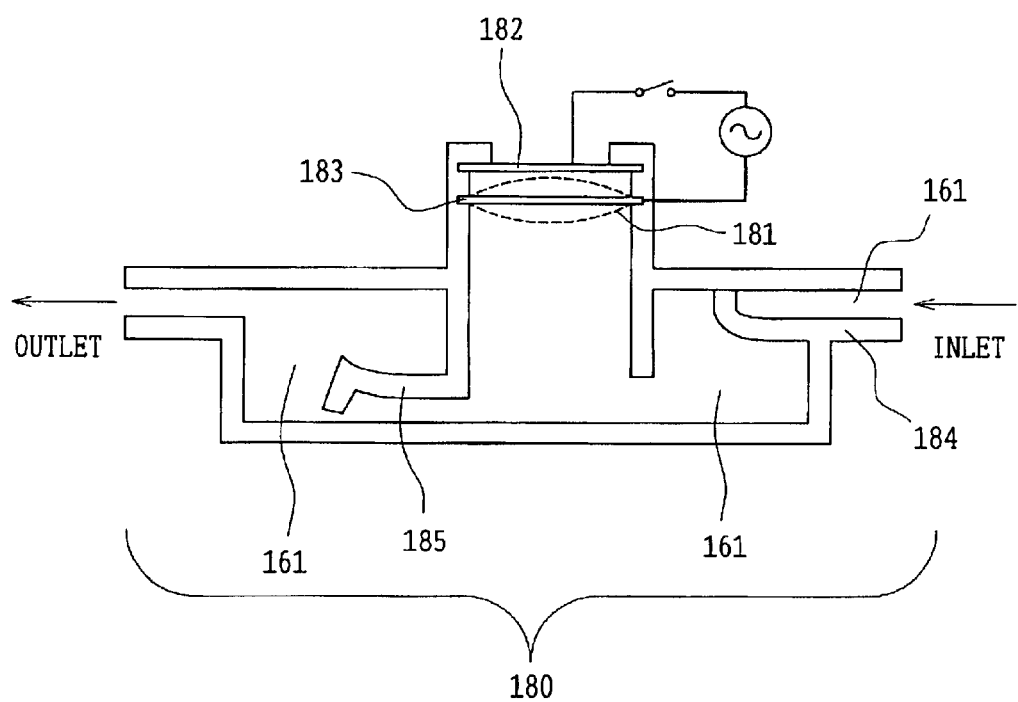
FIG. 43 is a view showing schematically an example of a micropump applicable to the deformable mirror used in the zooming optical system of the present invention.

FIG. 43 shows an example of a micropump applicable to the present invention. In the micropump 180 of the embodiment, a vibrating plate 181 is vibrated by the electrostatic force or the electric force of the piezoelectric effect. In this figure, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, two valves 184 and 185 are opened and closed to feed the fluid 161 from the right to the left.

In the deformable mirror 188 of this embodiment, the reflecting film 181 is deformed into a concave or convex surface in accordance with the amount of the fluid 161, and thereby functions as the deformable mirror. The deformable mirror 188 is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 41, it is desirable that the boosting transformer or the piezoelectric transformer is used to constitute the control system.

If the thin film 409a for reflection is also provided in a portion which is not deformed, it can be used as a reference surface when the profile of the deformable mirror is measured by an interferometer, which is convenient.

Figure 44:
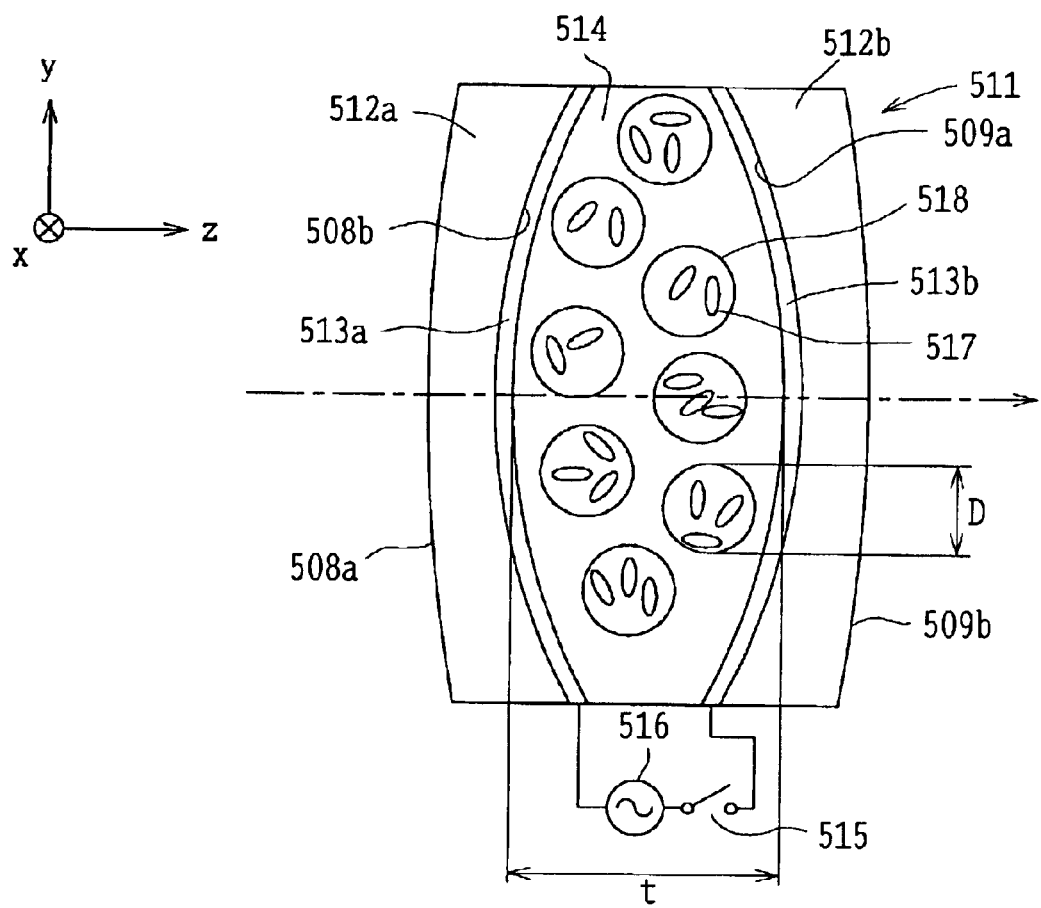
FIG. 44 is a view showing the principle of a variable focal-length lens used in the zooming optical system of the present invention.

FIG. 44 shows the structure of a variable focal-length lens applicable to the zooming optical system according to the present invention. A variable focal-length lens 511 includes a first lens 512a having lens surfaces 508a and 508b as a first surface and a second surface, respectively, a second lens 512b having lens surfaces 509a and 509b as a third surface and a fourth surface, respectively, and a macromolecular dispersed liquid crystal layer 514 sandwiched between these lenses through transparent electrodes 513a and 513b. Incident light is converged through the first and second lenses 512a and 512b. The transparent electrodes 513a and 513b are connected to an alternating-current power supply 516 through a switch 515 so that an alternating-current electric field is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517, and its volume is equal to the sum of volumes occupied by macromolecules and the liquid crystal molecules 517 which constitute the macromolecular cells 518.

Here, for the size of each of the macromolecular cells 518, for example, in the case of a sphere, when an average diameter is denoted by D and the wavelength of light used is denoted by λ, the average diameter D is chosen to satisfy the following condition:

$$2\text{ nm} \leq D \leq \lambda/5 \tag{16}$$

That is, the size of each of the liquid crystal molecules 517 is at least about 2 nm and thus the lower limit of the average diameter D is set to about 2 nm or larger. The upper limit of the diameter D depends on a thickness t of the macromolecular dispersed liquid crystal layer 514 in the direction of the optical axis of the variable focal-length lens 511. However, if the diameter is larger than the wavelength λ, a difference between the refractive indices of the macromolecules and the liquid crystal molecules 517 will cause light to be scattered at the interfaces of the macromolecular cells 518 and will render the liquid crystal layer 514 opaque. Hence, the upper limit of the diameter D should be λ/5 or less. A high degree of accuracy is not necessarily required, depending on an optical product using the variable focal-length lens. In this case, the diameter D below the value of the wavelength λ is satisfactory. Also, the transparency of the macromolecular dispersed liquid crystal layer 514 deteriorates with increasing thickness t.

Figure 45:
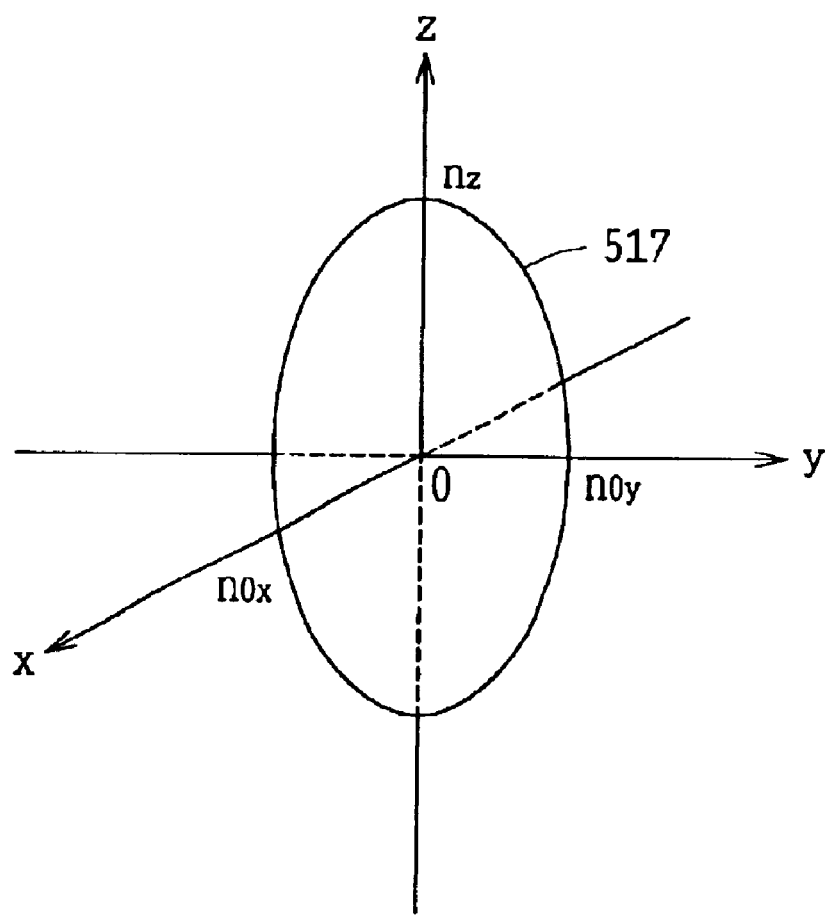
FIG. 45 is a view showing the index ellipsoid of a nematic liquid crystal molecule of uniaxial anisotropy.

In the liquid crystal molecules 517, for example, uniaxial nematic liquid crystal molecules are used. The index ellipsoid of each of the liquid crystal molecules 517 is as shown in FIG. 45. That is, $$n_{ox} = n_{oy} = n_o \tag{17}$$

where $n_o$ is the refractive index of an ordinary ray and $n_{ox}$ and $n_{oy}$ are refractive indices in directions perpendicular to each other in a plane including ordinary rays.

Figure 46:
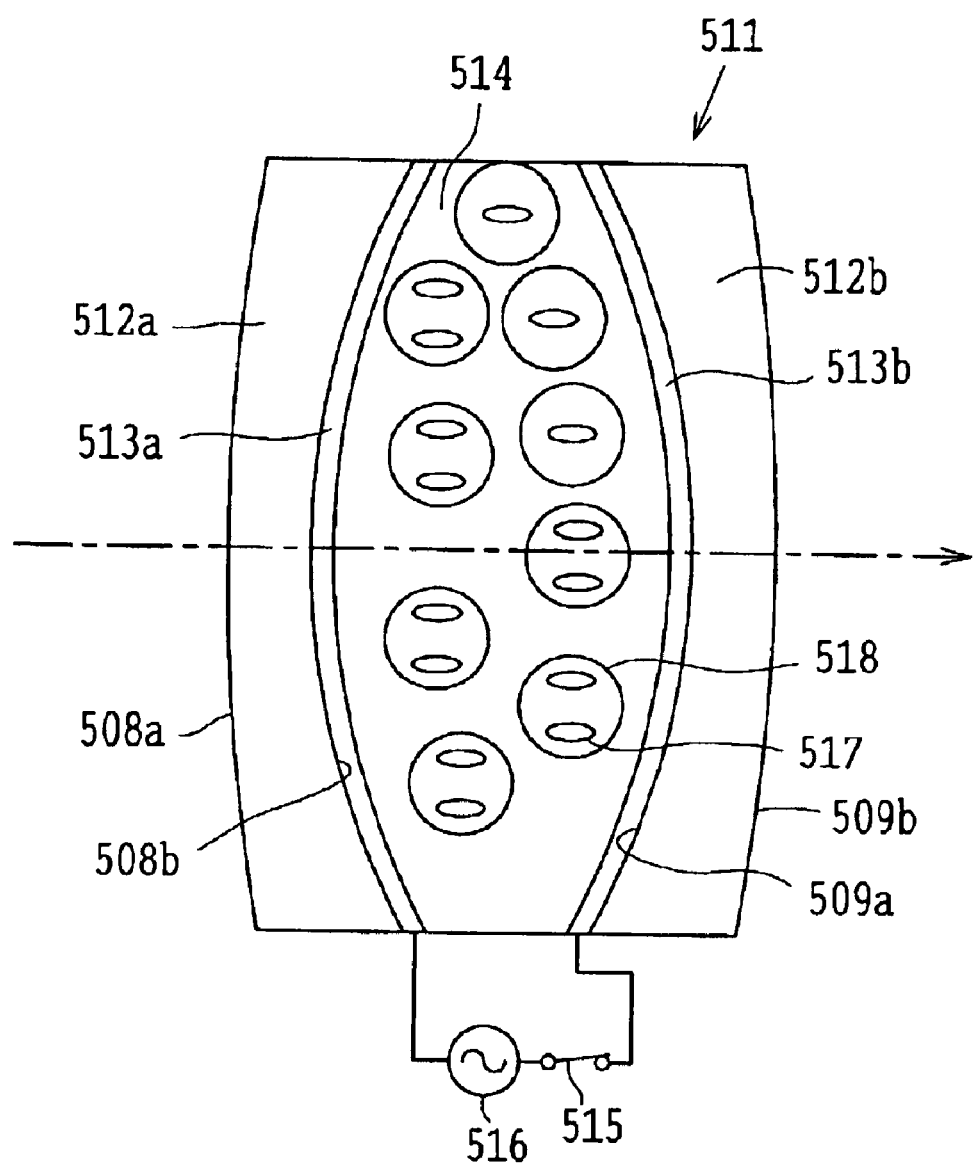
FIG. 46 is a view showing a state where an electric field is applied to the macromolecular dispersed liquid crystal layer of the variable focal-length lens in FIG. 44.

Here, in the case where the switch 515, as shown in FIG. 44 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 46, is turned on and the alternating-current electric field is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 47:
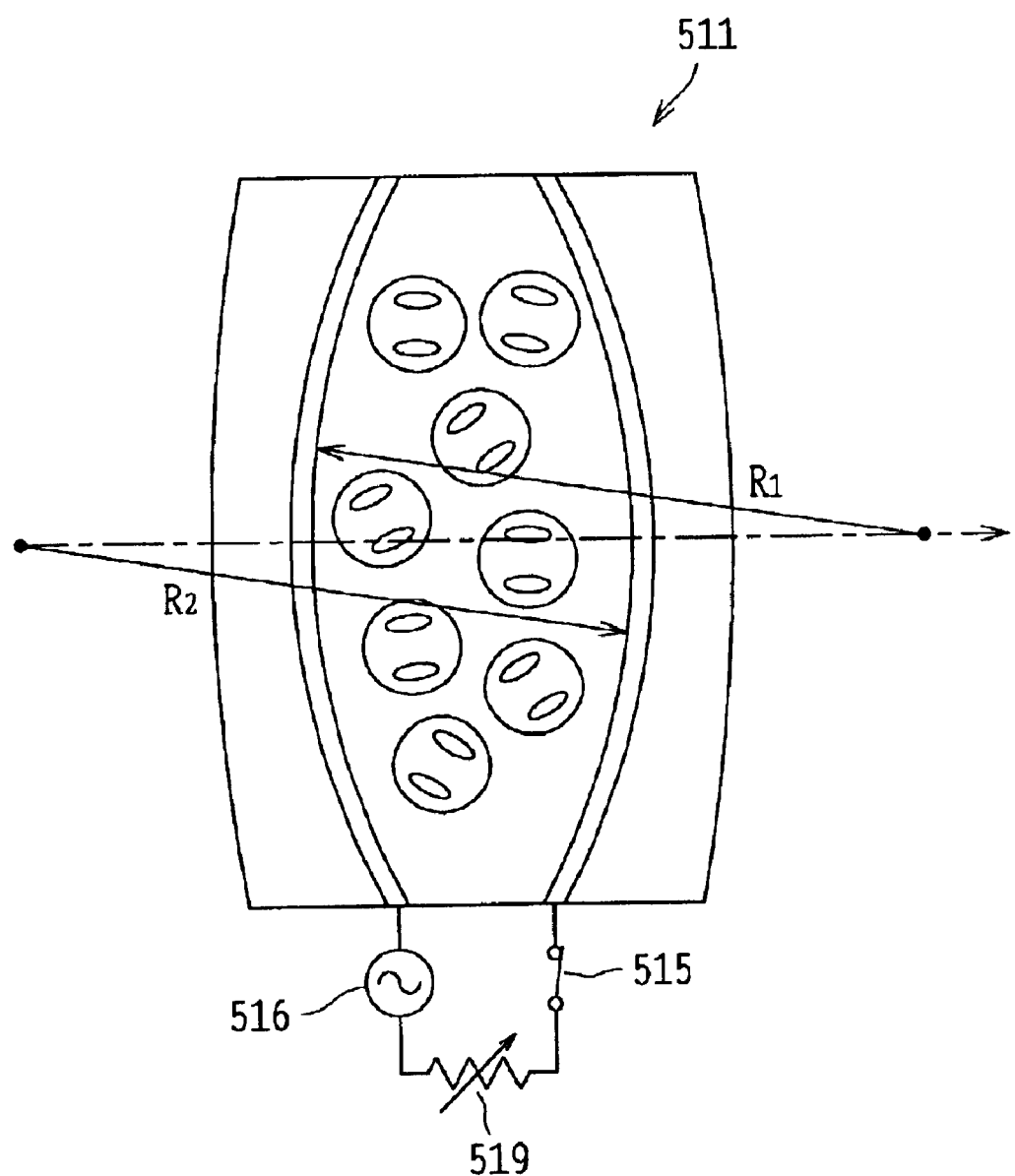
FIG. 47 is a view showing one example where a voltage applied to the macromolecular dispersed liquid crystal layer in FIG. 44 can be changed.

The voltage applied to the macromolecular dispersed liquid crystal layer 514, for example, as shown in FIG. 47, can be changed stepwise or continuously by a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 44, that is, in the case where the electric field is not applied to the macromolecular dispersed liquid crystal layer 514, when the refractive index in the direction of the major axis of the index ellipsoid, as shown in FIG. 45, is denoted by $n_z$, an average refractive index $n_{LC}'$ of the liquid crystal molecules 517 is roughly given by $$(n_{ox} + n_{oy} + n_z)/3 \equiv n_{LC}' \tag{18}$$

Also, when the refractive index $n_z$ is expressed as a refractive index $n_e$ of an extraordinary ray, an average refractive index $n_{LC}$ where Equation (17) is established is given by $$(2n_o + n_e)/3 \equiv n_{LC} \tag{19}$$

In this case, when the refractive index of each of the macromolecules constituting the macromolecular cells 518 is represented by $n_p$ and the ratio of volume between the liquid crystal layer 514 and the liquid crystal molecules 517 is represented by ff, a refractive index $n_A$ of the liquid crystal layer 514 is given from the Maxwell-Garnet's law as $$n_A = ff \cdot n_{LC}' + (1-ff)n_p \tag{20}$$

Thus, as shown in FIG. 47, when the radii of curvature of the inner surfaces of the lenses 512a and 512b, that is, the surfaces on the side of the liquid crystal layer 514, are represented by $R_1$ and $R_2$, a focal length $f_1$ of the variable focal-length lens 511 is given by $$1/f_1 = (n_A - 1)(1/R_1 - 1/R_2) \tag{21}$$

Also, when the center of curvature is located on the image side, it is assumed that the radius of curvature $R_1$ or $R_2$ is positive. Refraction caused by the outer surface of each of the lenses 512a and 512b is omitted. That is, the focal length of the lens of only the liquid crystal layer 514 is given by Equation (21).

When the average refractive index of ordinary rays is expressed as $$(n_{ox} + n_{oy})/2 = n_o' \tag{22}$$

a refractive index $n_B$ of the liquid crystal layer 514 in the case of FIG. 46, namely, in the case where the electric field is applied to the liquid crystal layer 514, is given by $$n_B = ff \cdot n_o' + (1-ff)n_p \tag{23}$$

and thus a focal length $f_2$ of the lens of only the liquid crystal layer 514 in this case is given by $$1/f_2 = (n_B - 1)(1/R_1 - 1/R_2) \tag{24}$$

Also, the focal length where a lower voltage than in FIG. 46 is applied to the liquid crystal layer 514 is a value between the focal length $f_1$ given by Equation (21) and the focal length $f_2$ by Equation (24).

From Equations (21) and (24), a change rate of the focal length by the liquid crystal layer 514 is given by $$|(f_2-f_1)/f_2|=|(n_B-n_A)/(n_B-1)| \quad (25)$$

Thus, in order to increase the change rate, it is only necessary to increase the value of $|(n_B-n_A)|$. Here, $$n_B-n_A=f\!f(n_o'-n_{LC}') \quad (26)$$

and hence if the value of $|n_o'-n_{LC}'|$ is increased, the change rate can be raised. Practically, since the refractive index $n_B$ is about 1.3–2, the value of $|n_o'-n_{LC}'|$ is chosen so as to satisfy the following condition:

$$0.01 \leq |n_o'-n_{LC}'| < 10 \quad (27)$$

In this way, when ff=0.5, the focal length obtained by the liquid crystal layer 514 can be changed by at least 0.5%, and thus an effective variable focal-length lens can be realized. Also, the value of $|n_o'-n_{LC}'|$ cannot exceed 10 because of restrictions on liquid crystal substances.

Subsequently, a description will be given of grounds for the upper limit of Condition (16). The variation of a transmittance τ where the size of each cell of a macromolecular dispersed liquid crystal is changed is described in "Transmission variation using scattering/transparent switching films" on pages 197–214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70–80% and the liquid crystal can be actually used as a lens, if the liquid crystal satisfies the following condition:

$$D \cdot t \leq \lambda \cdot 15 \ \mu m \quad (28)$$

Hence, for example, in the case of t=75 μm, if D≤λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, if the values of the refractive indices $n_o'$ and $n_p$ are different from each other, the transmittance of the liquid crystal layer 514 will be degraded. In FIGS. 44 and 46, the transmittance of the liquid crystal layer 514 is improved on an average when the liquid crystal layer 514 satisfies the following equation:

$$n_p=(n_o'+n_{LC}')/2 \quad (29)$$

The variable focal-length lens 511 is used as a lens, and thus in both FIGS. 44 and 46, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leq n_p \leq n_{LC}' \quad (30)$$

When Equation (29) is satisfied, Condition (28) is moderated and it is only necessary to satisfy the following condition:

$$D \cdot t \leq \lambda \cdot 60 \ \mu m \quad (31)$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \ \mu m \cdot (1.585-1.45)^2/(n_u-n_p)^2 \quad (32)$$

where $(n_u-n_p)^2$ is a value when one of $(n_{LC}'-n_p)^2$ and $(n_o'-n_p)^2$ is larger than the other.

In order to largely change the focal length of the variable focal-length lens 511, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leq f\!f \leq 0.999 \quad (33)$$

On the other hand, the transmittance u improves as the ratio ff becomes low, and hence Condition (32) may be moderated, preferably, as follows:

$$4 \times 10^{-6} [\mu m]^2 \leq D \cdot t \leq \lambda \cdot 45 \ \mu m \cdot (1.585-1.45)^2/(n_u-n_p)^2 \quad (34)$$

Also, the lower limit of the thickness t, as is obvious from FIG. 44, corresponds to the diameter D, which is at least 2 nm as described above, and therefore the lower limit of D·t becomes $(2 \times 10^{-2} \ \mu m)^2$, namely $4 \times 10^{-6} [\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7 \ nm \leq D \leq 500 \ \lambda \quad (35)$$

Figure 48:
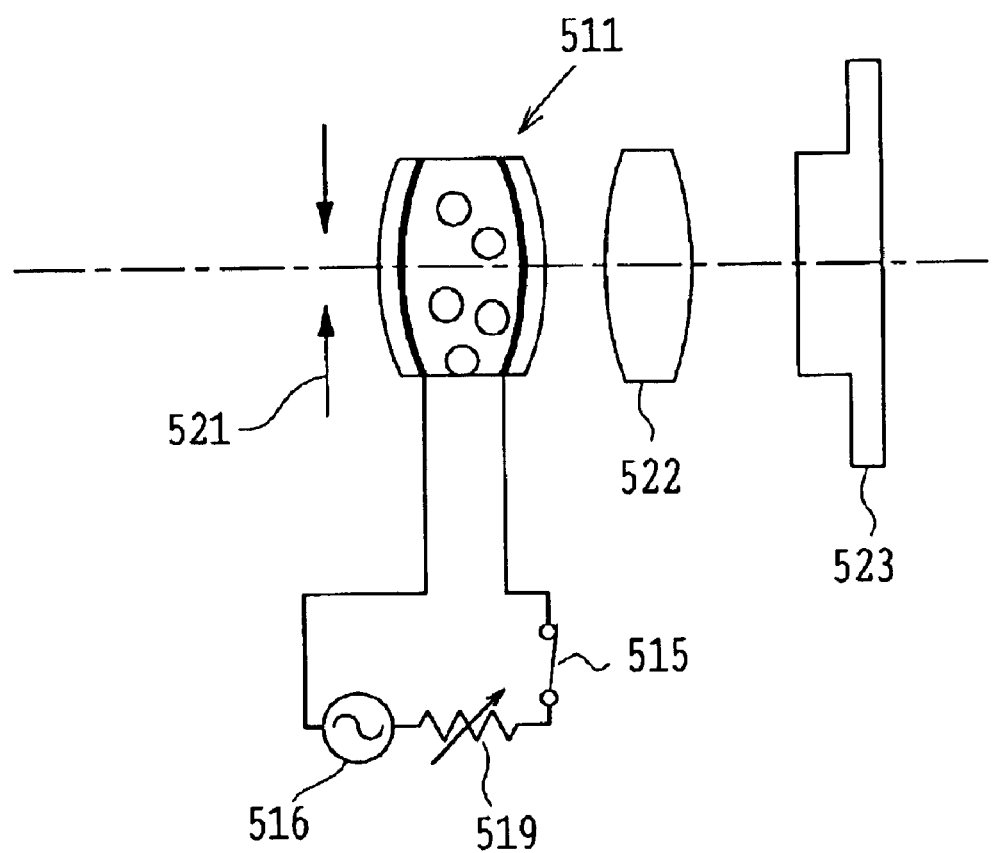
FIG. 48 is a view showing an imaging optical system for digital cameras which uses the variable focal-length lens of FIG. 47.

FIG. 48 shows an imaging optical system for digital cameras using the variable focal-length lens 511 of FIG. 47. In this imaging optical system, an image of an object (not shown) is formed on the solid-state image sensor 523, such as a CCD, through a stop 521, the variable focal-length lens 511, and a lens 522. Also, in FIG. 48, the liquid crystal molecules are not shown.

According to such an imaging optical system, the alternating voltage applied to the macromolecular dispersed liquid crystal layer 514 of the variable focal-length lens 511 is controlled by the variable resistor 519 to change the focal length of the variable focal-length lens 511. Whereby, without moving the variable focal-length lens 511 and the lens 522 along the optical axis, it becomes possible to perform continuous focusing with respect to the object distance, for example, from the infinity to 600 mm.

Figure 49:
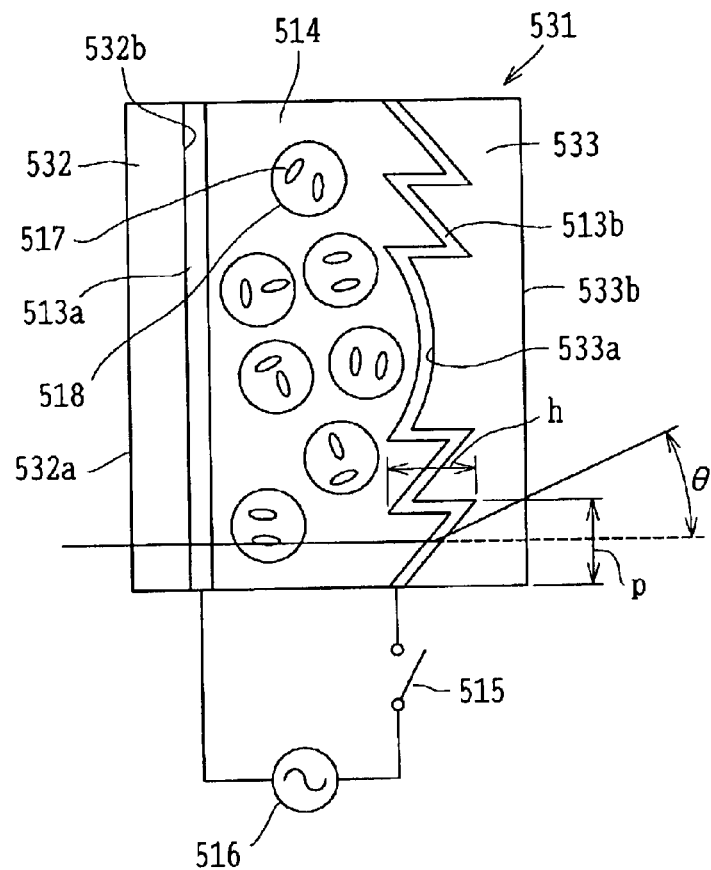
FIG. 49 is a view showing one example of a variable focal-length diffraction optical element applicable to the zooming optical system of the present invention.

FIG. 49 shows one example of a variable focal-length diffraction optical element applicable to the present invention. This variable focal-length diffraction optical element 531 includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 44, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current electric field is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin \theta = m\lambda \tag{36}$$

and emerges therefrom. When the depth of the groove is denoted by h, the refractive index of the transparent substrate 533 is denoted by $n_{33}$, and an integer is denoted by k, a diffraction efficiency becomes 100% at the wavelength λ and the production of flare can be prevented by satisfying the following equations:

$$h(n_A - n_{33}) = m\lambda \tag{37}$$

$$h(n_B - n_{33}) = k\lambda \tag{38}$$

Here, the difference in both sides between Equations (37) and (38) is given by $$h(n_A - n_B) = (m-k)\lambda \tag{39}$$

Therefore, when it is assumed that λ=500 nm, $n_A$=1.55, and $n_B$=1.5, $$0.05\ h = (m-k) \cdot 500\ \text{nm}$$

and when m=1 and k=0, $$h = 10000\ \text{nm} = 10\ \mu m$$

In this case, the refractive index $n_{33}$ of the transparent substrate 533 is obtained as 1.5 from Equation (37). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal length of the entire lens system.

In the embodiment, it is only necessary that Equations (37)–(39) are set in practical use to satisfy the following conditions:

$$0.7\ m\lambda \leq h(n_A - n_{33}) \leq 1.4\ m\lambda \tag{40}$$

$$0.7\ k\lambda \leq h(n_A - n_{33}) \leq 1.4\ k\lambda \tag{41}$$

$$0.7(m-k)\lambda \leq h(n_A - n_B) \leq 1.4(m-k)\lambda \tag{42}$$

Figure 50:
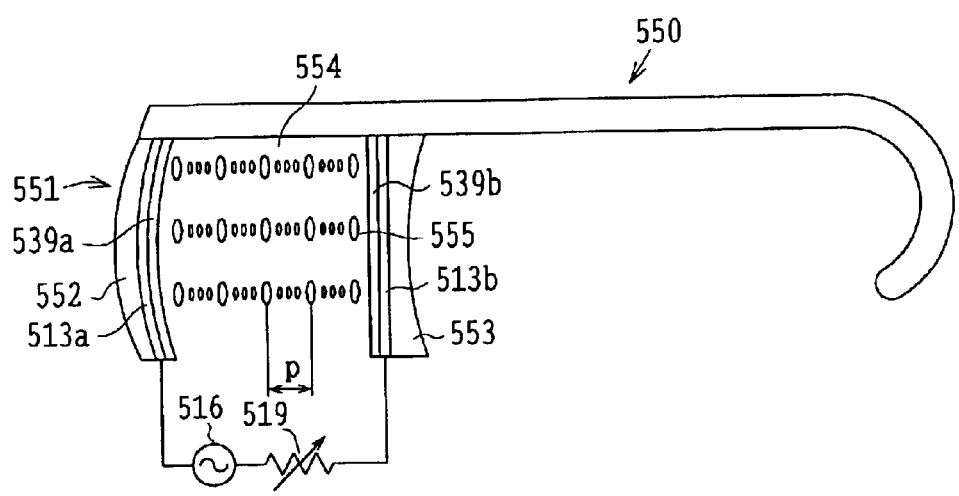
FIG. 50 is a view showing variable focal-length spectacles, each having a variable focal-length lens which uses a twisted nematic liquid crystal.
Figure 51:
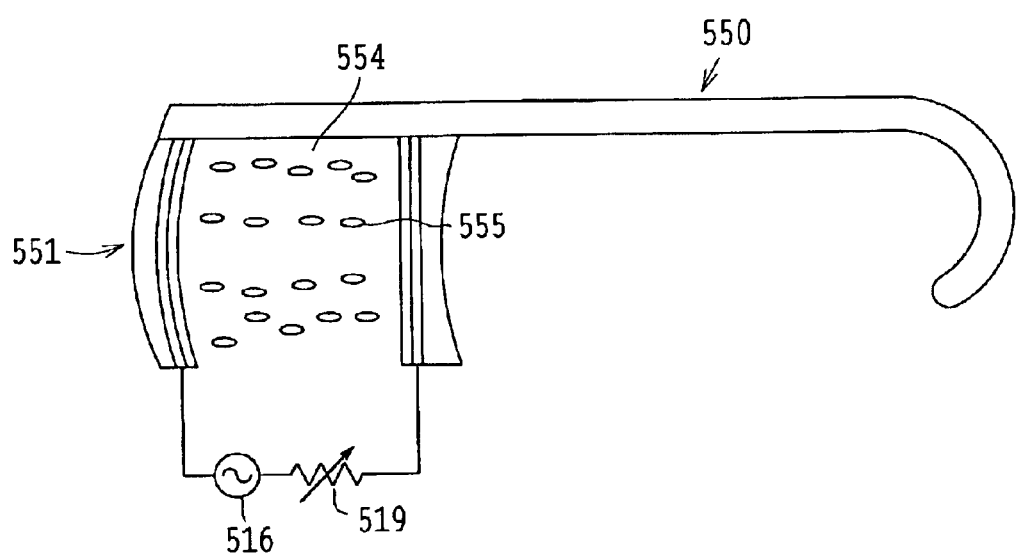
FIG. 51 is a view showing the orientation of liquid crystal molecules where a voltage applied to a twisted nematic liquid crystal layer of FIG. 50 is increased.

A variable focal-length lens using a twisted nematic liquid crystal also falls into the category of the present invention. FIGS. 50 and 51 show variable focal-length spectacles 550 in this case. The variable focal-length lens 551 has lenses 552 and 553, orientation films 539a and 539b provided through the transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that the alternating-current electric field is applied to the twisted nematic liquid crystal layer 554.

In this structure, when the voltage applied to the twisted nematic liquid crystal layer 554 is increased, liquid crystal molecules 555, as illustrated in FIG. 51, exhibit a homeotropic orientation, in which the refractive index of the liquid crystal layer 554 is lower and the focal length is longer than in a twisted nematic condition of FIG. 50 in which the applied voltage is low.

A spiral pitch P of the liquid crystal molecules 555 in the twisted nematic condition of FIG. 50 must be made nearly equal to, or much smaller than, the wavelength λ of light, and thus is set to satisfy the following condition:

$$2\ \text{nm} \leq P \leq 2\lambda/3 \tag{43}$$

Also, the lower limit of this condition depends on the sizes of the liquid crystal molecules, while the upper limit is necessary for the behavior of the liquid crystal layer 554 as an isotropic medium under the condition of FIG. 50 when incident light is natural light. If the upper limit of the condition is overstepped, the variable focal-length lens 551 is changed to a lens in which the focal length varies with the direction of deflection. Hence, a double image is formed and only a blurred image is obtained.

Figure 52A:
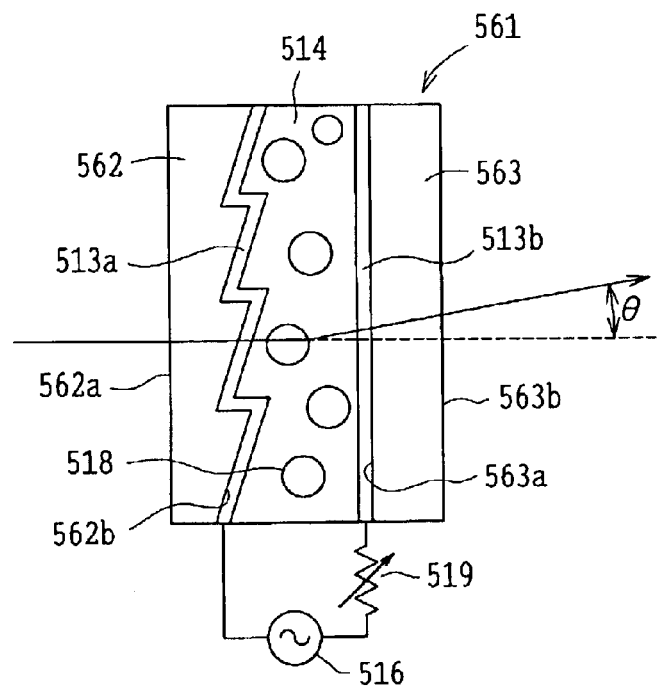
FIGS. 52A and 52B are views showing two examples of variable deflection-angle prisms, each of which is applicable to the zooming optical system of the present invention.

FIG. 52A shows a variable deflection-angle prism applicable to the zooming optical system according to the present invention. A variable deflection-angle prism 561 includes a first transparent substrate 562 on the entrance side, having a first surface 562a and a second surface 562b; and a second transparent substrate 563 of a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 44, is sandwiched, through the transparent electrodes 513a and 513b, between the transparent substrate 562 and the transparent substrate 563 on the exit side. The transparent electrodes 513a and 513b are connected to the alternating-current power supply 516 through the variable resistor 519. Whereby, the alternating-current electric field is applied to the liquid crystal layer 514 so that the deflection angle of light transmitted through the variable deflection-angle prism 561 is controlled.

Figure 52B:
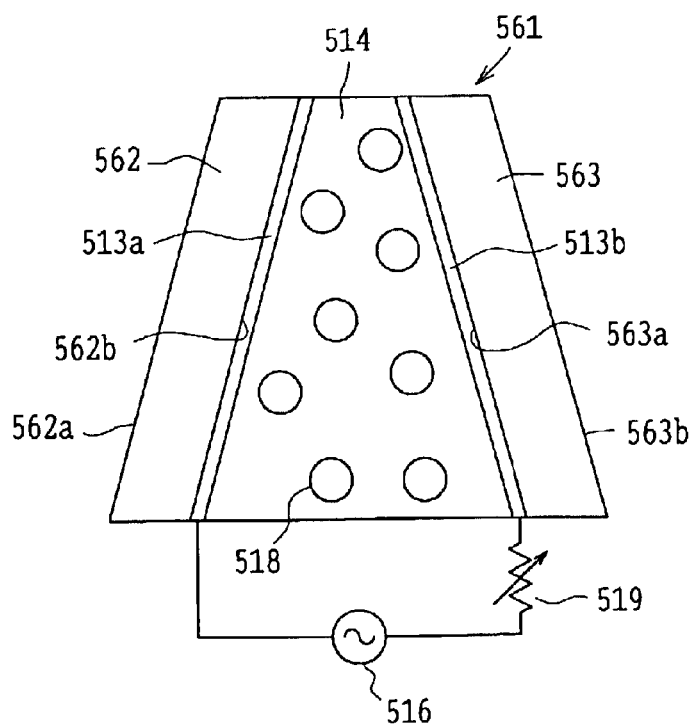

Also, in FIG. 52A, the inner surface 562b of the transparent substrate 562 is configured into the Fresnel form, but as shown in FIG. 52B, the inner surfaces of the transparent substrates 562 and 563 may be configured like an ordinary prism whose surfaces are relatively inclined, or may be configured like the diffraction grating shown in FIG. 49. In the case of the latter, when Equations (36)–(39) and Conditions (40)–(42) are satisfied, the same description as in the variable focal-length diffraction optical element 531 and the variable focal-length spectacles 550 is applied.

Figure 53:
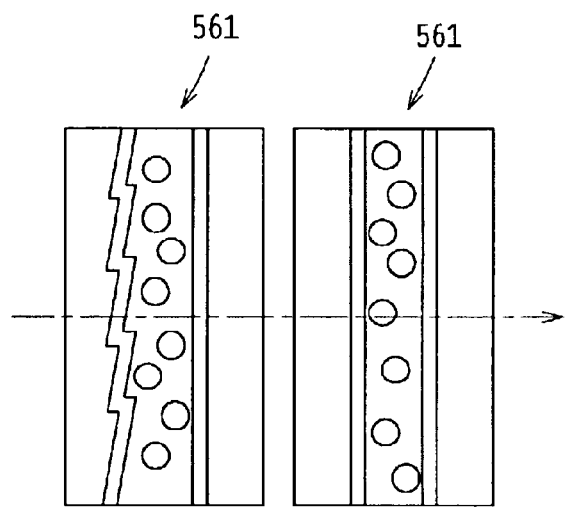
FIG. 53 is a view for explaining the applications of the variable deflection-angle prisms shown in FIGS. 52A and 52B.

The variable deflection-angle prism 561 constructed mentioned above can be effectively used for shake prevention for TV cameras, digital cameras, film cameras, binoculars, etc. In this case, it is desirable that the direction of refraction (deflection) of the variable deflection-angle prism 561 is vertical, but in order to further improve its performance, it is desirable that two variable deflection-angle prisms 561 are arranged so that the directions of deflection are varied and as shown in FIG. 53, the refraction angles are changed in vertical and lateral directions. Also, in FIGS. 52A, 52B, and 53, the liquid crystal molecules are omitted.

Figure 54:
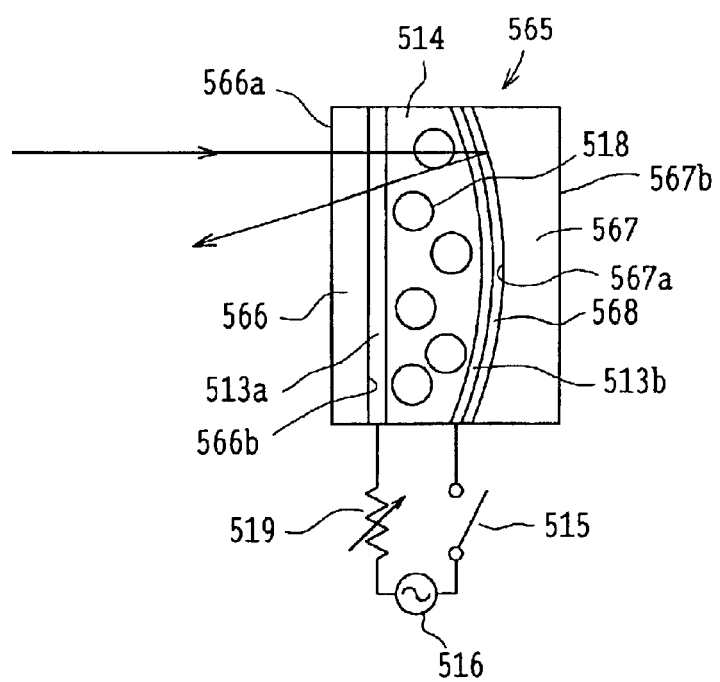
FIG. 54 is a view showing a variable focal-length mirror as the variable focal-length lens applicable to the zooming optical system of the present invention.

FIG. 54 shows a variable focal-length mirror as the variable focal-length lens applicable to the present invention. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as a concave surface, on which a reflecting film 568 is deposited, and the transparent electrode 513b is provided on the reflecting film 568. Between the transparent electrodes 513a and 513b, as in FIG. 44, the macromolecular dispersed liquid crystal layer 514 is sandwiched so that the transparent electrodes 513a and 513b are connected to the alternating-current power supply 516 through the switch 515 and the variable resistor 519, and the alternating-current electric field is applied to the macromolecular dispersed liquid crystal layer 514. Also, in FIG. 54, the liquid crystal molecules are omitted.

According to the above structure, since a ray of light incident on the transparent substrate 566 is passed again through the liquid crystal layer 514 by the reflecting film 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, Conditions mentioned above can be used. Moreover, the inner surface of the transparent substrate 566 or 567, as shown in FIG. 49, can also be configured into the diffraction grating shape to reduce the thickness of the liquid crystal layer 514. By doing so, the amount of scattered light can be decreased.

In the above description, in order to prevent the deterioration of the liquid crystal, the alternating-current power supply 516 is used as a voltage source to apply the alternating-current electric field to the liquid crystal. However, a direct-current power supply is used and thereby a direct-current electric field can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, or the temperature of the liquid crystal. In the above embodiments, since the macromolecular dispersed liquid crystal is close to a solid, rather than a liquid, one of the lenses 512a and 512b, the transparent substrate 532, the lens 522, one of the lenses 552 and 553, the transparent substrate 563 of FIG. 52A, or one of the transparent substrates 562 and 563 of FIG. 52B, may be eliminated. In the present invention, the variable focal-length mirror whose shape is not changed, such as that shown in FIG. 54, also falls into the category of the deformable mirror.

Figure 55:
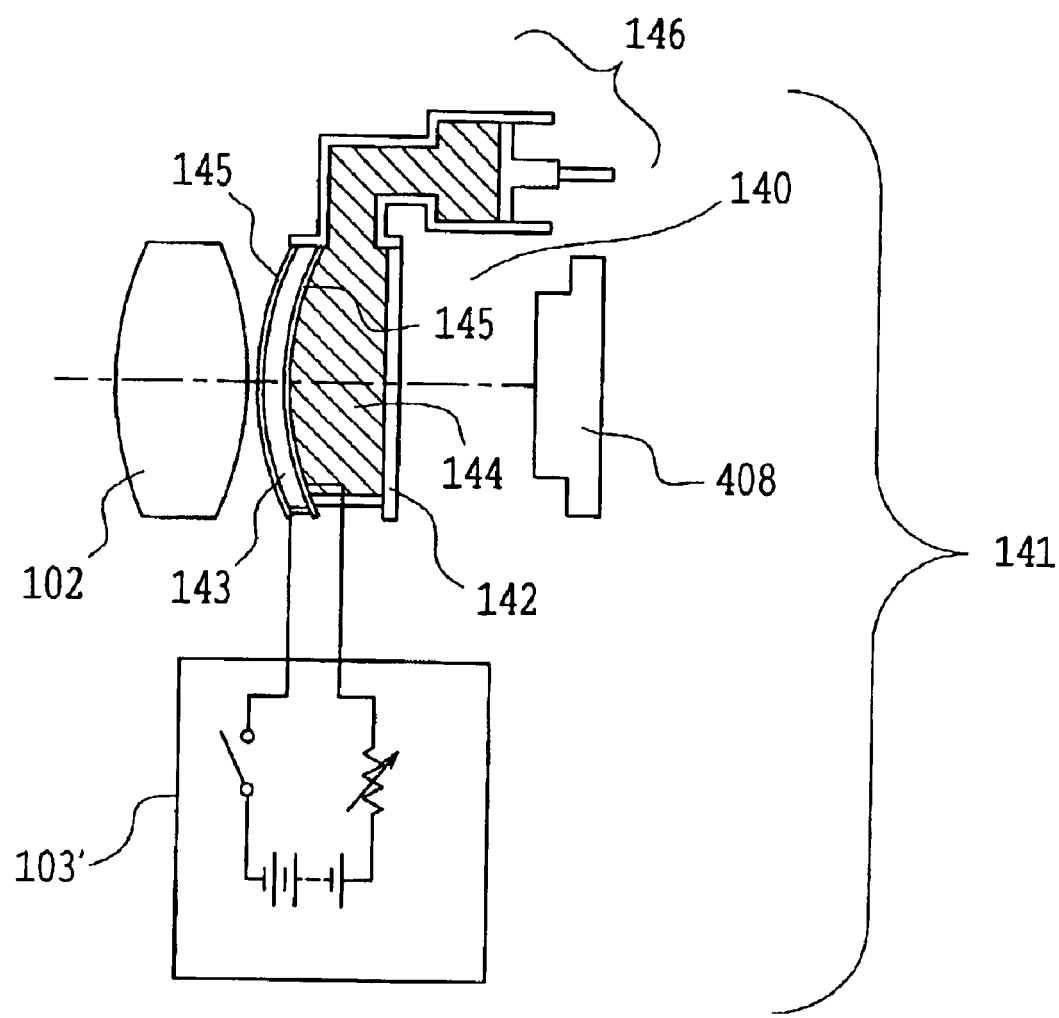
FIG. 55 is a view showing schematically an imaging unit using the variable focal-length lens, in another embodiment, applicable to the zooming optical system of the present invention.

FIG. 55 shows an imaging unit 141 using a variable focal-length lens 140, in another embodiment, applicable to the zooming optical system of the present invention. The imaging unit 141 can be used as the imaging system of the present invention. In this embodiment, the lens 102 and the variable focal-length lens 140 constitute an imaging lens system, and the imaging lens system and the solid-state image sensor 408 constitute the imaging unit 141. The variable focal-length lens 140 is constructed with a light-transmitting fluid or jelly-like substance 144 sandwiched between a transparent member 142 and a soft transparent substance 143 such as piezoelectric synthetic resin.

As the fluid or jelly-like substance 144, silicon oil, elastic rubber, jelly, or water can be used. Transparent electrodes 145 are provided on both surfaces of the transparent substance 143, and when the voltage is applied through a circuit 103', the transparent substance 143 is deformed by the piezoelectric effect of the transparent substance 143 so that the focal length of the variable focal-length lens 140 is changed.

Thus, according to the embodiment, even when the object distance is changed, focusing can be performed without moving the optical system with a motor, and as such the embodiment excels in compact and lightweight design and low power consumption.

In FIG. 55, reference numeral 146 denotes a cylinder for storing a fluid. For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the surface of the deformable mirror, which is favorable. It is good practice to use a transparent piezoelectric substance for the variable focal-length lens.

Figure 56:
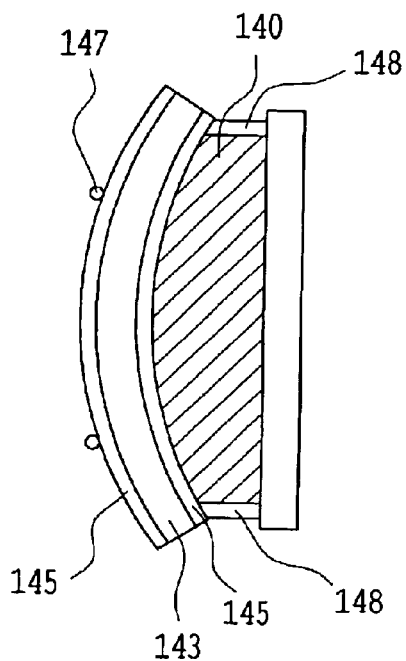
FIG. 56 is an explanatory view showing a modified example of the variable focal-length lens of FIG. 55.

In FIG. 55, instead of using the cylinder 146, the variable focal-length lens 140, as shown in FIG. 56, may be designed to use supporting members 147.

Figure 57:
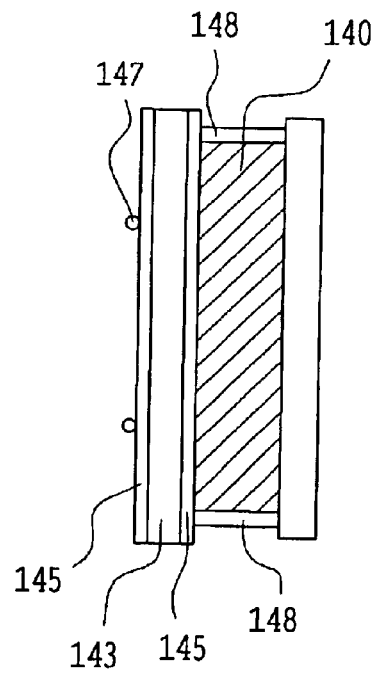
FIG. 57 is an explanatory view showing a state where the variable focal-length lens of FIG. 55 is deformed.

The supporting members 147 are designed to fix the periphery of a part of the transparent substance 143 sandwiched between the transparent electrodes 145. According to the embodiment, even when the voltage is applied to the transparent substance 143 and thereby the transparent substance 143 is deformed, as shown in FIG. 57, the volume of the entire variable focal-length lens 140 remains unchanged. As such, the cylinder 146 becomes unnecessary. Also, in FIGS. 56 and 57, reference numeral 148 designates a deformable member, which is made with an elastic body, accordion-shaped synthetic resin, or metal.

In each of the examples shown in FIGS. 55 and 56, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 58:
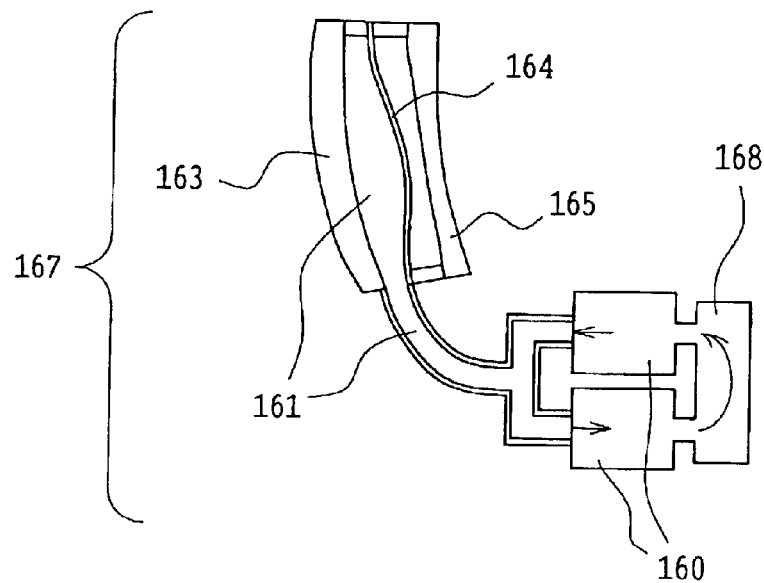
FIG. 58 is a view showing schematically another embodiment of the variable focal-length lens applicable to the zooming optical system of the present invention.

FIG. 58 shows a variable focal-length lens 167 in which the fluid 161 is taken in and out by a micropump 160 to deform the lens surface, in another embodiment of the variable focal-length lens applicable to the zooming optical system of the present invention.

The micropump 160 is a small-sized pump, for example, made by a micromachining technique and is constructed so that it is operated with an electric power. The fluid 161 is sandwiched between a transparent substrate 163 and an elastic body 164. In FIG. 58, reference numeral 165 represents a transparent substrate for protecting the elastic body 164 and this substrate is not necessarily required.

As examples of pumps made by the micromachining technique, there are those which use thermal deformations, piezoelectric substances, and electrostatic forces.

It is also possible to use the micropump 180 shown in FIG. 43 as two micro-pumps, for example, as in the micropump 160 used in the variable focal-length lens 167 of FIG. 58.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 59:
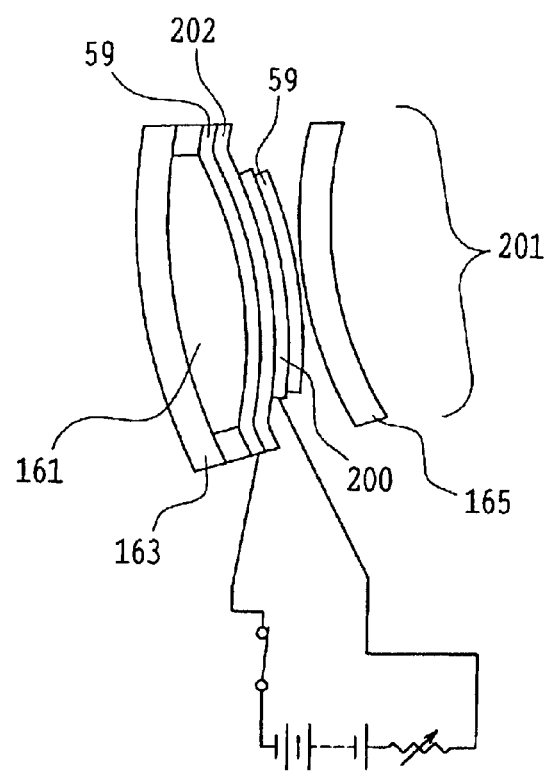
FIG. 59 is a view showing schematically the variable focal-length lens using a piezoelectric substance, applicable to the zooming optical system of the present invention.

FIG. 59 shows a variable focal-length lens 201 using a piezoelectric substance 200 in another embodiment of a variable optical-property element according to the present invention.

The same substance as the transparent substance 143 shown in FIGS. 55 and 56 is used for the piezoelectric substance 200, which is provided on a soft transparent substrate 202. It is desirable that synthetic resin or an organic substance is used for the substrate 202.

In this embodiment, the voltage is applied to the piezoelectric substance 200 through the two transparent electrodes 59, and thereby the piezoelectric substance 200 is deformed so that the function of a convex lens is exercised in FIG. 59.

Figure 60:
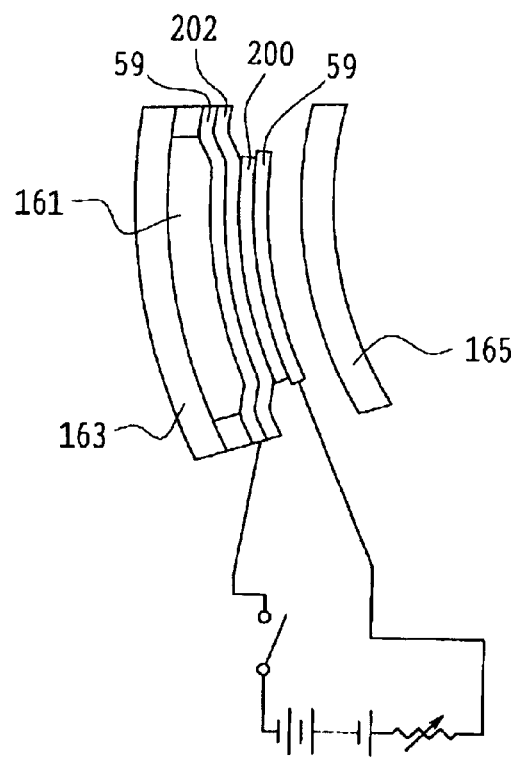
FIG. 60 is an explanatory view showing a state where the variable focal-length lens of FIG. 59 is deformed.

The substrate 202 is previously configured into a convex form, and at least one of the two transparent electrodes 59 is caused to differ in size from the substrate 202, for example, one of the electrodes 59 is made smaller than the substrate 202. In doing so, when the applied voltage is removed, the opposite, preset portions of the two transparent electrodes 59, as shown in FIG. 60, are deformed into concave shapes so as to have the function of a concave lens, acting as the variable focal-length lens.

In this case, since the substrate 202 is deformed so that the volume of the fluid 161 is not changed, there is the merit that the liquid tank 168 becomes unnecessary.

This embodiment has a great merit that a part of the substrate holding the fluid 161 is deformed by the piezoelectric substance and the liquid tank 168 is dispensed with.

The transparent substrates 163 and 165 may be constructed with lenses or plane surfaces, and the same may be said of the embodiment of FIG. 58.

Figure 61:
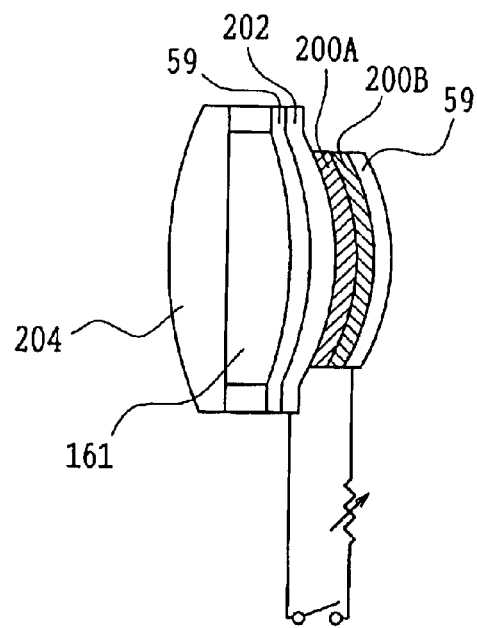
FIG. 61 is a view showing schematically a variable focal-length lens using two thin plates made with piezoelectric substances, in still another embodiment, applicable to the zooming optical system of the present invention.

FIG. 61 shows a variable focal-length lens using two thin plates 200A and 200B constructed of piezoelectric substances in still another embodiment of the variable optical-property element according to the present invention.

The variable focal-length lens of this embodiment has the merit that the thin plate 200A is reversed in direction of the substance with respect to the thin plate 200B, and thereby the amount of deformation is increased so that a wide variable focal-length range can be obtained. Also, in FIG. 61, reference numeral 204 denotes a lens-shaped transparent substrate. Even in the embodiment, the transparent electrode 59 on the right side of the figure is configured to be smaller than the substrate 202.

In the embodiments of FIGS. 59-61, the thicknesses of the substrate 202, the piezoelectric substance 200, and the thin plates 200A and 200B may be rendered uneven so that a state of deformation caused by the application of the voltage is controlled. By doing so, lens aberration can be corrected, which is convenient.

Figure 62:
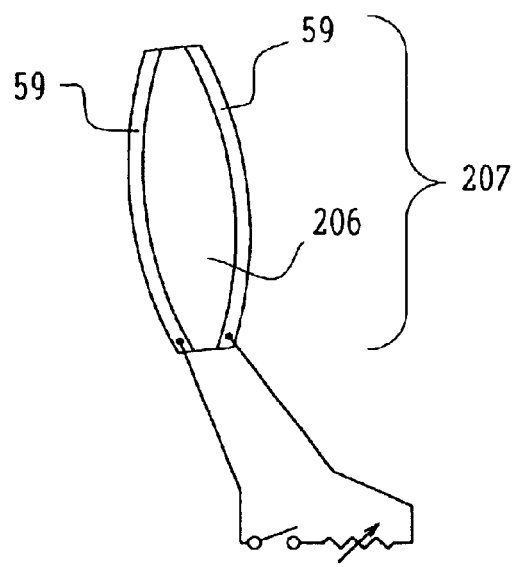
FIG. 62 is a view showing schematically another embodiment of the variable focal-length lens applicable to the zooming optical system of the present invention.

FIG. 62 shows another embodiment of the variable focal-length lens applicable to the present invention. A variable focal-length lens 207 of this embodiment uses an electrostrictive substance 206 such as silicon rubber or acrylic elastomer.

Figure 63:
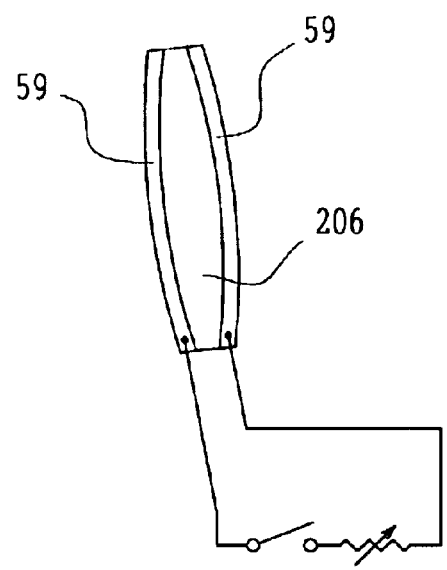
FIG. 63 is an explanatory view showing the deformation of the variable focal-length lens of FIG. 62.

According to the embodiment, when the voltage is low, the electrostrictive substance 206, as depicted in FIG. 62, acts as a convex lens, while when the voltage is increased, the electrostrictive substance 206, as depicted in FIG. 63, expands in a vertical direction and contracts in a lateral direction, and thus the focal length is increased. In this way, the electrostrictive substance 206 operates as the variable focal-length lens. According to the variable focal-length lens of the embodiment, there is the merit that since a large power supply is not required, power consumption is minimized.

Figure 64:
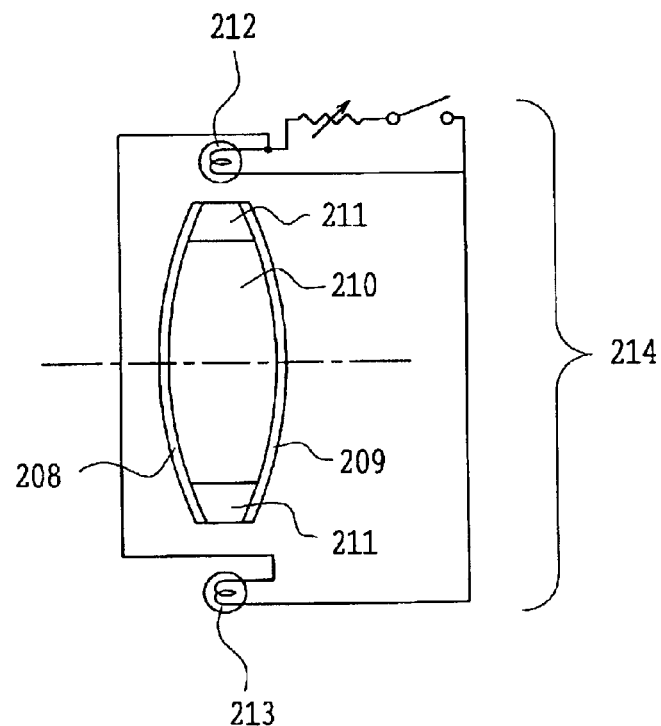
FIG. 64 is a view showing schematically the variable focal-length lens using a photonical effect, in a further embodiment, applicable to the zooming optical system of the present invention.

FIG. 64 shows a variable focal-length lens using a photonical effect in a further embodiment of the variable optical-property element according to the present invention. A variable focal-length lens 214 of this embodiment is designed so that azobenzene 210 is sandwiched between transparent elastic bodies 208 and 209 and is irradiated with ultraviolet light through a transparent spacer 211. In FIG. 64, reference numerals 212 and 213 represent ultraviolet light sources, such as ultraviolet LEDs or ultraviolet semiconductor lasers, of central wavelengths $\lambda_1$ and $\lambda_2$, respectively.

Figures 65A, 65B:
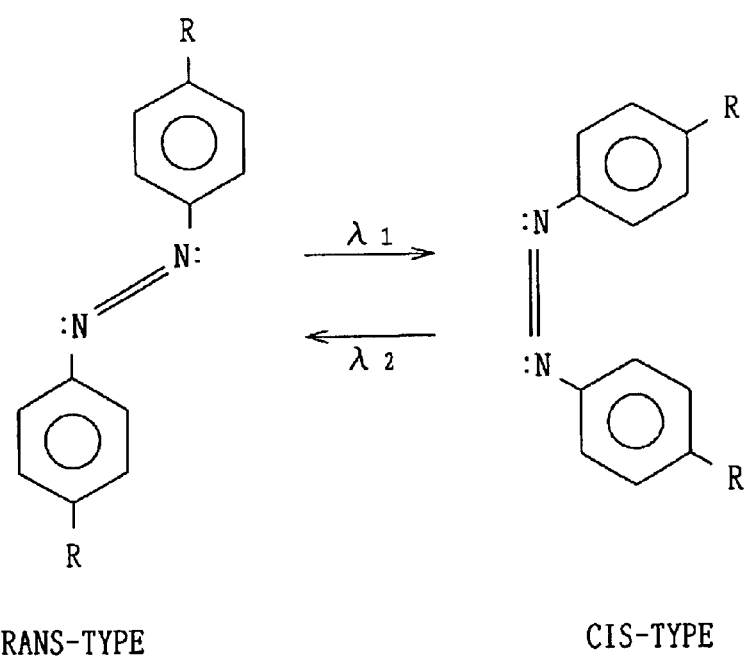
FIGS. 65A and 65B are explanatory views showing the structures of azobenzene of trans- and cis-type, respectively, used in the variable focal-length lens of FIG. 64.

In the embodiment, when trans-type azobenzene shown in FIG. 65A is irradiated with ultraviolet light of the central wavelength $\lambda_1$, the azobenzene 210 changes to cis-type azobenzene shown in FIG. 65B to reduce its volume. Consequently, the thickness of the variable focal-length lens 214 is decreased, and the function of the convex lens is impaired.

On the other hand, when the cis-type azobenzene shown in FIG. 65B is irradiated with ultraviolet light of the central wavelength $\lambda_2$, the azobenzene 210 changes to the trans-type azobenzene shown in FIG. 65A to increase the volume. Consequently, the thickness of the variable focal-length lens 214 is increased, and the function of the convex lens is improved.

In this way, the optical element of the embodiment acts as the variable focal-length lens. In the variable focal-length lens 214, since the ultraviolet light is totally reflected at the interface between each of the transparent elastic bodies 208 and 209 and air, the light does not leak through the exterior and high efficiency is obtained.

Figure 66:
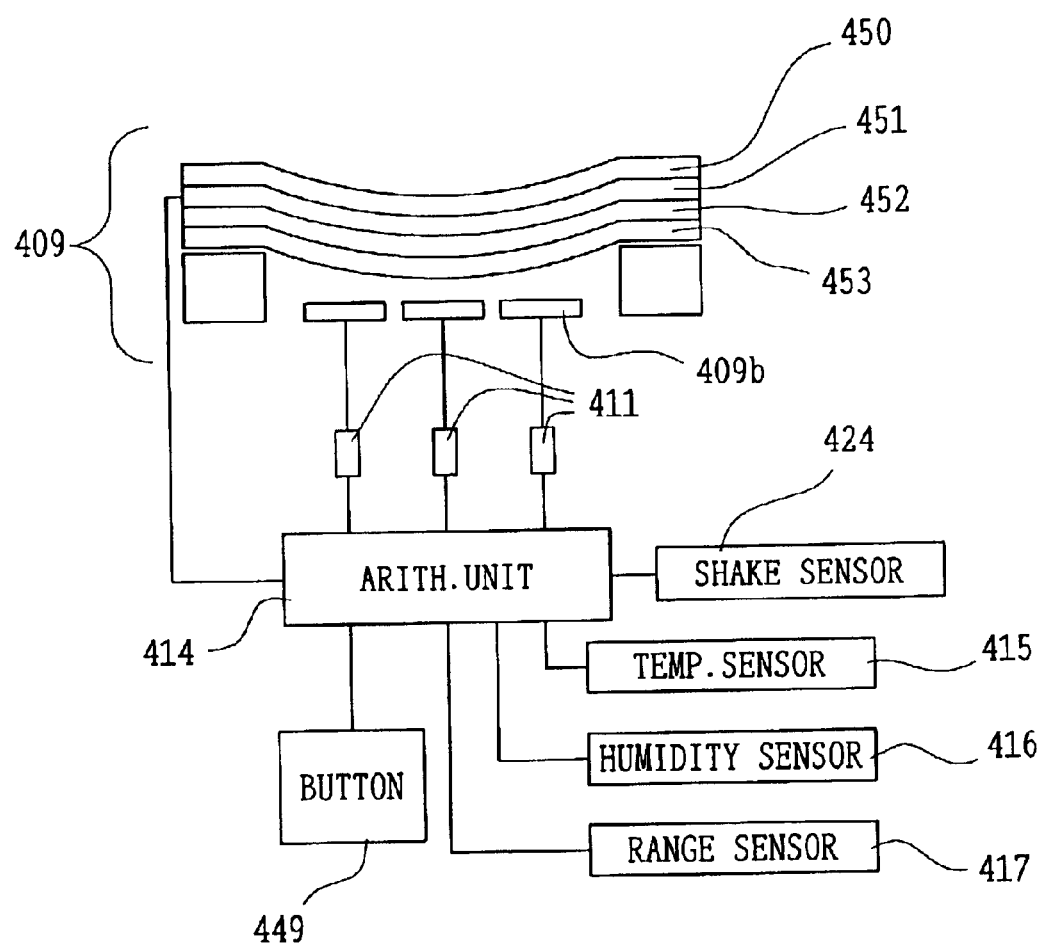
FIG. 66 is an explanatory view showing still another embodiment of the deformable mirror applicable to the zooming optical system of the present invention.

FIG. 66 shows another embodiment of the deformable mirror according to the present invention. In this embodiment, the deformable mirror is used in the digital camera. The deformable mirror 409 of the embodiment is such that the divided electrodes 409b are spaced away from the electrostrictive substance 453 including an organic substance such as acrylic elastomer, on which an electrode 452 and the deformable substrate 451 are placed in turn, and a reflecting film 450 including metal, such as aluminum, for reflecting incident light is provided on the substrate 451.

The deformable mirror, when constructed as mentioned above, has the merit that the surface of the reflecting film 450 becomes smooth and it is hard to produce aberration, in contrast to the case where the divided electrodes 409*b* and the electrostrictive substance 453 are integrally constructed. Also, the deformable substrate 451 and the electrode 452 may be arranged in reverse order.

In FIG. 66, reference numeral 449 stands for a button for changing the magnification of the optical system or zooming. The deformable mirror 409 is controlled through the arithmetical unit 414 so that a user pushes the button 449 and thereby the reflecting film 450 can be deformed to change the magnification or zoom. Also, instead of the electrostrictive substance including an organic substance such as acrylic elastomer, the piezoelectric substance such as barium titanate.

Finally, the terms used in the present invention will be described.

An optical apparatus used in the present invention refers to an apparatus including an optical system or optical elements. The optical apparatus need not necessarily function by itself. That is, it may be thought of as a part of an apparatus. The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

Also, the optical system of the present invention, which is of its lightweight and compact design, is effective when used in the electronic imaging device and the signal processing device and particularly in the imaging system of the digital camera or the cellular phone.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface is defined as follows:

Each of the surfaces of lenses, prisms, and mirrors need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In the present invention, it is assumed that such a surface is generally referred as to the extended surface.

The variable optical-property element includes a variable focal-length lens, a deformable mirror, a deflection prism whose surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a cellular phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

In general, as mentioned above, the present invention has the following features.

(A) The zooming optical system has at least one lens unit having a variable magnification function and at least one deformable reflecting surface having a compensator or focussing function.

(B) The zooming optical system has at least two lens units having variable magnification or compensator functions and at least one deformable reflecting surface having a focusing function.

(C) The zooming optical system satisfies Conditions (1) and (2) in at least one operating state.

(1) In items (A) or (B), the zooming optical system satisfies Condition (7).

(2) The imaging device has the zooming optical system set forth in item (A) or (B), further having a variator unit and moving the variator unit without consuming power.

(3) In items (A) or (B), the zooming optical system satisfies Condition (10).

(4) In item (C), the zooming optical system satisfies Conditions (3) and (4).

(5) In item (C), the zooming optical system satisfies Conditions (5) and (6).

(6) In the zooming optical system set forth in any one of items (A)–(C), (1), and (3)–(5), the variator is constructed with one lens unit.

(7) In item (A) or (B), the zooming optical system in which a variator is constructed with one lens unit satisfies Condition (8).

(8) In item (A) or (B), the zooming optical system in which a variator is constructed with one lens unit satisfies Condition (9).

(9) In item (A) or (B), the zooming optical system satisfies Condition (11).

(10) In item (A) or (B), the zooming optical system satisfies Condition (12).

(11) In the zooming optical system stated in any one of items (A)–(C), (1), and (3)–(10), the stop surface is independently moved in the zooming operation and placed close to the deformable reflecting surface.

(12) In the zooming optical system stated in any one of items (A)–(C), (1), and (3)–(11), a prism is used so that the angle of incidence of a light beam on the deformable reflecting surface becomes small.

(13) In the zooming optical system set forth in item (12), each of the refracting surface and the reflecting surface of the prism is configured as a free-formed surface.

(14) In any one of items (A)–(C), (1), and (3)–(13), the zooming optical system is arranged so that the direction of the shorter side of the image sensor is parallel with the direction of decentering of the deformable reflecting surface.

(15) In the zooming optical system set forth in any one of items (A)–(C), (1), and (3)–(14), the deformable reflecting surface is configured as the free-formed surface.

(16) In the zooming optical system set forth in any one of items (A)–(C), (1), and (3)–(15), the deformable reflecting surface is constructed to change into such a shape as to compensate for deterioration of optical performance caused by the manufacturing error of a lens or a lens system.

(17) The zooming optical system is constructed to provide the deformable reflecting surface with only the function of the compensator and bring about a pan-focus condition through the other lens units.

(18) The imaging device uses the zooming optical system stated in any one of items (A)–(C), (1), and (3)–(17).

(19) The optical system includes a variable mirror, a moving lens unit with an axisymmetrical lens, and an image sensor and is arranged so that the direction of the longer side of the image sensor is parallel with the direction of decentering of the variable mirror.

(20) In any one of items (A)–(C), (1), and (3)–(11), the optical system includes a variable mirror, a moving lens unit with an axisymmetrical lens, and an image sensor and is arranged so that the direction of the longer side of the image sensor is parallel with the eccentric direction of the variable mirror.

(21) The zooming optical system brought into a pan-focus condition is provided with a variable mirror and a moving lens unit so that the variable mirror functions as the compensator and the magnification of the optical system is changed by the moving lens unit.

(22) The zooming optical system has at least one moving lens unit and a variable mirror to make a magnification change.

(23) The zooming optical system has at least two moving lens units and a variable mirror to make a magnification change.

(24) In the optical system set forth in any one of items (20)–(23), the moving lens unit, contributing greatly for the magnification change, has a positive power.

(25) In the optical system set forth in any one of items (20)–(23), the moving lens unit, contributing greatly for the magnification change, has a negative power.

(26) In the optical system set forth in any one of items (20)–(25), the stop is moved in the zooming operation.

(27) In the optical system set forth in any one of items (20)–(25), the stop is moved together with the moving lens unit in the zooming operation.

(28) In the zooming optical system set forth in any one of items (A)–(C) and (20)–(27), only the variable mirror is moved in the focusing operation to perform focusing.

(29) In the optical system set forth in any one of items (A)–(C) and (20)–(28), an angle made by axial incident light from an axial object with axial incident light on the image sensor is 90°±5° or 60°±5°.

(30) In the zooming optical system set forth in any one of items (A)–(C) and (20)–(28), a reflecting surface whose shape is not changed is provided and the incident angle of axial light on the variable mirror is 55° or less.

(31) In the zooming optical system set forth in any one of items (A)–(C) and (20)–(28), a prism is provided and the incident angle of axial light on the variable mirror is 55° or less.

(32) In any one of items (A)–(C) and (1)–(31), the zooming optical system has an aspherical lens.

(33) In any one of items (A)–(C) and (1)–(32), the optical system provides one or more lenses with two or more aspherical surfaces.

(34) In the optical system stated in any one of items (A)–(C) and (1)–(33), the surface of the deformable mirror whose shape is changed is constructed of an organic substance.

(35) In the optical system stated in any one of items (A)–(C) and (1)–(33), the surface of the deformable mirror whose shape is changed is constructed of polyimide.

(36) In the optical system stated in any one of items (A)–(C) and (1)–(35), the surface of the deformable mirror whose shape is changed has a shape extending along a direction parallel with the entrance surface of light.

(37) In the optical system stated in any one of items (A)–(C) and (1)–(36), the mirror surface whose shape is changed is not convex.

(38) In the optical system stated in any one of items (A)–(C) and (1)–(37), the deformable mirror is driven by the electrostatic force, electromagnetic force, piezoelectric effect, electrostriction, or fluid.

(39) The electronic imaging device uses the optical system set forth in any one of items (A)–(C) and (1)–(38).

(40) The digital camera uses the optical system set forth in any one of items (A)–(C) and (1)–(39).

(41) The cellular phone is provided with the electronic imaging device set forth in item (39).

What is claimed is:

1. A zooming optical system comprising:
at least one lens unit having a variable magnification function; and
at least one deformable reflecting surface having a compensator or focusing function, said zooming optical system satisfying in at least one operating state, the following conditions:

$0<|\phi x/\phi|<0.5$ $0<|\phi y/\phi|<0.5$ where $\phi x$ is power of an axis perpendicular to a direction of decentering of the deformable reflecting surface; $\phi y$ is power of an axis in parallel with a direction of decentering of the deformable reflecting surface; and $\phi$ is power of an entire optical system.

2. A zooming optical system comprising:
at least one lens unit having a variable magnification function; and
at least one deformable reflecting surface having a compensator or focusing function, said zooming lens satisfying the following condition:

$0.01<|\eta|<3.0$ where $\eta$ is a magnification of variator unit.

3. A zooming optical system according to claim 2, wherein a variator is constructed with one lens unit.

4. An imaging device using a zooming optical system, the zooming optical system comprising:
   at least one lens unit having a variable magnification function; and
   at least one deformable reflecting surface having a compensator or focusing function,
      wherein the zoom optical system further comprises a variator unit and is configured to move the variator unit without using a driving means.

5. An imaging device using a zooming optical system, the zooming optical system comprising:
   at least two lens units having variable magnification or compensator functions; and
   at least one deformable reflecting surface having a focusing function,
      wherein the zoom optical system further comprises a variator unit and is configured to move the variator unit without using a driving means.

6. A zooming optical system comprising:
at least one lens unit having a variable magnification function; and
   at least one deformable reflecting surface having a compensator or focusing function, satisfying the following condition:

$$D<20.0 \text{ mm}$$

where D is an effective beam diameter of the deformable reflecting surface.

7. A zooming optical system according to claim 6, wherein a variator is constructed with one lens unit.

8. A zooming optical system comprising:
   at least one lens unit having a variable magnification function; and
   at least one deformable reflecting surface having a compensator or focusing function,
wherein a variator is contacted with one lens unit.

9. A zooming optical system comprising:
   at least one lens unit having a variable magnification function; and
   at least one deformable reflecting surface having a compensator or focusing function,
   wherein a variator is constructed with one lens unit to satisfy the following condition:

$$0.1<|\eta|<2.0$$

where $\eta$ is a magnification of a variator unit.

10. A zooming optical system comprising:
   at least one lens unit having a variable magnification function; and
   at least one deformable reflecting surface having a compensator or focusing function, said zoom optical system satisfying the following condition:

$$D<17.0 \text{ mm}$$

where D is an effective beam diameter of the deformable reflecting surface.

11. A zooming optical system comprising:
   at least one lens unit having a variable magnification function; and
   at least one deformable reflecting surface having a compensator or focusing function,
      wherein a stop surface is independently moved in a zooming operation and is placed in the proximity of the deformable reflecting surface.

12. A zooming optical system comprising:
   at least one lens unit having a variable magnification function; and
   at least one deformable reflecting surface having a compensator or focusing function,
wherein the deformable reflecting surface is configured as a free-formed surface.

13. A zooming optical system comprising:
   at least one lens unit having a variable magnification function; and
   at least one deformable reflecting surface having a compensator or focusing function,
      wherein the deformable reflecting surface is constructed to be deformable at least by a predetermined amount of deformation, the predetermined amount of deformation being an amount that is sufficient for compensation for deterioration of optical performance caused a manufacturing error of a lens or a lens system.

14. A zooming optical system comprising:
   a deformable reflecting surface; and
   a lens unit,
      wherein the deformable reflecting surface has only a function as a compensator, and the lens unit has a non-deformable surface and performs focusing.

15. An optical system comprising:
   a variable mirror;
   a moving lens unit; and
   an image sensor,
      wherein the variable mirror is arranged to be decentered in a predetermined direction,
      wherein the lens unit has a rotationally symmetrical lens, and
      wherein the image sensor is arranged so that a longer side thereof is parallel with the predetermined direction.

16. An optical system according to claim 15, wherein a stop is moved in a zooming operation.

17. An optical system according to claim 15, wherein an angle made by axial incident light from an axial object with axial incident light on the image sensor is 90°±5° or 60°±5°.

18. An optical system according to claim 15, wherein the variable mirror has a deformable mirror surface, and the variable mirror has a substrate made of an organic substance.

19. An optical system according to claim 15, wherein the variable mirror has a deformable minor surface that is shaped oblong and arranged with a lengthwise a direction thereof being parallel with a plane of incidence of light.

20. An optical system according to claim 15, wherein the variable mirror has a deformable mirror surface that is shaped non-convex.

21. An optical system according to claim 15, wherein the moving lens unit, which makes a greatest contribution to a magnification change, has a positive power.

22. An optical system according to claim 15, wherein the moving lens unit, which makes a greatest contribution to a magnification change, has a negative power.

23. An optical system including a zooming optical system, zooming optical system having at least one moving lens unit and a variable mirror to thereby make a magnification change, wherein a stop is moved along an optical axis in a zooming operation.

24. An optical system including a zooming optical system, the zooming optical system having at least two moving lens units and a variable mirror to thereby make a magnification change, wherein a stop is moved along an optical axis in a zooming operation.

25. A zooming optical system constituting an optical system, the optical system comprising:

a variable mirror;

a moving lens unit with a rotationally symmetrical lens; and an image sensors, wherein the variable mirror is arranged to be decentered in a predetermined direction, wherein the image sensor is arranged so that a longer side thereof is parallel with the predetermined direction, and wherein only the variable mirror is driven in a focusing operation to perform focusing.

26. An optical system including a zooming optical system, said zooming optical system comprising:

at least one lens unit having a variable magnification function and at least one deformable reflecting surface having a compensator or focusing function, wherein an angle made by axial incident light from an axial object with axial incident light on the image sensor is 90°±5° or 60°±5°.

27. An optical system including a zooming optical system, said zooming optical system comprising:

at least two lens units having variable magnification or compensator functions and at least one deformable reflecting surface having a focusing function, wherein an angle made by axial incident light from an axial object with axial incident light on the image sensor is 90°±5° or 60°±5°.

28. An optical system including a zooming optical system, said zooming optical system having at least one moving lens unit and a variable mirror to thereby make a magnification change, wherein an angle made by axial incident light from an axial object with axial incident light on the image sensor is 90°±5° or 60°±5°.

29. An optical system including a zooming optical system, said zooming optical system having at least two moving lens units and a variable mirror to thereby make a magnification change, wherein an angle made by axial incident light from an axial object with axial incident light on the image sensor is 90°±5° or 60°±5°.

30. A zooming optical system comprising:

at least one lens unit having a variable magnification function; and at least one deformable reflecting surface having a compensator or focusing function, wherein a non-deformable reflecting surface is provided and an incident angle of axial light on a variable mirror is 55° or less.

31. A zooming optical system constituting an optical system, the optical system comprising:

a variable mirror;

a moving lens unit with a rotationally symmetrical lens; and an image sensor, wherein the variable mirror is arranged to be decentered in a predetermined direction, wherein the image sensor is arranged so that a longer side thereof is parallel with the predetermined direction, wherein a non-deformable reflecting surface is provided, and wherein an incident angle of axial light on the variable mirror is 55° or less.

32. A zooming optical system comprising:

at least one lens unit having a variable magnification function; and at least one deformable reflecting surface having a compensator or focusing function, wherein an aspherical lens is provided.

33. A zooming optical system constituting an optical system, the optical system comprising:

a variable mirror;

a moving lens unit with a rotationally symmetrical lens; and an image sensor, wherein the variable mirror is arranged to be decentered in a predetermined direction, wherein the image sensor is arranged so that a longer side thereof is parallel with the predetermined direction, and wherein an aspherical lens is provided.

34. An optical system including a zooming optical system, the zooming optical system comprising:

at least one lens unit having a variable magnification function;

at least one deformable reflecting surface having a compensator or focusing function; and a deformable mirror having the deformable reflecting surface, wherein the deformable reflecting surface is shaped oblong and arranged with a lengthwise direction thereof being parallel with a plane of incidence of light.

35. An optical system including a zooming optical system, the zooming optical system comprising:

at least two lens units having variable magnification or compensator functions;

at least one deformable reflecting surface having a focusing function; and a deformable mirror having the deformable reflecting surface, wherein the deformable reflecting surface is shaped oblong and arranged with a lengthwise direction thereof being parallel with a plane of incidence of light.

36. An optical system including a zooming optical system, the zooming optical system having at least one moving lens unit and a variable mirror to thereby make a magnification change, wherein the variable mirror has a deformable mirror surface that is shaped oblong and arranged with a lengthwise direction thereof being parallel with a plane of incidence of light.

37. An optical system including a zooming optical system, the zooming optical system having at least two moving lens units and a variable mirror to thereby make a magnification change, wherein the variable mirror has a deformable mirror surface that is shaped oblong and arranged with a lengthwise direction thereof being parallel with a plane of incidence of light.

38. A cellular phone having an optical system, the optical system comprising:

a variable mirror;

a moving lens unit; and an image sensor, wherein the variable mirror is arranged to be decentered in a predetermined direction, wherein the lens unit has a rotationally symmetrical lens, and wherein the image sensor is arranged so that a longer side thereof is parallel with the predetermined direction.

39. A zooming optical system comprising:

at least two lens units having variable magnification or compensator functions; and at least one deformable reflecting surface having a focusing function, said zooming optical system satisfying in at least one operating state, the following conditions:

$$0<|\phi x/\phi|<0.5$$

$$0<|\phi y/\phi|<0.5$$

where $\phi x$ is power of an axis perpendicular to a direction of decentering of the deformable reflecting surface; $\phi y$ is power of an axis in parallel with a direction of decentering of the deformable reflecting surface; and $\phi$ is power of an entire optical system.

40. A zooming optical system comprising:

at least two lens units having variable magnification or compensator functions; and at least one deformable reflecting surface having a focusing function, said zooming optical system satisfying the following condition:

$$0.01<|\eta|<3.0$$

where $\eta$ is a magnification of a variator unit.

41. A zooming optical system according to claim 40, wherein a variator is constructed with one lens unit.

42. A zooming optical system comprising:

at least two lens units having variable magnification or compensator functions; and at least one deformable reflecting surface having a focusing function, said zooming optical system satisfying the following condition:

$$D<20.0 \text{ mm}$$

where D is an effective beam diameter of the deformable reflecting surface.

43. A zooming optical system according to claim 42, wherein a variator is constructed with one lens unit.

44. A zooming optical system comprising:

at least two lens units having variable magnification or compensator functions; and at least one deformable reflecting surface having a focusing function, wherein a variator is constructed with one lens unit.

45. A zooming optical system comprising:

at least two lens units having variable magnification or compensator functions; and at least one deformable reflecting surface having a focusing function, wherein a variator is constructed with one lens unit to satisfy the following condition:

$$0.1<|\eta|<2.0$$

where $\eta$ is a magnification of a variator unit.

46. A zooming optical system comprising:

at least two lens units having variable magnification or compensator functions; and at least one deformable reflecting surface having a focusing function, said zooming optical system satisfying the following condition:

$$D<17.0 \text{ mm}$$

where D is an effective beam diameter of the deformable reflecting surface.

47. A zooming optical system comprising:

at least two lens units having variable magnification or compensator functions; and at least one deformable reflecting surface having a focusing function, wherein a stop surface is independently moved in a zooming operation and is placed in the proximity of the deformable reflecting surface.

48. A zooming optical system comprising:

at least two lens units having variable magnification or compensator functions; and at least one deformable reflecting surface having a focusing function, wherein the deformable reflecting surface is configured as a free-formed surface.

49. A zooming optical system comprising:

at least two lens units having variable magnification or compensator functions; and at least one deformable reflecting surface having a focusing function, wherein the deformable reflecting surface is contacted to be deformable at least by a predetermined amount of deformation, the predetermined amount of deformation being an amount that is sufficient for compensation for deterioration of optical performance caused by a manufacturing error of a lens or a lens system.

50. A zooming optical system comprising:

at least two lens units having variable magnification or compensator functions; and at least one deformable reflecting surface having a focusing function, wherein a non-deformable reflecting surface is provided and an incident angle of axial light on a variable mirror is 55° or less.

51. A zooming optical system having at least two moving lens units and a variable mirror to thereby make a magnification change, wherein a non-deformable reflecting surface is provided and an incident angle of axial light on a variable mirror is 55° or less.

52. A zooming optical system comprising:

at least two lens units having variable magnification or compensator functions; and at least one deformable reflecting surface having a focusing function, wherein an aspherical lens is provided.

53. A zooming optical system having at least two moving lens units and a variable minor to thereby make a magnification change, wherein an aspherical lens is provided.

* * * * *

UNITED STATES PATENT AND TRADEMARK OFFICE
CERTIFICATE OF CORRECTION

| | | |
|---|---|---|
| PATENT NO. | : 6,961,187 B2 | Page 1 of 1 |
| APPLICATION NO. | : 10/247740 | |
| DATED | : November 1, 2005 | |
| INVENTOR(S) | : Takahiro Amanai | |

It is certified that error appears in the above-identified patent and that said Letters Patent is hereby corrected as shown below:

Col. 39, line 40
  replace "contacted"
  with --constructed--.

Col. 40, line 20
  replace "caused a"
  with --caused by a--.

Col. 41, line 6
  replace "sensors"
  with --sensor--.

Col. 44, line 35
  replace "contacted"
  with --constructed--.

Signed and Sealed this
Seventeenth Day of May, 2011

David J. Kappos
*Director of the United States Patent and Trademark Office*